United States Patent [19]

Hashimoto

[11] Patent Number: 5,063,454
[45] Date of Patent: Nov. 5, 1991

[54] AUTOMATIC ADJUSTMENT METHOD AND SYSTEM FOR SERVO MOTOR CIRCUIT OF A MAGNETIC DISK APPARATUS

[75] Inventor: Shuichi Hashimoto, Tokyo, Japan

[73] Assignee: Fujitsu Limited, Kawasaki, Japan

[21] Appl. No.: 460,657

[22] Filed: Jan. 3, 1990

[30] Foreign Application Priority Data

| Jan. 10, 1989 | [JP] | Japan | 1-003183 |
| Jan. 10, 1989 | [JP] | Japan | 1-003184 |
| Jan. 10, 1989 | [JP] | Japan | 1-003185 |
| Jan. 10, 1989 | [JP] | Japan | 1-003186 |
| Mar. 13, 1989 | [JP] | Japan | 1-060472 |
| Mar. 18, 1989 | [JP] | Japan | 1-067201 |

[51] Int. Cl.$^5$ .................. G11B 5/55; G11B 5/596; G11B 13/00
[52] U.S. Cl. .................. 360/78.04; 360/78.02; 318/561; 318/609
[58] Field of Search .................. 318/561, 609, 610; 360/77.02, 78.04, 78.09

[56] References Cited

U.S. PATENT DOCUMENTS

| 4,797,756 | 1/1989 | Yoshihara et al. | 360/77.02 |
| 4,827,200 | 5/1989 | Ogura et al. | 318/561 |
| 4,908,561 | 3/1990 | Hashimoto | 360/77.02 |
| 4,954,908 | 9/1990 | Sengoku | 360/78.04 |
| 4,979,059 | 12/1990 | Sengoku | 360/78.04 |
| 5,003,415 | 3/1991 | Freeze | 318/561 |
| 5,006,770 | 4/1991 | Sakamoto et al. | 318/561 |

Primary Examiner—Aristotelis Psitos
Assistant Examiner—David L. Robertson
Attorney, Agent, or Firm—Staas & Halsey

[57] ABSTRACT

An automatic adjustment system for a servo circuit of a magnetic disk apparatus having a magnetic head, a position signal preparing circuit, a speed control unit, and a position control unit. An automatic adjustment method includes monitoring a core width adjustment of the position signal while engaged in a uniform speed seek operation and adjusting a detection sensitivity of the position signal preparing circuit so that an angle of slope of the position signal becomes a predetermined value, measuring a forward/reverse seek operation time of the time between a forward seek operation and a reverse seek operation and adjusting a speed detecting offset of the speed control unit so that a difference between the forward seek operation time and the reverse seek operation time becomes minimal. A position control offset adjustment step is provided for measuring an integration value of the position signal during position control in a seek operation and adjusting the offset of the position control unit so that the integration value becomes minimal. The steps of counting a seek operation time and positioning adjustment of the seek operation time, adjusting a differentiation gain of the speed control unit so that the seek operation time becomes minimal, integrating the position signal, and adjusting a control current detection gain of the speed control unit so that the integration value becomes minimal, are also performed.

14 Claims, 56 Drawing Sheets

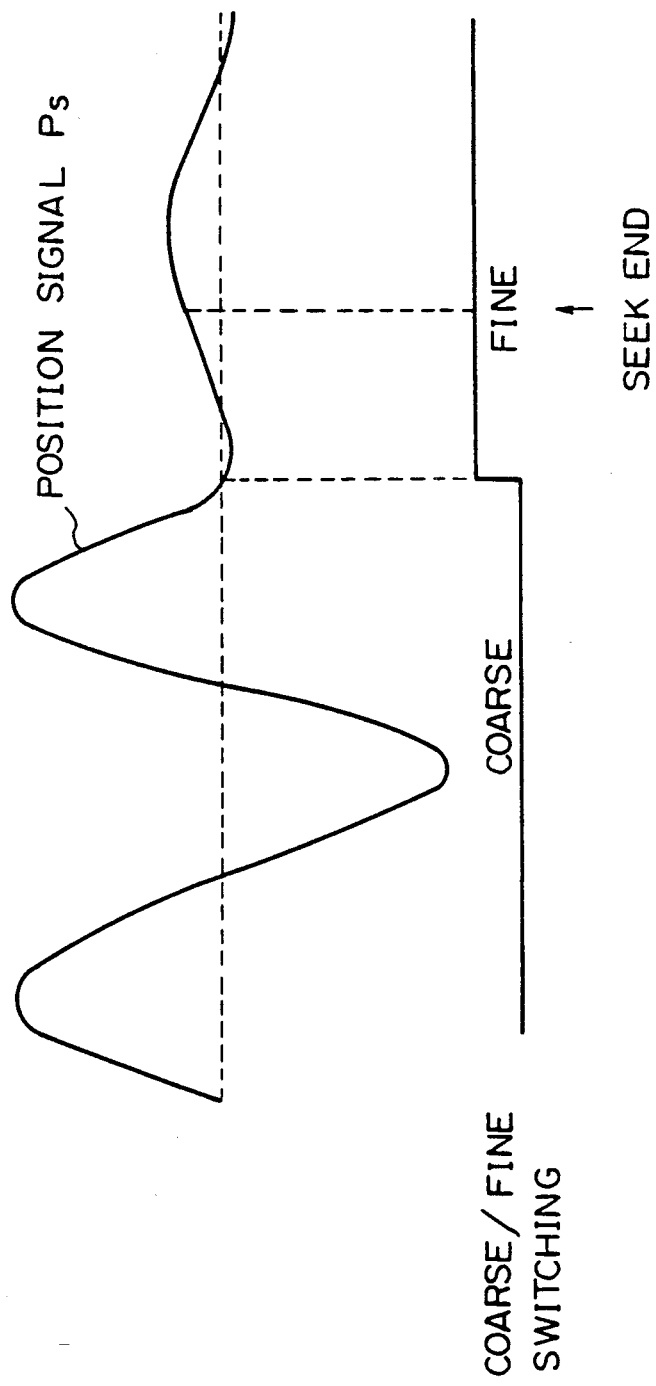

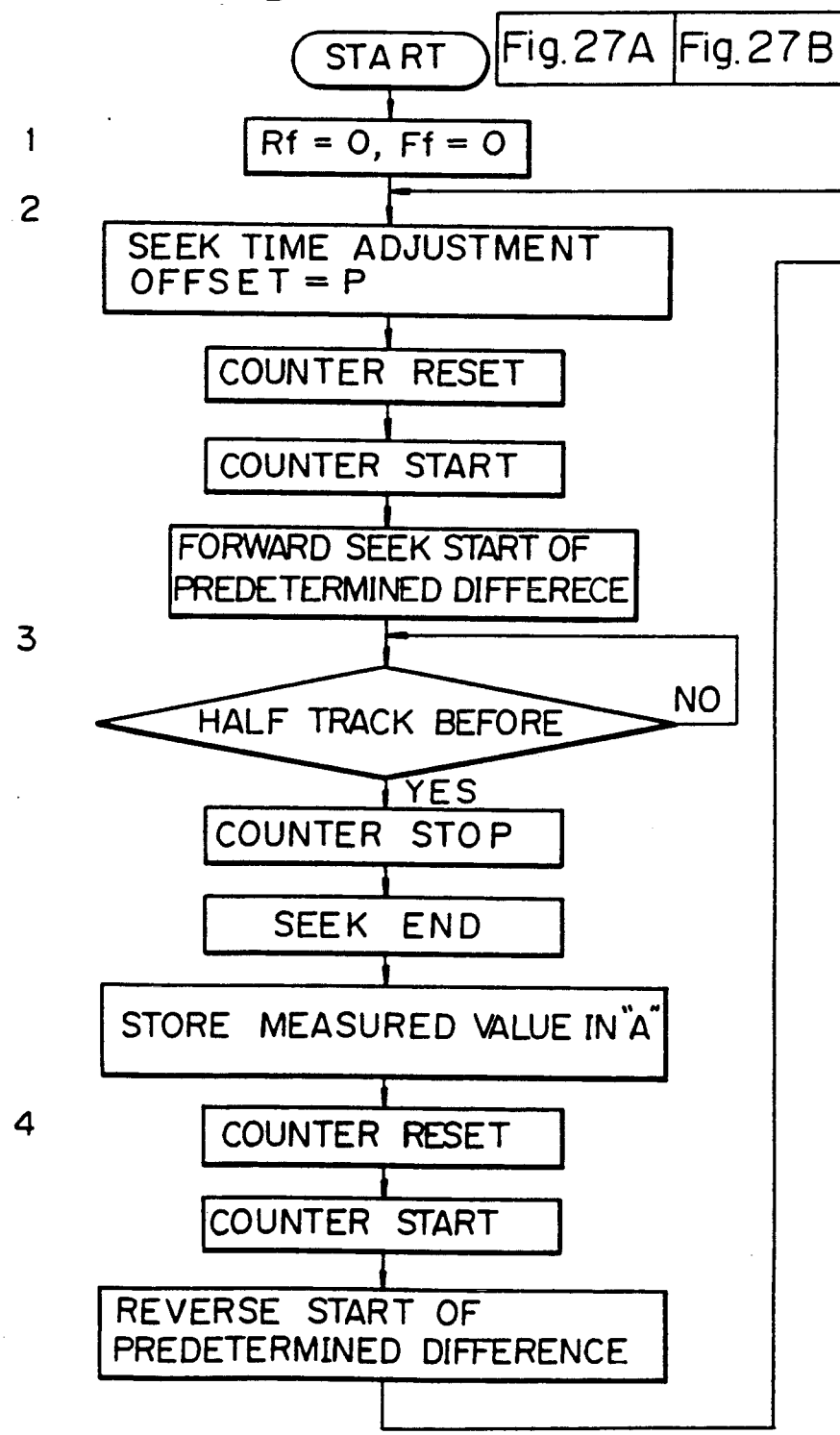

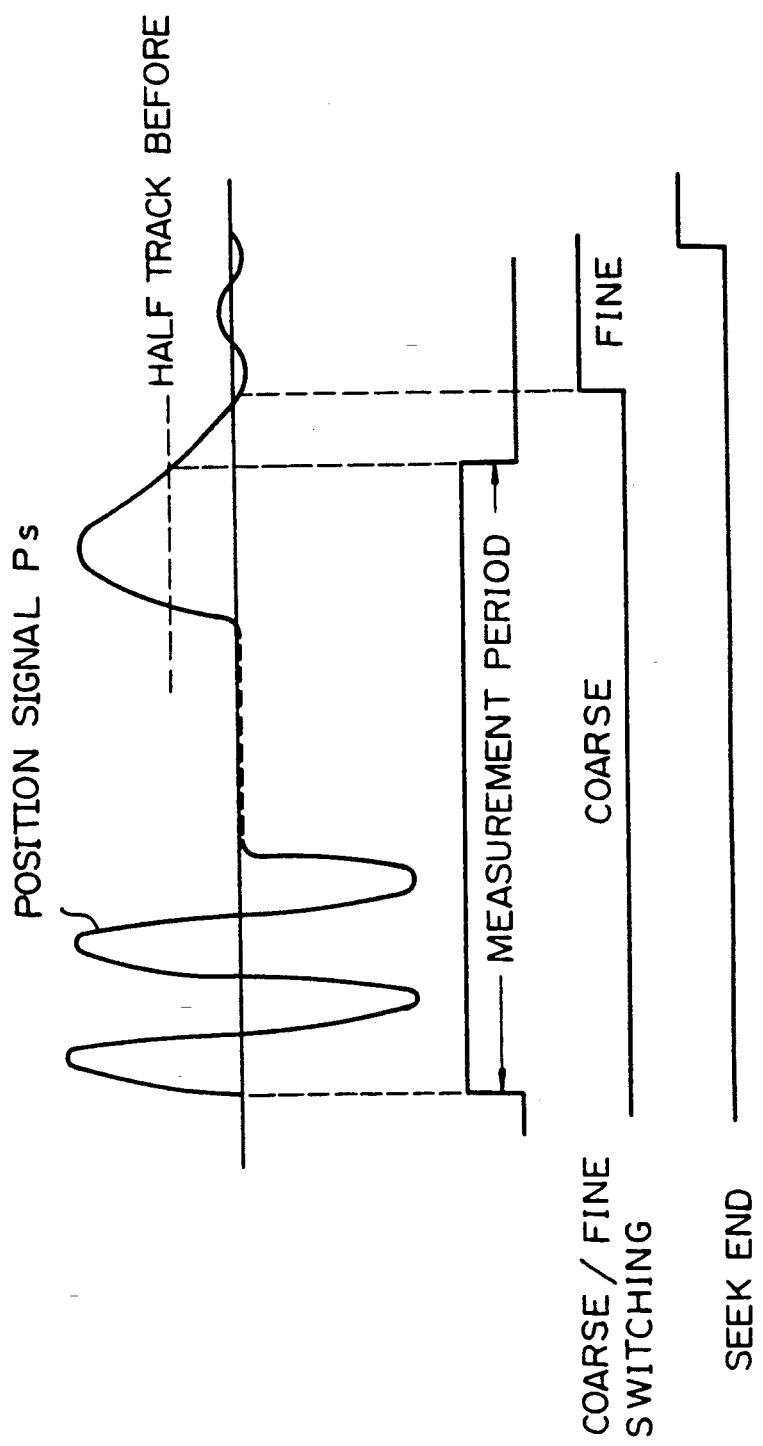

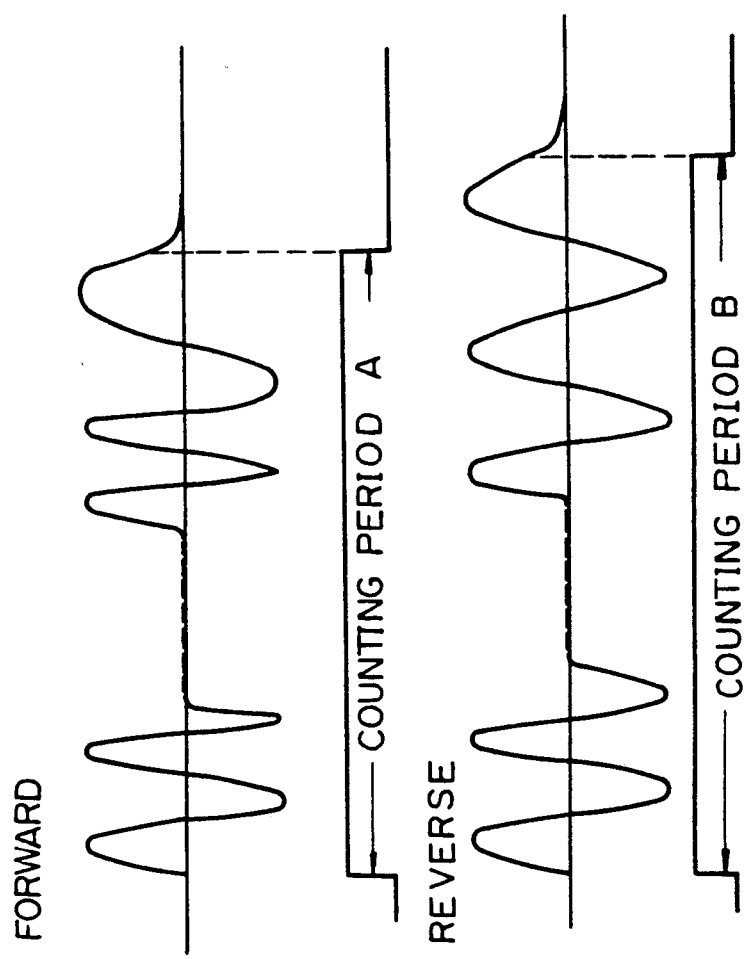

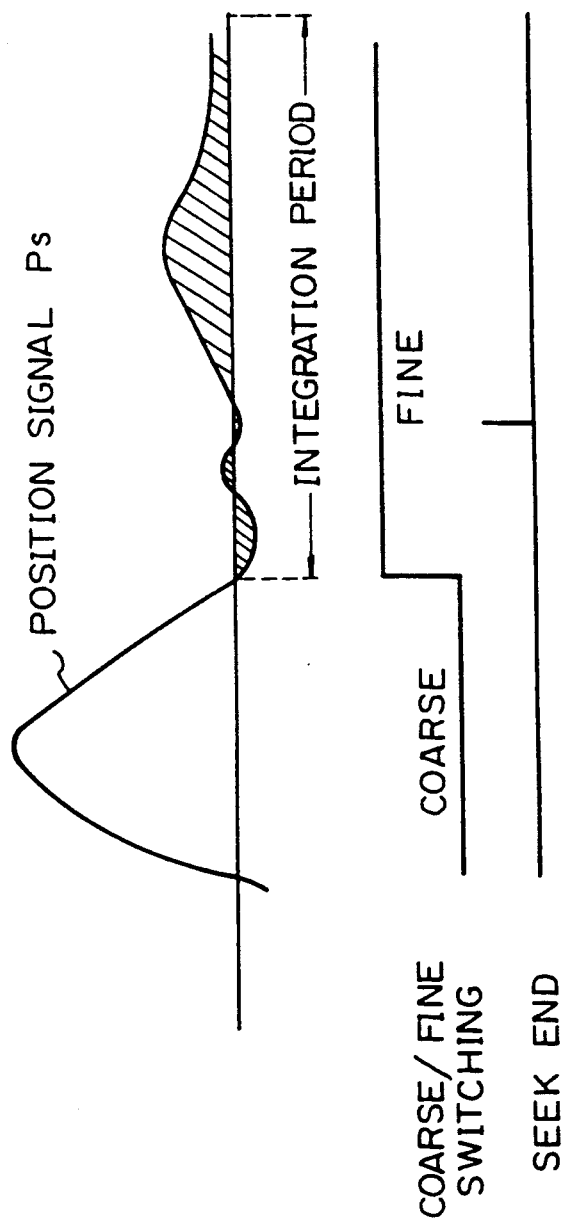

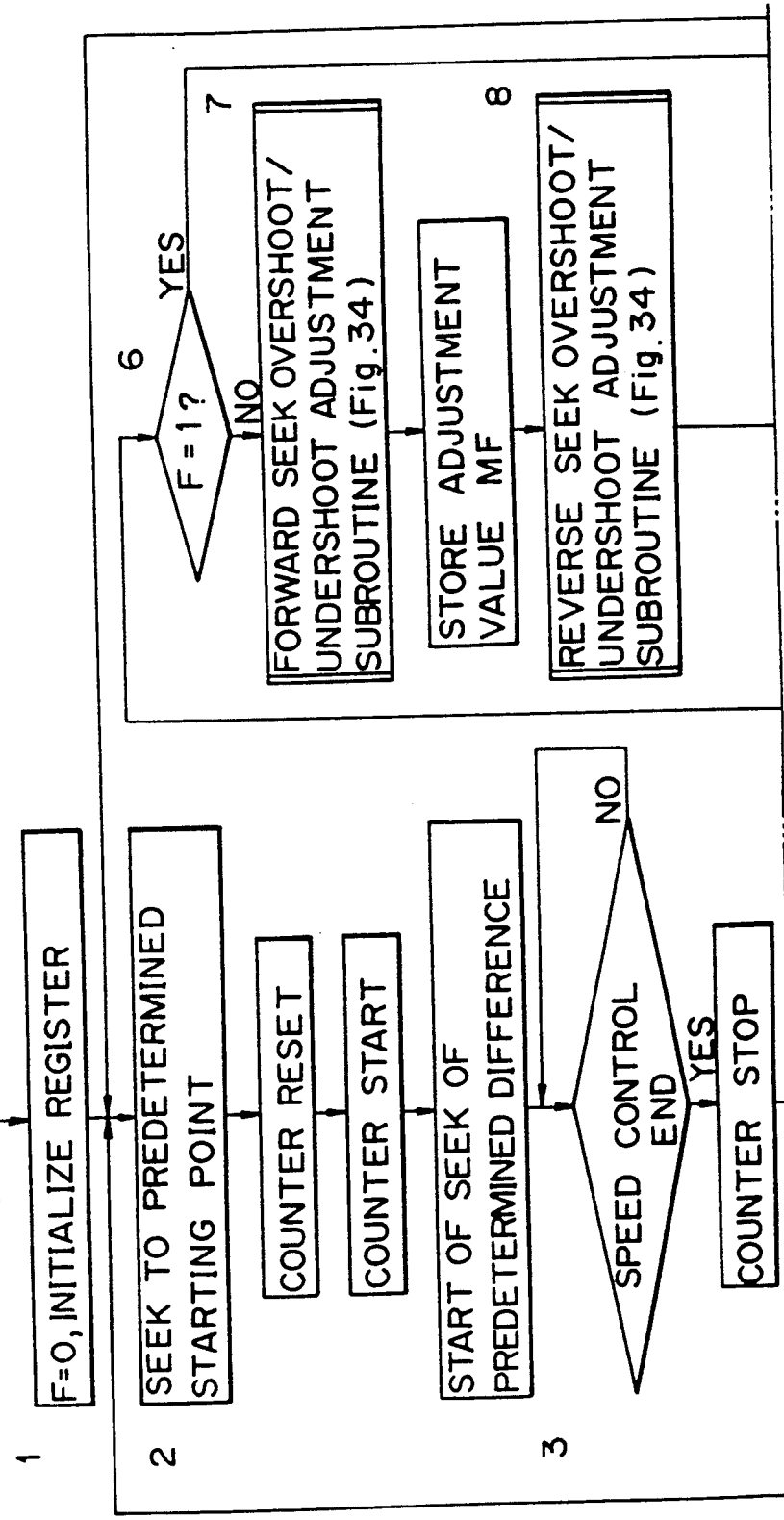

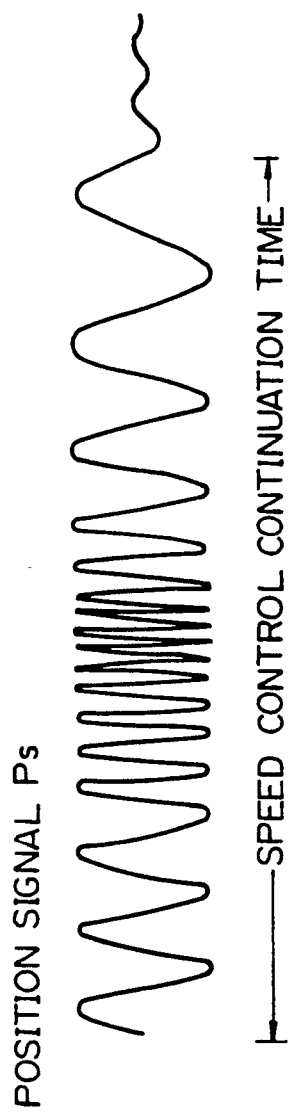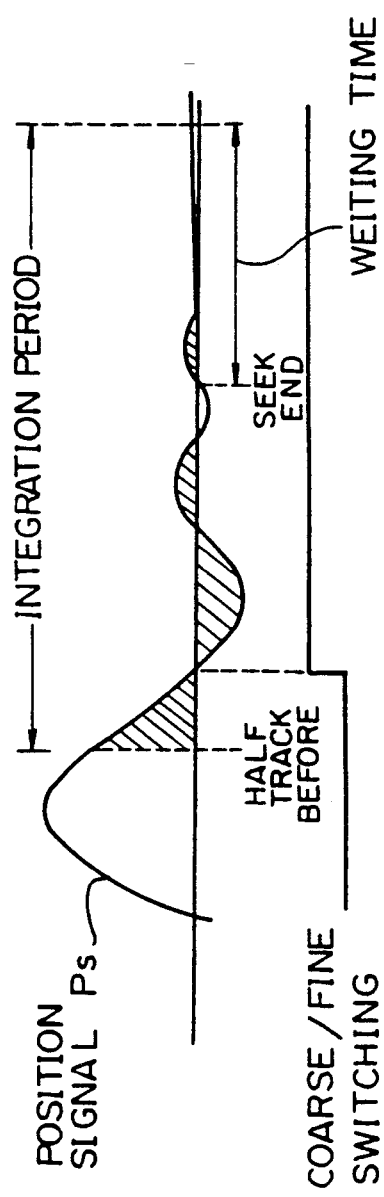

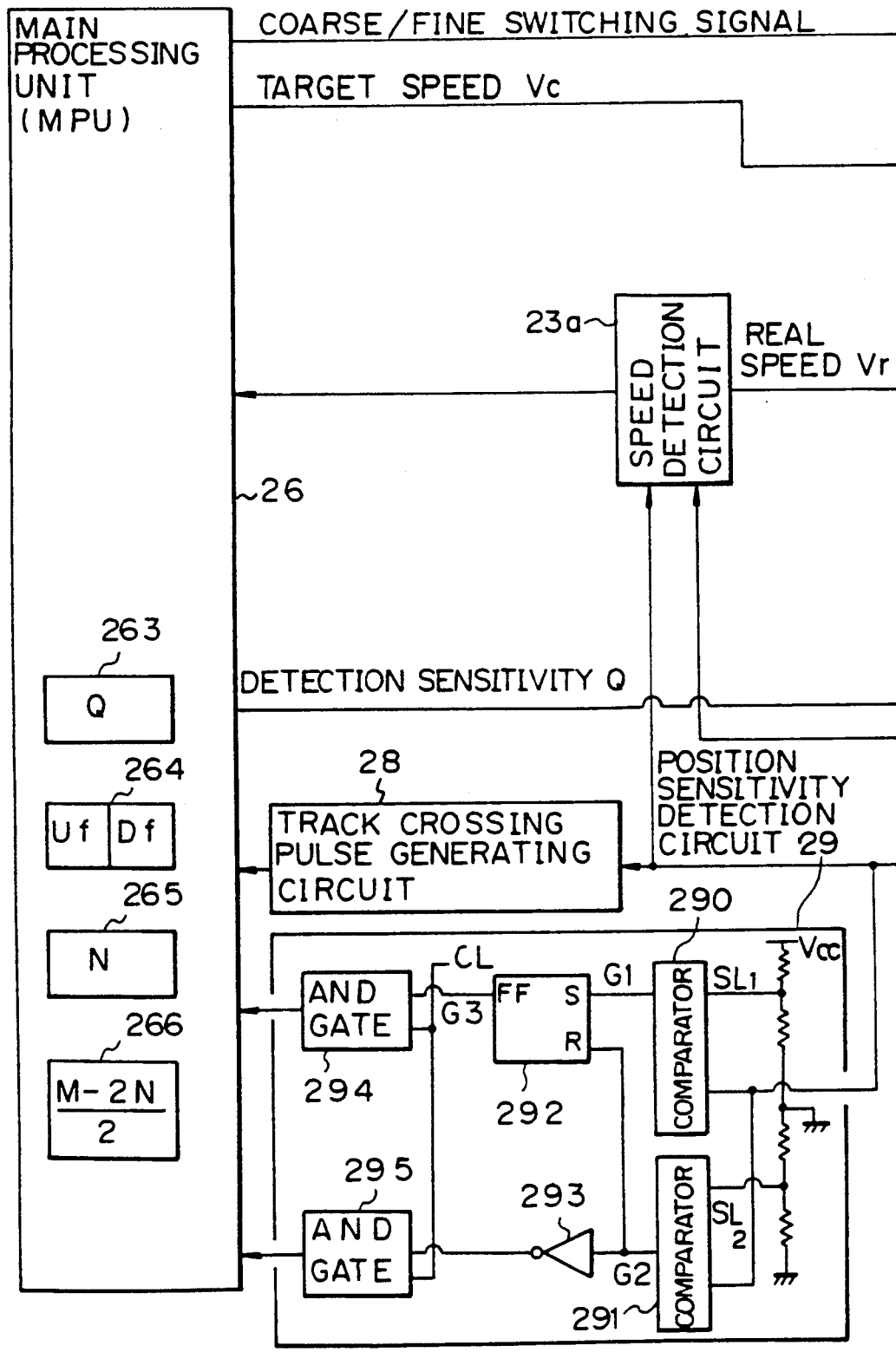

| Fig. 38A | Fig. 38B |

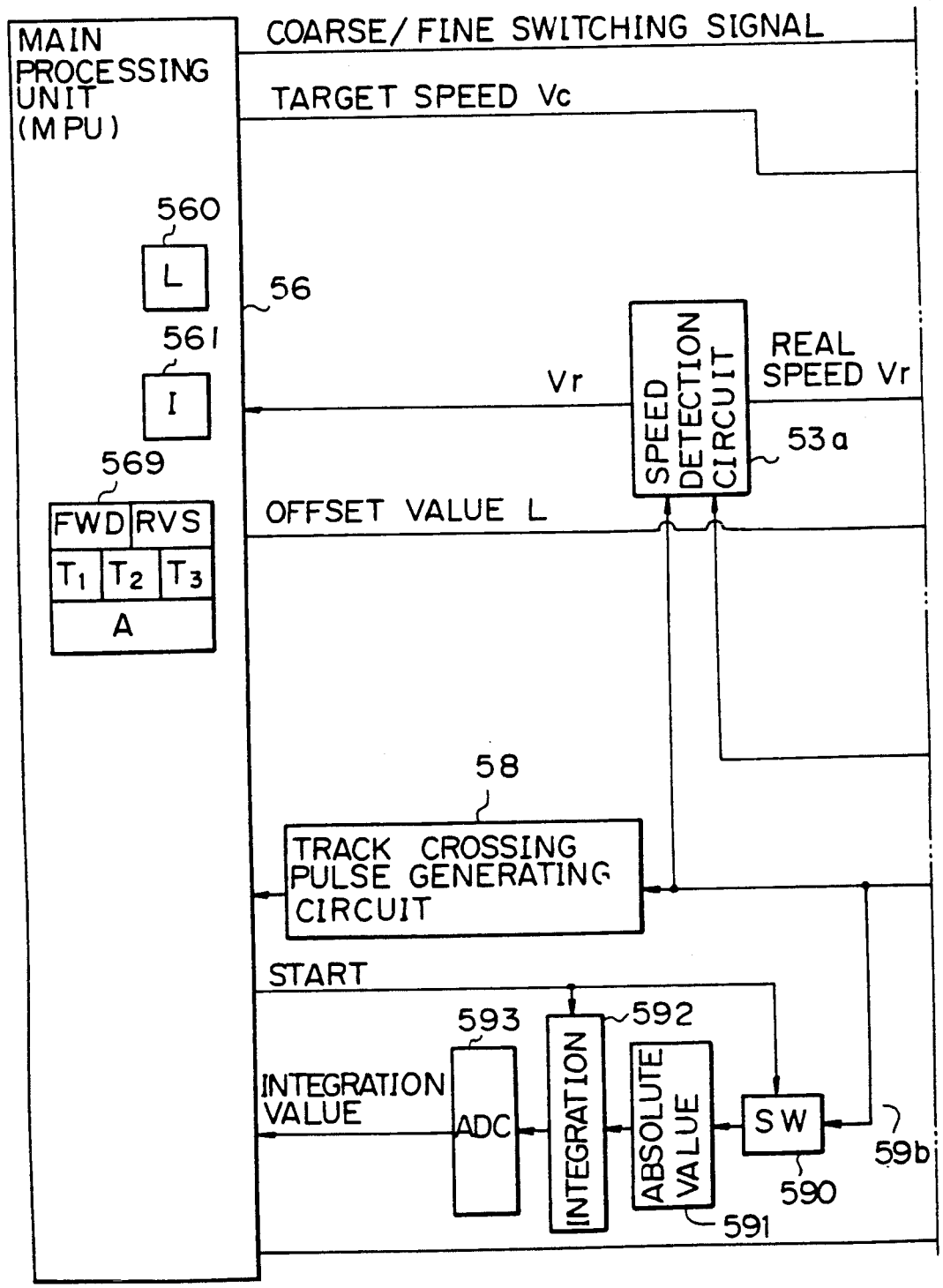

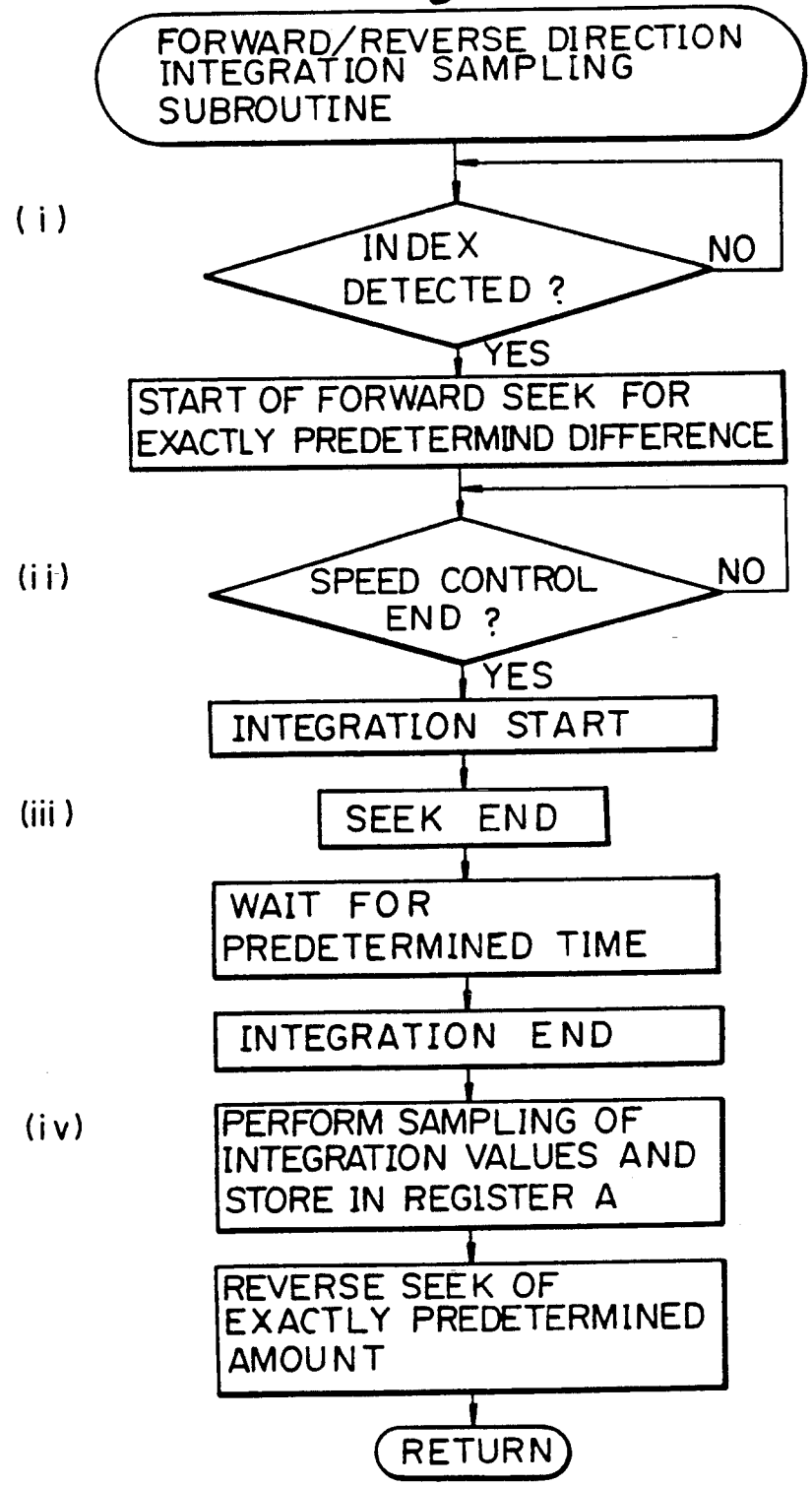

AUTOMATIC ADJUSTMENT METHOD AND SYSTEM FOR SERVO MOTOR CIRCUIT OF A MAGNETIC DISK APPARATUS

BACKGROUND OF THE INVENTION

1. Field of the Invention

The present invention relates to a servo circuit which switches between speed control and position control for positioning a magnetic head in a magnetic disk apparatus to a target position. More particularly, the present invention relates to a method and system which automatically adjusts various portions of a servo circuit.

2. Description of the Related Art

In a magnetic disk apparatus, a magnetic head (servo head) is moved in the radial direction of a magnetic disk by a voice coil motor (drive source) in what is called a seek operation. A servo circuit is used for this seek operation to realize a high speed of operation and high precision of positioning. To enable the servo circuit to display its full performance, it is necessary to adjust various portions of the servo circuit before factory shipment, during maintenance and inspection, etc. For example, any differences in the core width of the servo head cause differences in the slope of the position signal, which makes uniform servo control difficult. It is necessary to adjust the core width so as to adjust the detection sensitivity of the position signal and thus maintain a desired slope of the position signal.

Further, differences often arise between the access time during seek operations in the forward direction and in the reverse direction. It is necessary to make the access times match.

In addition, any offset in the analog circuits of the position control system make smooth position control impossible, so it is necessary to eliminate the offset.

The gains of the servo circuit also have to be adjusted. In particular, it is necessary to suitably adjust the speed detection gain of the speed detection circuit to achieve optimal access times and position control.

Also, problems arise when performing the seek operation without synchronization with an index signal on the servo surface. That is, adjustments have been performed by repeatedly performing a seek operation while giving various adjustment values and finding the optimum adjustment values by trial and error. Therefore, when the measurement positions differ in the seek operations, there is a large difference in the measurement values due to differing track positions on the servo surface, etc., and measurement for accurate adjustment becomes difficult.

SUMMARY OF THE INVENTION

It is an object of the present invention to enable automatic adjustment of a magnetic head in a magnetic disk apparatus with little adjustment error in a smooth and inexpensive manner.

According to the present invention, there is provided an automatic adjustment system for a servo circuit of a magnetic disk apparatus having a magnetic head which reads servo information of a servo surface of a magnetic disk, a position signal preparing circuit which prepares a position signal from the servo information of the magnetic head, a speed control unit which performs speed control on a drive unit which moves the magnetic head in a seek operation, and a position control unit which performs position control on the drive unit based on the position signal.

The automatic adjustment system includes a core width adjustment step of monitoring the position signal while engaged in a uniform speed seek operation and adjusting a detection sensitivity of the position signal preparing circuit so that an angle of slope of the position signal becomes a predetermined value, a forward-/reverse seek operation time adjustment step of measuring the times of forward seek operation and reverse seek operations and adjusting a speed detection offset of the speed control unit to give the smallest difference between the forward seek operation time and the reverse seek operation time, a position control offset adjustment step of measuring an integration value of the position signal during position control in a seek operation and adjusting the offset of the position control unit to give the smallest integration value, and a seek operation time and positioning adjustment step of counting the seek operation time, adjusting a differentiation gain of the speed control unit to give the smallest seek operation time, integrating the position signal, and adjusting a control current detection gain of the speed control unit to give the smallest integration value.

BRIEF DESCRIPTION OF THE DRAWINGS

FIGS. 7A and 7B are graphs for explaining the problems caused by circuit offset;

FIG. 11, including

FIG. 18, including

FIG. 27, including FIGS. 27A and 27B, is a flow chart of the processing for adjustment of an access time in FIG. 18;

FIGS. 28A and 28B are timing diagrams of an access time adjustment operation in FIG. 27;

FIG. 32 is a timing diagram of a position offset adjustment operation in FIG. 29;

FIG. 33, including FIGS. 33A and 33B, is a flow chart of processing for adjustment of a seek operation time/positioning in FIG. 18;

FIGS. 36A and 36B are timing diagrams for the adjustment operation of the seek operation time/positioning in FIG. 33;

FIG. 37, including FIGS. 37A and 37B, is a block diagram of a second embodiment of the present invention;

FIG. 39, including

FIG. 40, including

FIG. 42, including FIGS. 42A and 42B, is a block diagram of the sixth embodiment of the present invention;

FIG. 43 is a flow chart of the processing for integration sampling of the sixth embodiment;

FIG. 44, including

DESCRIPTION OF THE PREFERRED EMBODIMENTS

Before describing the preferred embodiments of the present invention, a more detailed explanation will be given of the related art for reference purposes.

Figure 1:
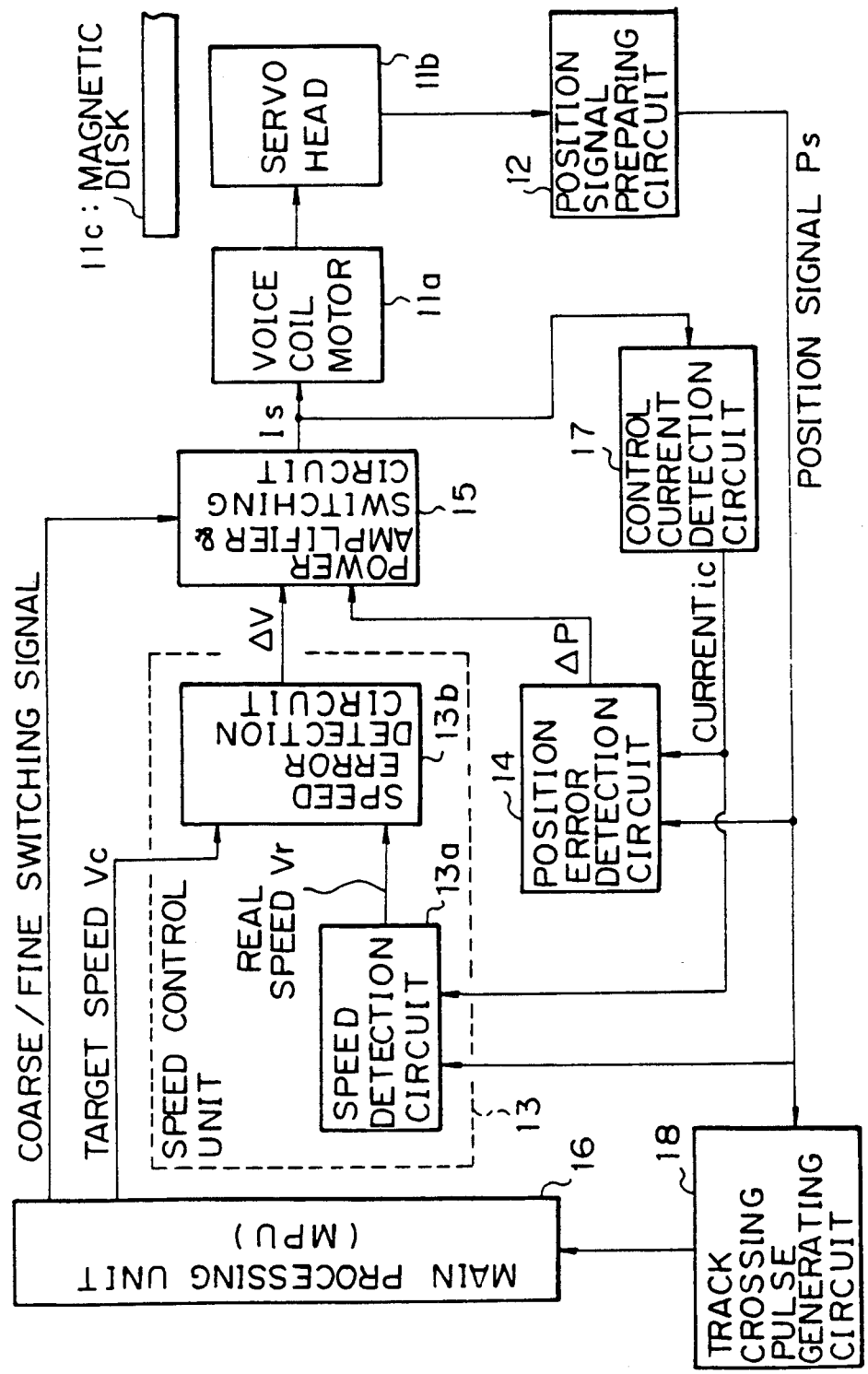
FIG. 1 is a block diagram of a servo circuit to which the present invention relates.

FIG. 1 is a block diagram of a servo circuit to which the present invention relates. In FIG. 1, reference numeral 11a is a voice coil motor used as a drive unit for the seek operation of a magnetic head, and 11b is a servo head which reads servo information from a servo surface of a magnetic disk 11c.

Reference numeral 12 is a position signal preparing circuit which prepares a position signal from a signal read by the servo head 11b.

Reference numeral 13a is a speed detection circuit which detects a real speed Vr from the position signal Ps and a later mentioned detection current ic. Reference numeral 13b is a speed error detection circuit which generates a speed error $\Delta V$ between a later mentioned target speed Vc and real speed Vr and performs speed control.

Reference numeral 13 is a speed control unit which includes the speed detection circuit 13a and the speed error detection circuit 13b.

Reference numeral 14 is a position control unit, also referred to as a position error detection circuit, which generates a position error signal $\Delta P$ from the position signal Ps and a detection current ic and performs position control. Reference numeral 15 is a power amplifier and switch unit which has a switch and power amplifier and switches connections of the speed error detection circuit 13b or position error detection circuit 14 to the voice coil motor 11a by a coarse (speed control)/fine (position control) switching signal.

Reference numeral 16 is a main processing unit which is formed by a microprocessor, generates a target speed curve Vc based on the amount of movement, monitors the position of the servo head 11b by a later mentioned track crossing pulse, and generates a coarse/fine switching signal near the target position.

Reference numeral 17 is a control current detection circuit which detects a control current Is of the power amplifier 15 and generates a detection current signal ic. Reference numeral 18 is a track crossing pulse generating circuit which generates a track crossing pulse from a position signal Ps and outputs it to the main processing unit 16.

The main processing unit 16, when receiving a number of tracks for movement (amount of movement or sometimes referred to as "difference"), produces a target speed curve Vc based on the number of tracks for movement, and drives the voice coil motor 11a by speed control. When the vicinity of the target position is reached, the main processing unit 16 switches the switch of the unit 15 to the position control side, performs position control on the voice coil motor 11a, and performs positioning to the desired track.

In this servo circuit, it is necessary to adjust the offsets and gains of the speed control unit 13, the position control unit 14, the position signal preparing circuit 12, etc. In the past, workers used oscilloscopes and other measuring equipment to view the waveforms of different portions and adjust the adjustment elements of the different portions so as to obtain the desired waveforms. Since the servo circuits were adjusted manually, there was a problem of susceptibility to adjustment error due to individual differences and error in measuring equipment, preventing the use of the full performance of servo mechanisms. Further, manual adjustment meant higher costs for adjustment, leading to higher costs of the final products.

Looking at specific areas for adjustment, as mentioned earlier, any differences in the core width of the servo head cause differences in the slope of the position signal, which makes uniform servo control difficult.

Figure 2:
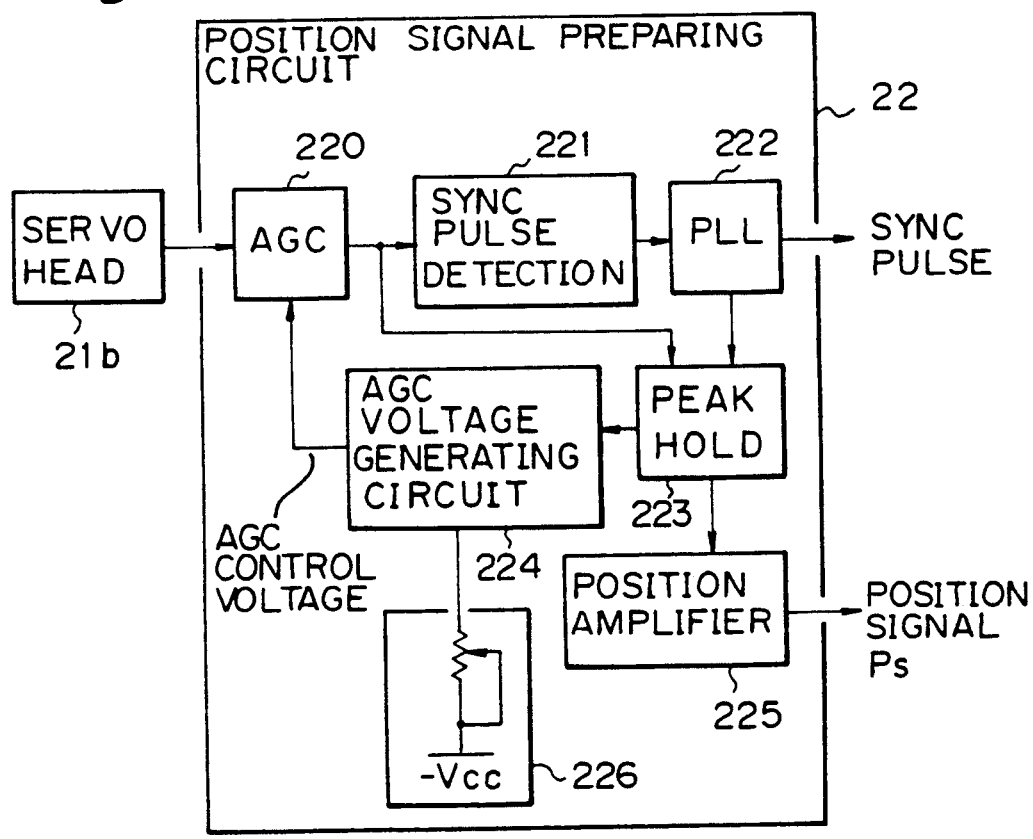
FIG. 2 is a block diagram of a position signal preparing circuit in a servo circuit of the related art.

FIG. 2 is a view of the construction of the position signal preparing circuit 22 of the related art. As shown by FIG. 2, an AGC circuit 220 which performs AGC control on the output of the servo head 21b, a sync pulse detection circuit 221 which detects the sync pulse from the output of the AGC circuit 220, a PLL circuit 222 which performs phase synchronization on the output of the sync pulse detection circuit 221 and generates a sync pulse, a peak hold circuit 223 which holds the peak of the output of the AGC circuit 220 by the sync pulse of the PLL circuit 222, an AGC voltage generating circuit 224 which generates an AGC control voltage of the AGC circuit 220 from the output of the peak hold circuit 223, a position amplifier 225 which amplifies the output of the peak hold circuit 223 and generates a position signal Ps, and a variable resistance 228 which changes the AGC control voltage of the AGC voltage generating circuit 224, are provided.

Figure 3:
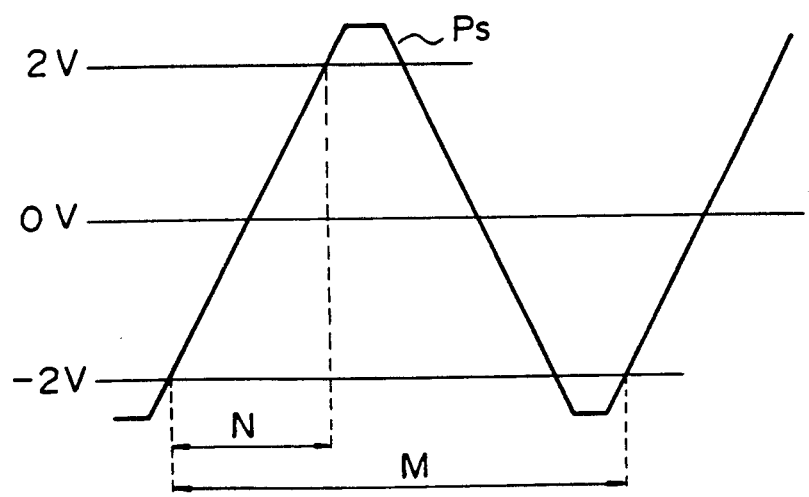
FIG. 3 is a graph of the adjustment of position sensitivity in the related art.

The positioning sensitivity was adjusted manually by adjusting the variable resistance 226 while observing the waveform of the position signal Ps by an oscilloscope so as to change the AGC control voltage and achieve a fixed ratio of N and M as shown in FIG. 3. That is, the variable resistance 226 was used to change the AGC control voltage and change the detection sensitivity of the position signal so as to make the slope of the position signal Ps uniform.

As also mentioned earlier, differences often arise between the access time during seek operations in the forward direction and in the reverse direction. The access time differs in the forward direction and reverse direction even when moving the same distance due to the circuit offset and offset of the voice coil motor 11a of the servo object 11c. Among these access times, the access time during position control is adjusted by the position control system, but the access time during speed control must be adjusted by the speed control system. This adjustment is fine, and in the prior art has been performed by adjustment of the offset of the speed detection circuit 13a.

Figure 4:
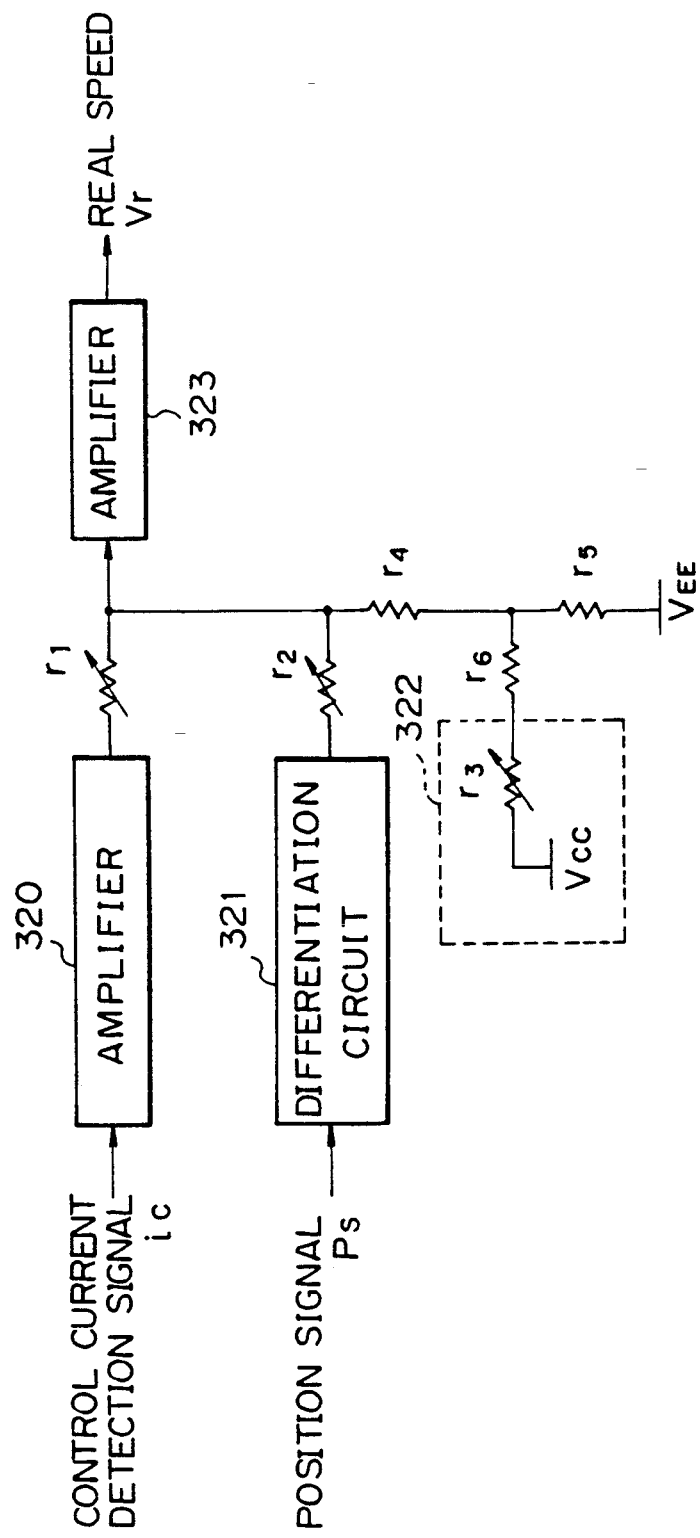
FIG. 4 is a block diagram of a speed detection circuit in a servo circuit of the related art.

The speed detection circuit 13a, as shown in FIG. 4, has an amplifier 320 which amplifies the detection current ic, a differentiation circuit 321 which differentiates the position signal Ps, and an offset adjustment circuit 322 which generates an offset adjustment value by the variable resistor r3. An amplifier 323 is also provided which adds and amplifies the outputs of the amplifier 320, the differentiation circuit 321, and the offset adjustment circuit 322 and generates a real speed Vr.

Figure 5A:
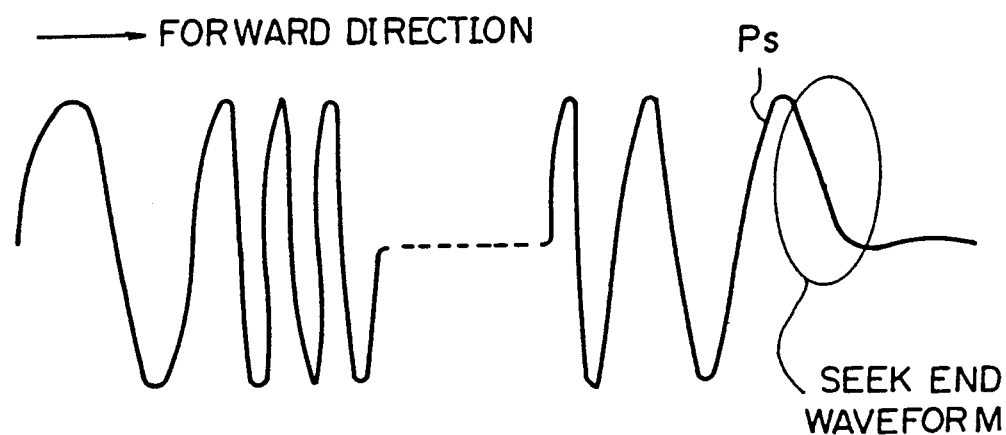
FIG. 5 is a graph of the manual adjustment of access time in forward and reverse direction seek operations in the related art.
Figure 5B:
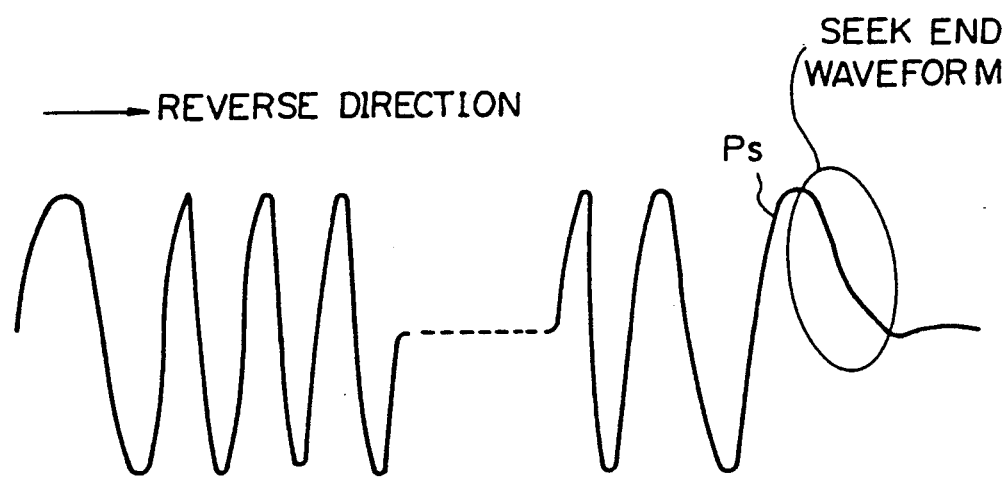

Referring to FIG. 5, the adjustment of the seek operation (access time) for the different directions of speed control was not performed by directly adjusting the seek operation time in the forward direction and reverse direction. Workers observed the position signal Ps by an oscilloscope during the seek operation (access) operation and adjusted the variable resistor r3 of the offset adjustment circuit 322 of the speed detection circuit 63a so that the waveforms at the end of the seek operation became the same in the forward direction and reverse direction. Since the adjustment was made just by the seek operation waveform of the position signal Ps, it was difficult to adjust the true seek operation time.

Figure 6:
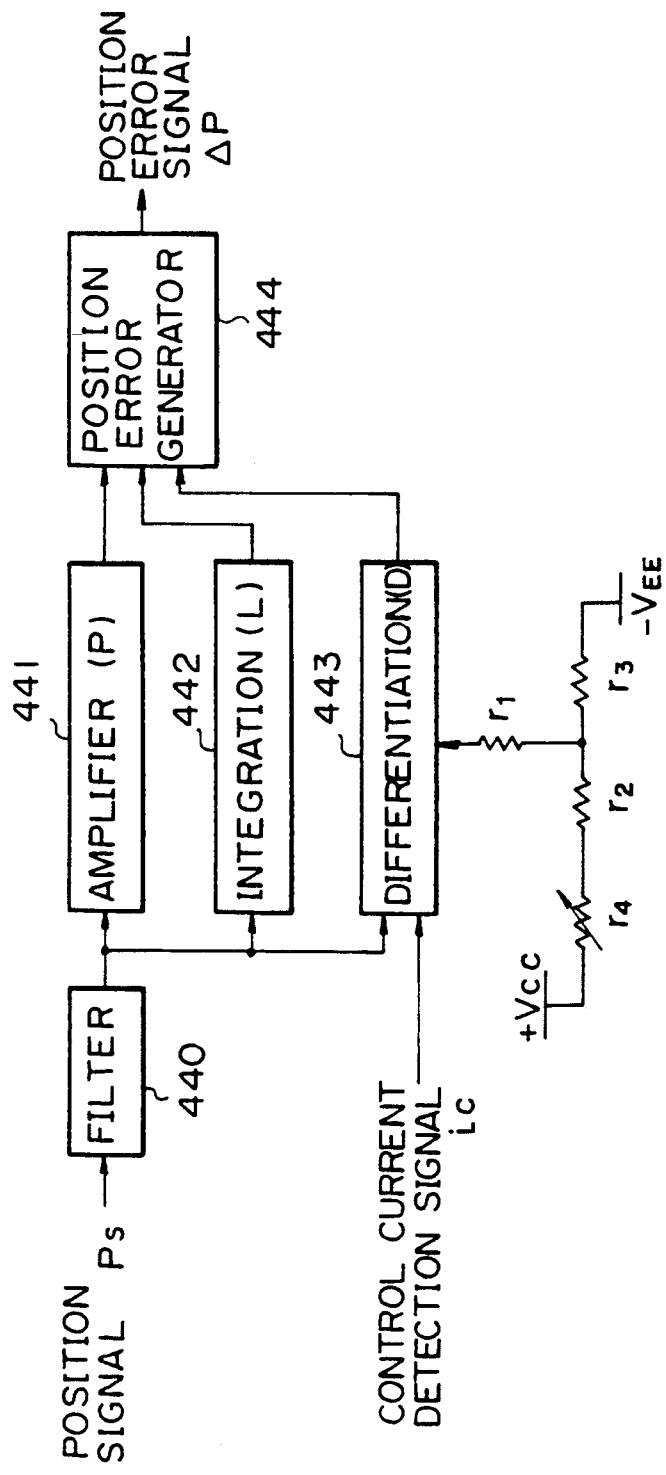
FIG. 6 is a block diagram of a position control unit in a servo circuit of the related art.

In addition, as mentioned earlier, any offset in the analog circuits of the position control system makes smooth position control impossible. The position control unit performing the position control, as shown in FIG. 6, has a filter 440 which cuts the high frequency component of the position signal Ps, an amplifier 441 which amplifies the output of the filter 440, an integration circuit 442 which integrates the output of the filter 440, a differentiation circuit 443 which differentiates the output of the filter 440 and a control current detection signal ic, a position error generator 444 which generates a position error signal from the outputs of the amplifier 441, an integration circuit 442, and differentiation circuit 443, and resistors r1 to r4 for adjusting the offset of the differentiation circuit 443. Such a position control system is made up of analog circuits, so circuit offset is inevitably generated. In particular, the offset of the current feedback system is large. For example, the effect of the offset of the amplifier in the control current detection circuit 17 is great.

Figure 7A:
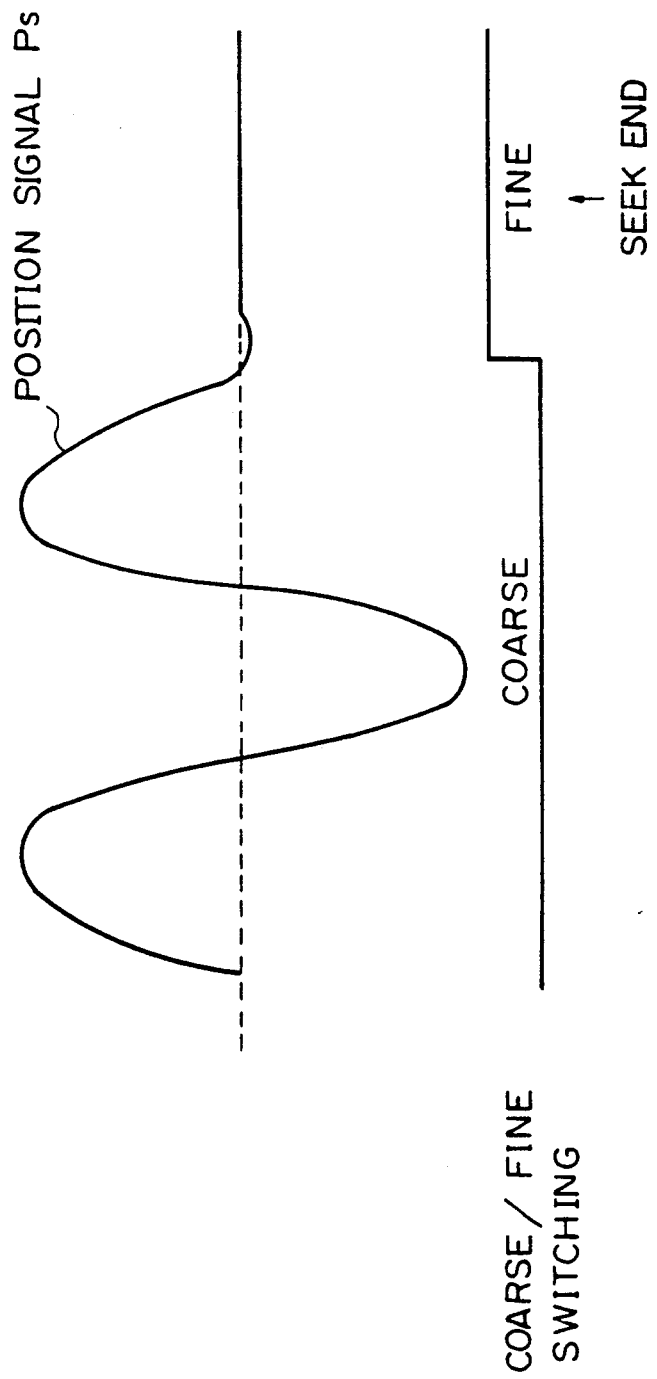

If there were no circuit offsets, as shown in FIG. 7A, then after the switching from coarse (speed control) to fine (position control) control, the position signal Ps would immediately converge to OV and the seek operation would end when the signal is not above a predetermined level (on-track level) for a predetermined time after switching to fine control. However, if a circuit offset exists, as shown in FIG. 7B, after switching to fine control, the position signal Ps used for correcting the circuit offset gradually rises. The seek operation ends when it does not go above a predetermined level for a predetermined time, but peaks are subsequently caused and the on-track level is sometimes exceeded. If the on-track level is exceeded, the servo object 11c ends up being moved more than the on-track level.

Figure 8:
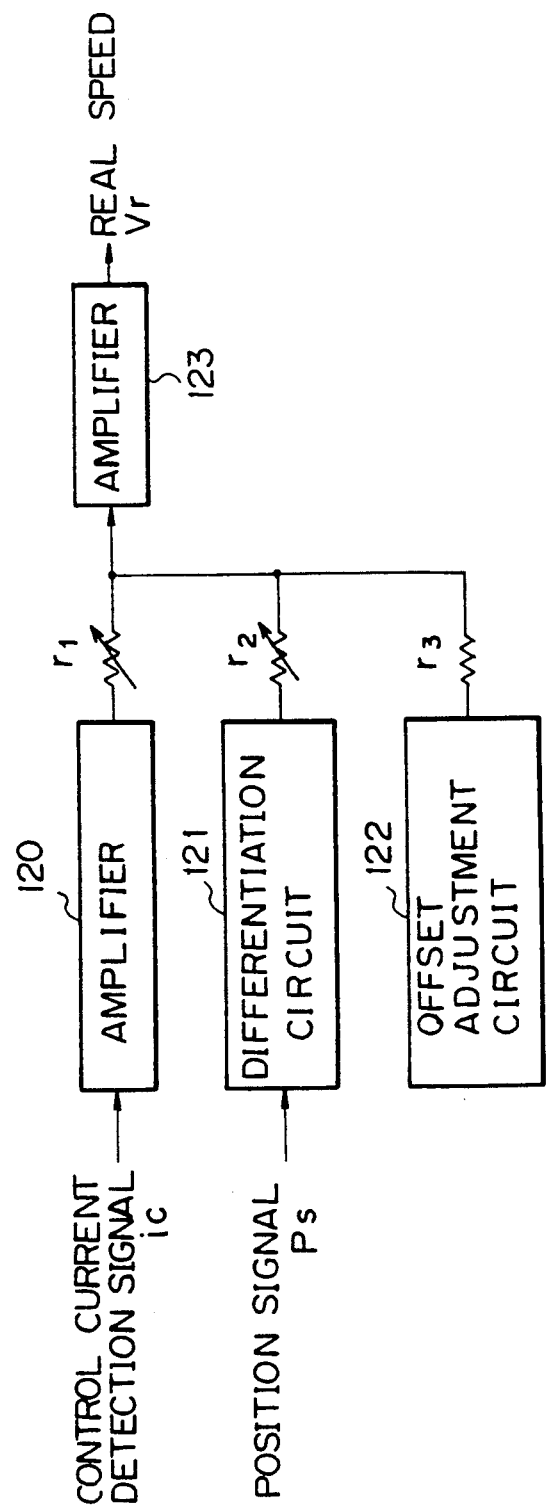
FIG. 8 is a block diagram of another speed detection circuit of a servo circuit of the related art.

Also, as mentioned earlier, the gains of the servo circuit have to be adjusted. In particular, it is necessary to suitably adjust the speed detection gain of the speed detection circuit to achieve the optimal access times and position control. Another version of the speed detection circuit 13, as shown in FIG. 8, has an amplifier 120 which amplifies the detection current ic, a differentiation circuit 121 which differentiates the position signal Pc and generates a speed component, an offset adjustment circuit 122, and an amplifier 123 which adds and amplifies the outputs. It is designed to enable the variable resistors r1 and r2 to be used to initially adjust the control current detection gain and differentiation gain.

Figures 9A, 9B:
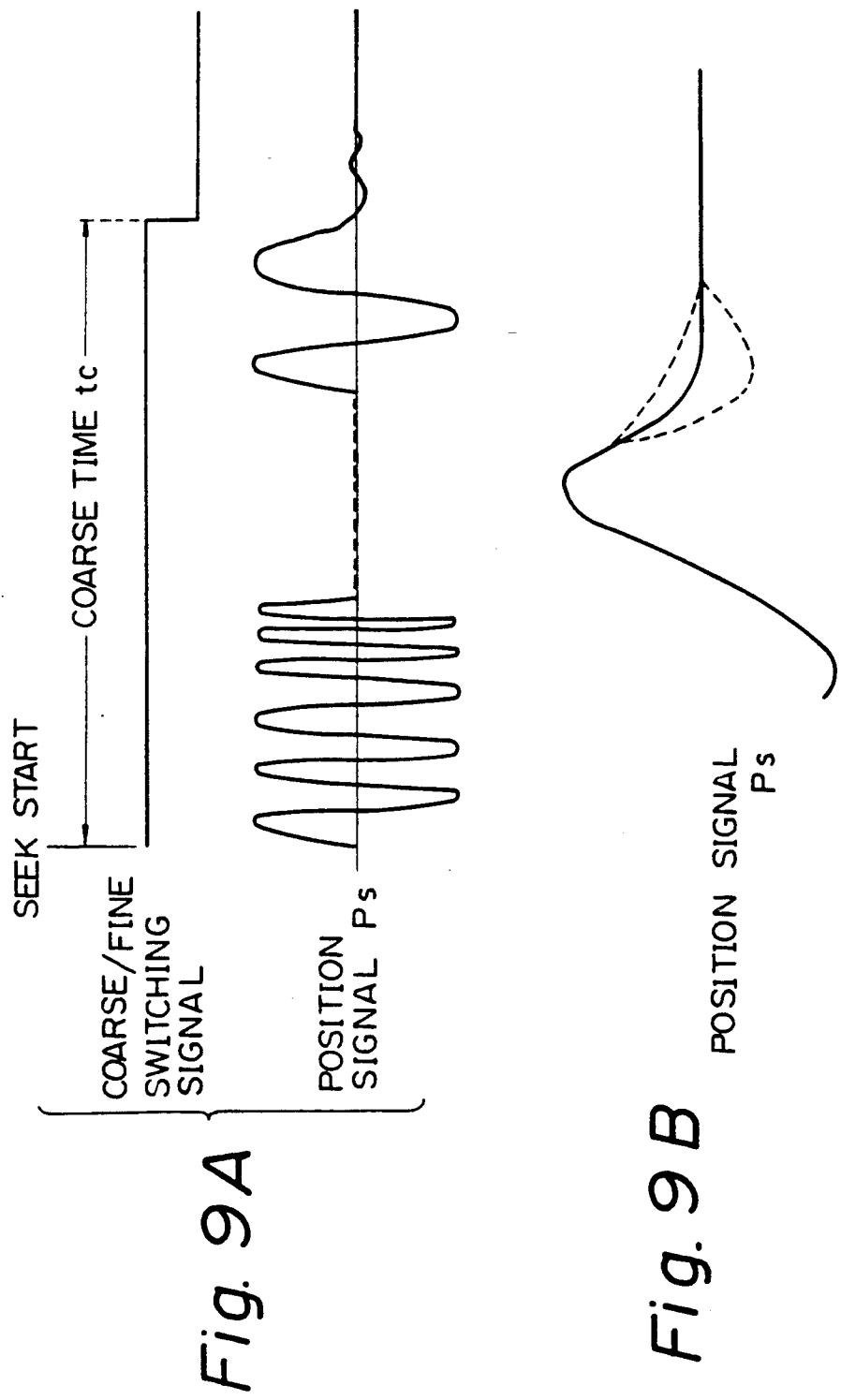
FIGS. 9A and 9B are graphs for explaining the adjustment of the speed detection gains of the related art.

FIGS. 9A and 9B are graphs for explaining the adjustment of the speed detection gains of this related art. The adjustment of the speed detection gains of the related art, i.e., the control current detection gain and differentiation gain, was performed by adjusting the variable resistor r1 while performing a seek operation and observing the position signal Ps by an oscilloscope, so as to adjust the control current gain to obtain a small overshoot and undershoot of the position signal Ps. Further, fine adjustment of the gain was performed by adjustment of the variable resistor r2 while performing a seek operation and observing the coarse/fine switching signal by an oscilloscope, so that the time tc of the coarse control (speed control) becomes within a predetermined range. As also mentioned above, the methods of the related art were to measure the operation of the servo circuit accompanying a seek operation and determine the adjustment values based on the measured values. However, problems arose when performing the seek operation without synchronization with an index signal on the servo surface. That is, the adjustment was performed by repeatedly performing a seek operation giving various adjustment values and finding the optimum adjustment value by trial and error. Thus, when the measurement positions differed in different seek operations, there was a large variation in the measurement values due to differing track positions on the servo surface etc. and measurement for accurate adjustment became difficult. This was not that great a problem when the track pitch was great, but track pitches have become smaller and along with this the effect of the disturbances in the servo pattern has grown larger, making normal adjustment impossible in some cases.

Figure 10A:
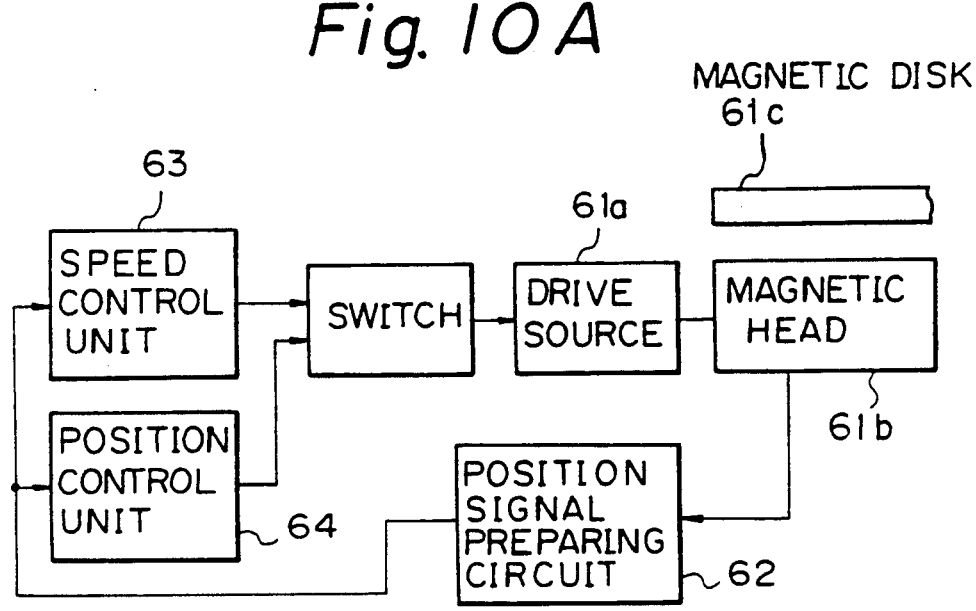
FIGS. 10A and 10B are block diagrams of the first embodiment of the present invention.
Figure 10B:
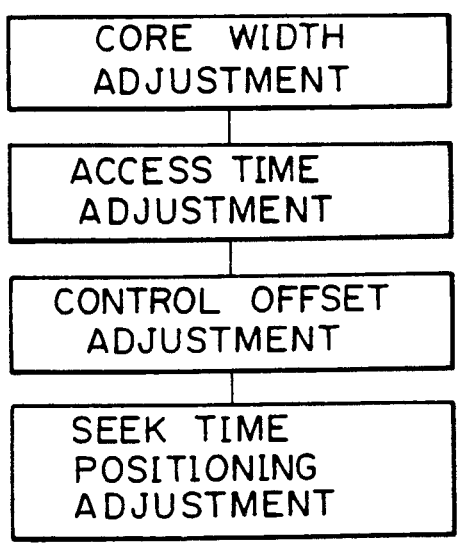

FIGS. 10A and 10B are block diagrams of the principle of the present invention.

As shown in FIGS. 10A and 10B, the first embodiment of the present invention provides an automatic adjustment system for a servo circuit of a magnetic disk apparatus having a magnetic head 61b which reads servo information of a servo surface of a magnetic disk 61c, a position signal preparing circuit 62 which prepares a position signal from the servo information of the magnetic head 61b, a speed control unit 63 which performs speed control on a drive unit 61a which moves the magnetic head 61b during a seek operation, and a position control unit 64 which performs position control on the drive unit 61a based on the position signal. The automatic adjustment system includes a core width adjustment step for monitoring the position signal while engaged in a uniform speed seek operation and adjusting a detection sensitivity of the position signal preparing circuit 62 so that an angle of slope of the position signal becomes a predetermined value. A forward-/reverse seek operation time adjustment step is provided for measuring the times of a forward seek operation and a reverse seek operation and adjusting a speed detection offset of the speed control unit 63 to give the smallest difference between the forward seek operation time and the reverse seek operation time. A position control offset adjustment step measures an integration value of the position signal during position control in a seek operation and adjusts the offset of the position control unit 64 to give the smallest integration value. A seek operation time and positioning adjustment step counts the seek operation time, adjusts a differentiation gain of the speed control unit 63 to give the smallest seek operation time, integrates the position signal, and adjusts a control current detection gain of the speed control unit 63 to give the smallest integration value.

Preferably, after the seek operation time and positioning adjustment step, the core width adjustment through the seek operation time and positioning adjustment step are again repeated.

More preferably, before the core width adjustment step, there is a target speed adjustment step of adjusting a target speed generating operation of the speed error detection circuit 63b in the speed control unit 63.

Regarding the mode of operation, first, the position signal, the basic element of the operation, is adjusted by the core width adjustment step. Then the access time is adjusted so as to minimize the time difference between the forward operation and reverse operation during speed control. Then the position control offset is adjusted, the position control system is adjusted, and finally the seek operation time and positioning are adjusted to give the minimum seek operation time. The adjustment process is completely automated and smooth automatic adjustment is made possible without causing oscillation in the system.

Therefore, the adjustment can be automated and it becomes possible to achieve adjustment with little error and at low cost. Further, by repeating the adjustment step after adjustment is once made so as to achieve fine adjustment, full automation of the adjustment becomes possible. Still further, by presetting the speed error detection circuit 13b, which can be adjusted in the static state, the seek operations for the following adjustments can be smoothly performed.

Figure 11A:
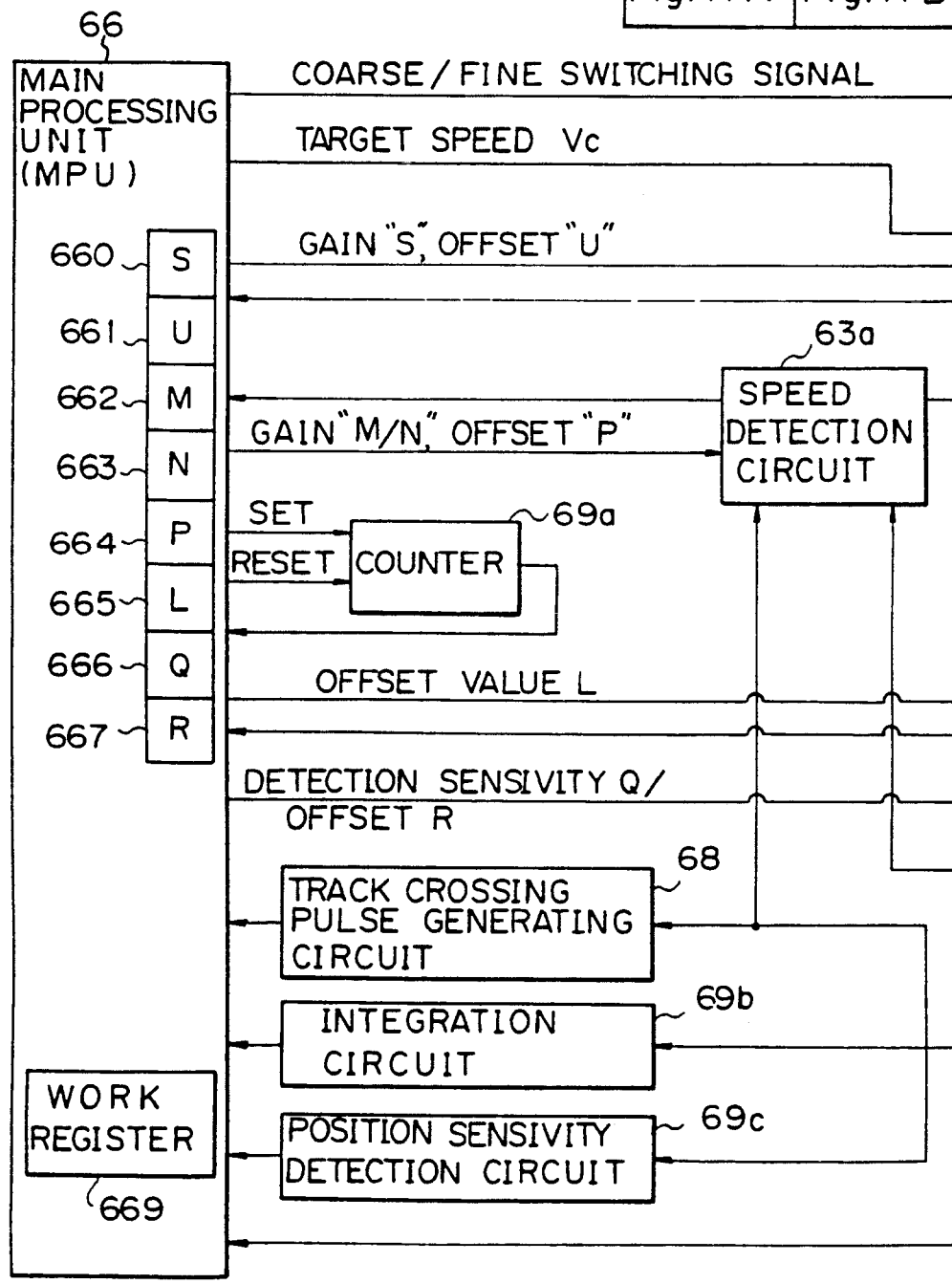
FIGS. 11A and 11B, is a block diagram of the first embodiment of the present invention.
Figure 11B:
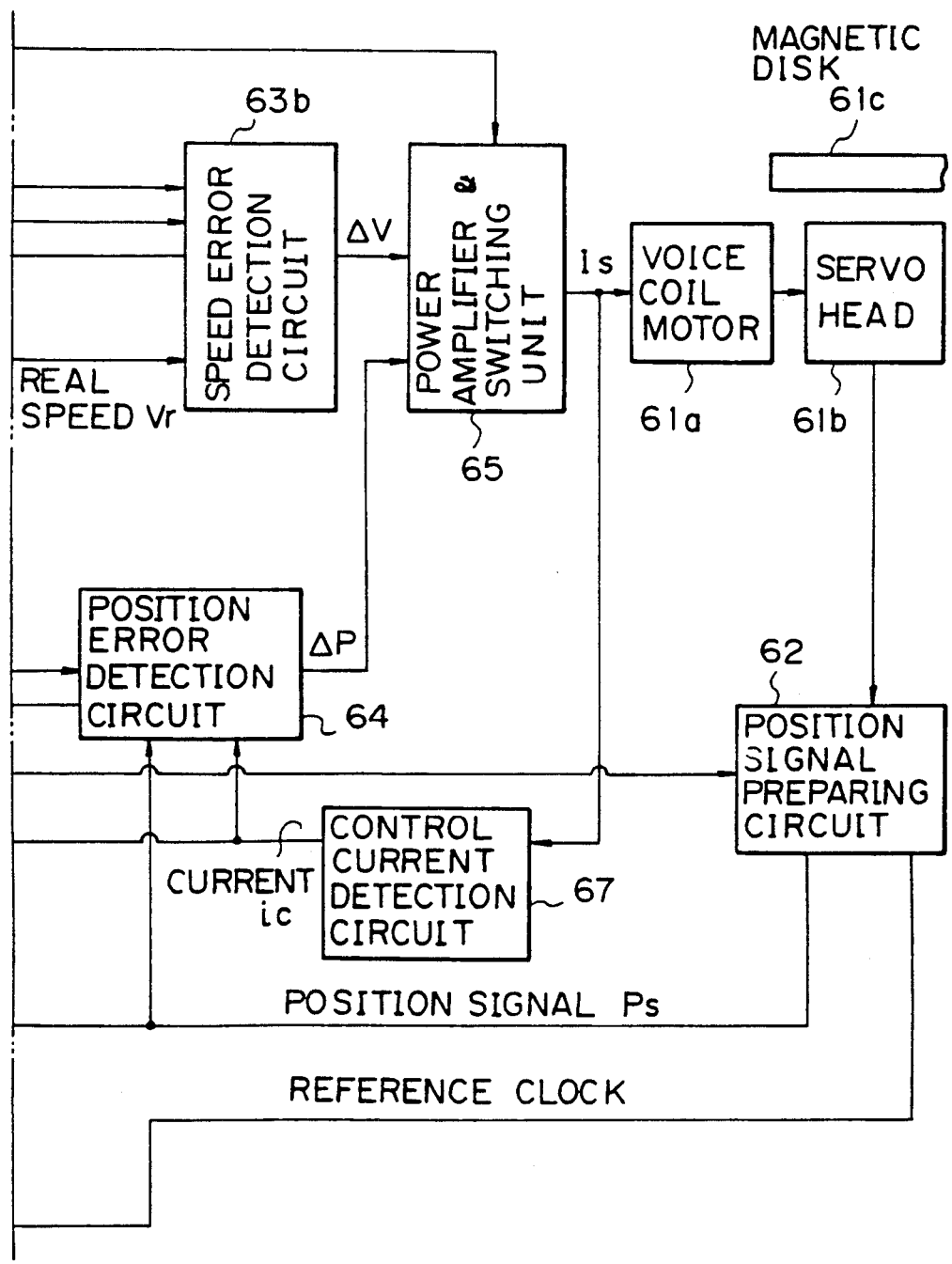
Figure 12:
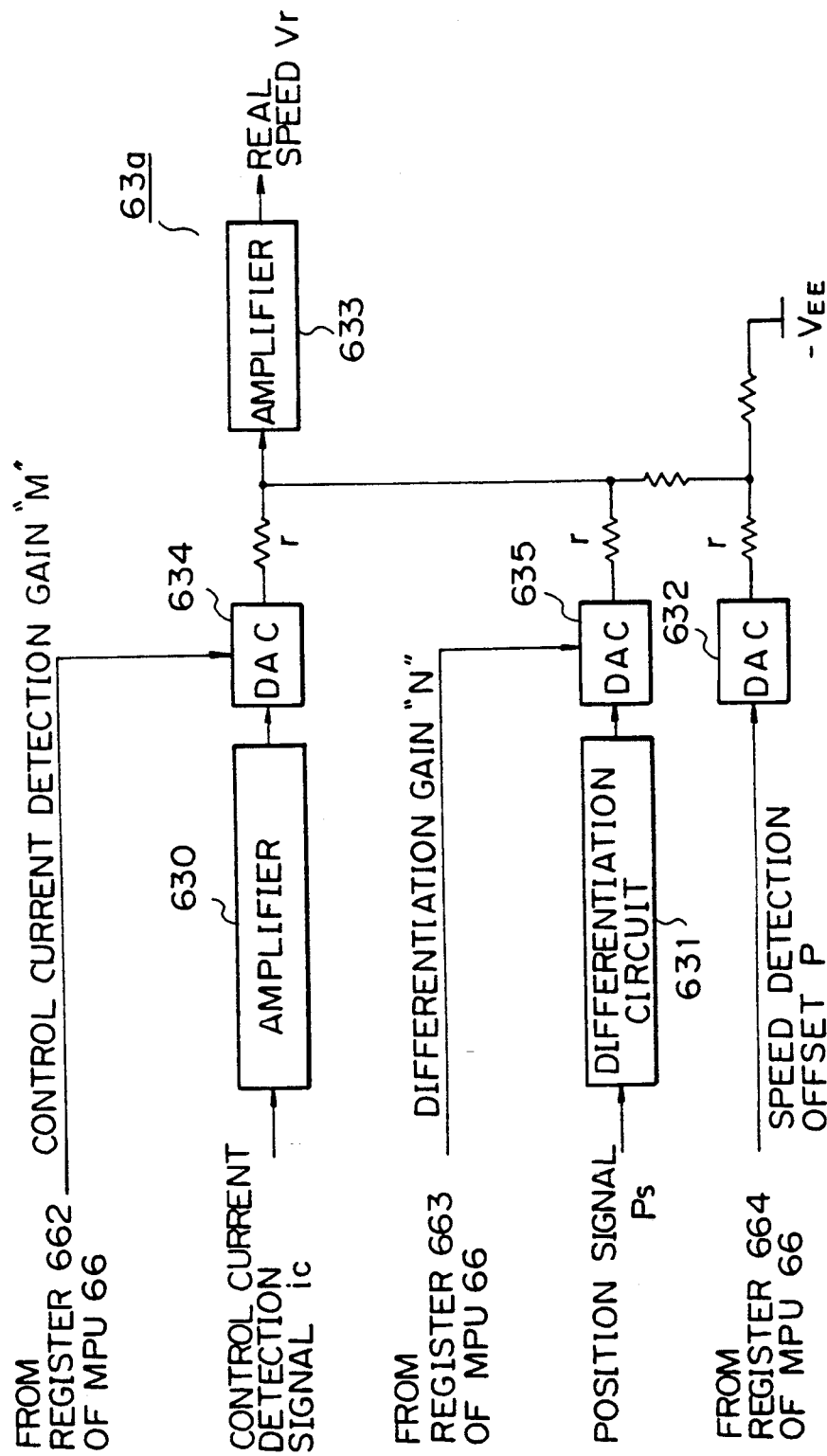
FIG. 12 is a block diagram of the speed detection circuit in FIG. 11.
Figure 13:
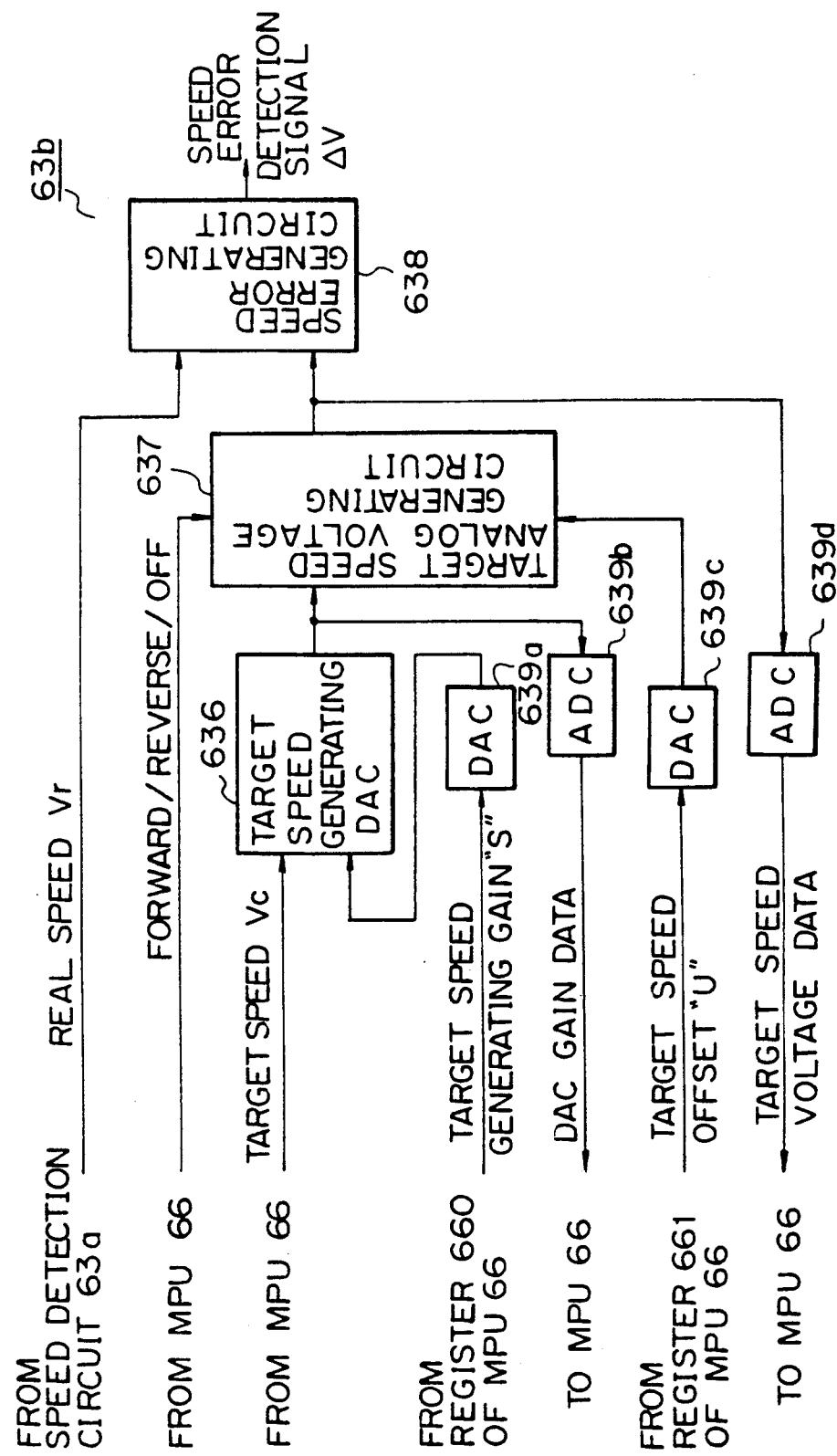
FIG. 13 is a block diagram of a speed error detection circuit in FIG. 11.
Figure 14:
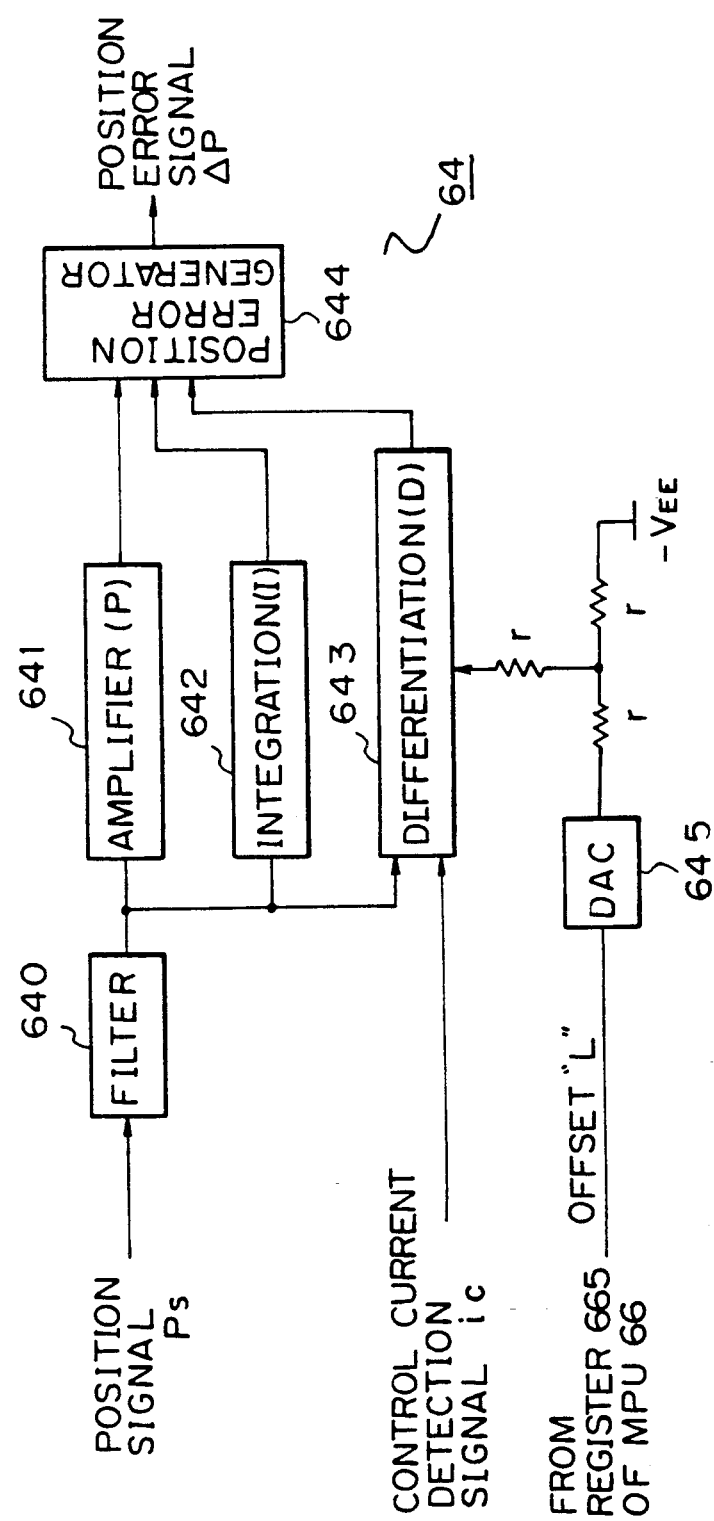
FIG. 14 is a block diagram of a position control unit in FIG. 11.
Figure 15:
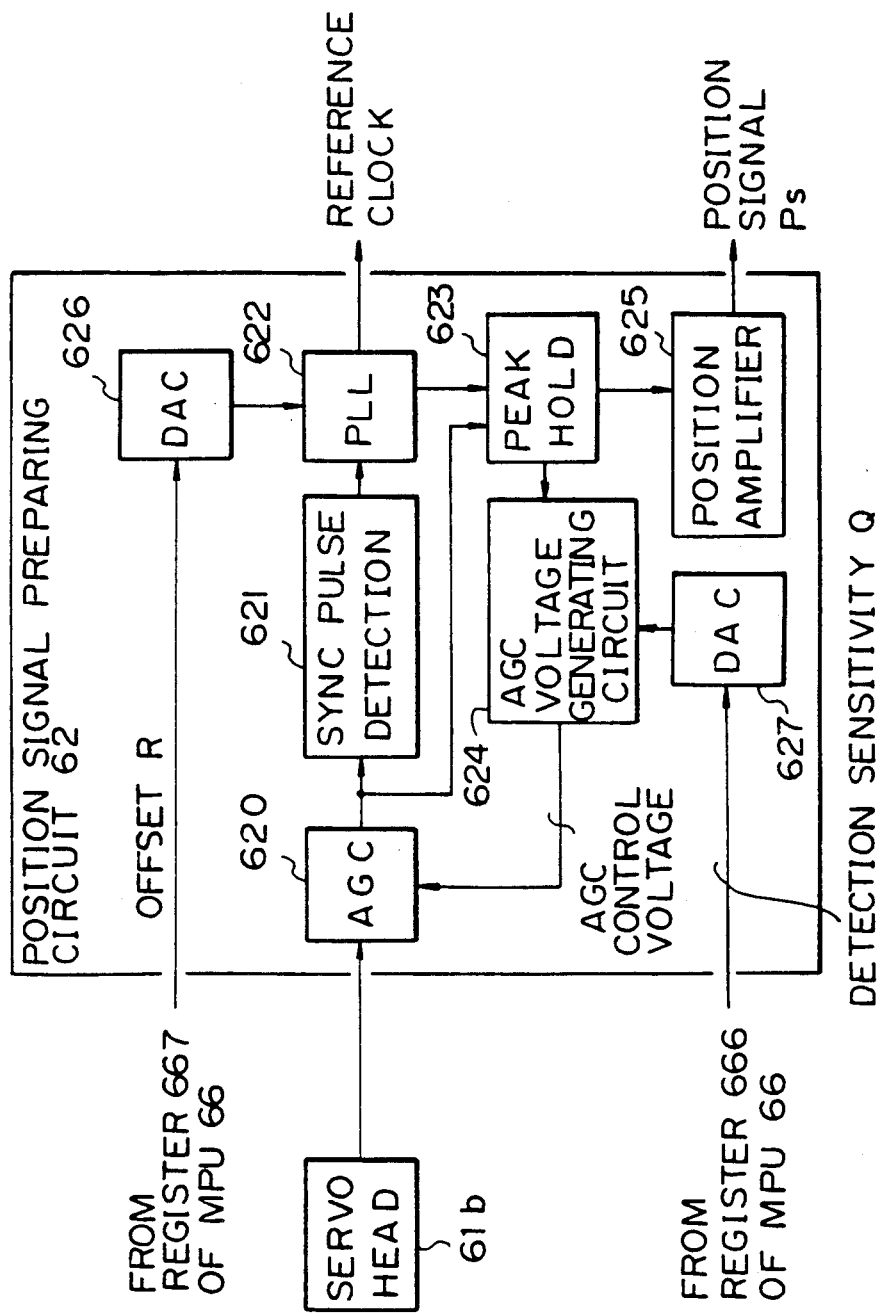
FIG. 15 is a block diagram of a position signal preparing circuit in FIG. 11.
Figure 16:
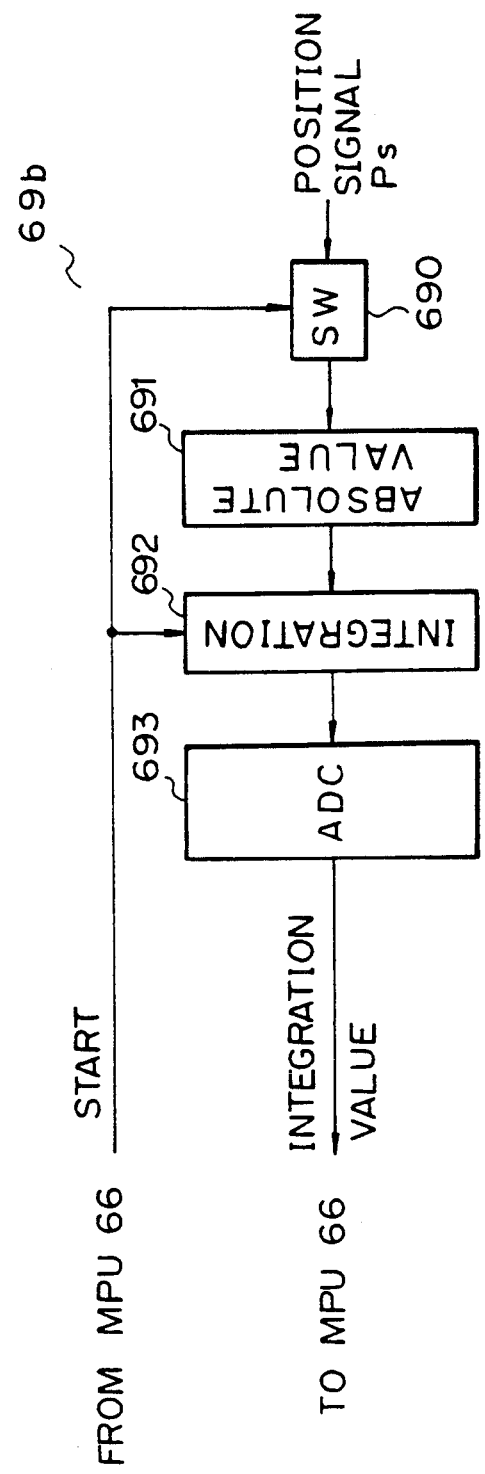
FIG. 16 is a block diagram of an integration circuit in FIG. 11.
Figure 17:
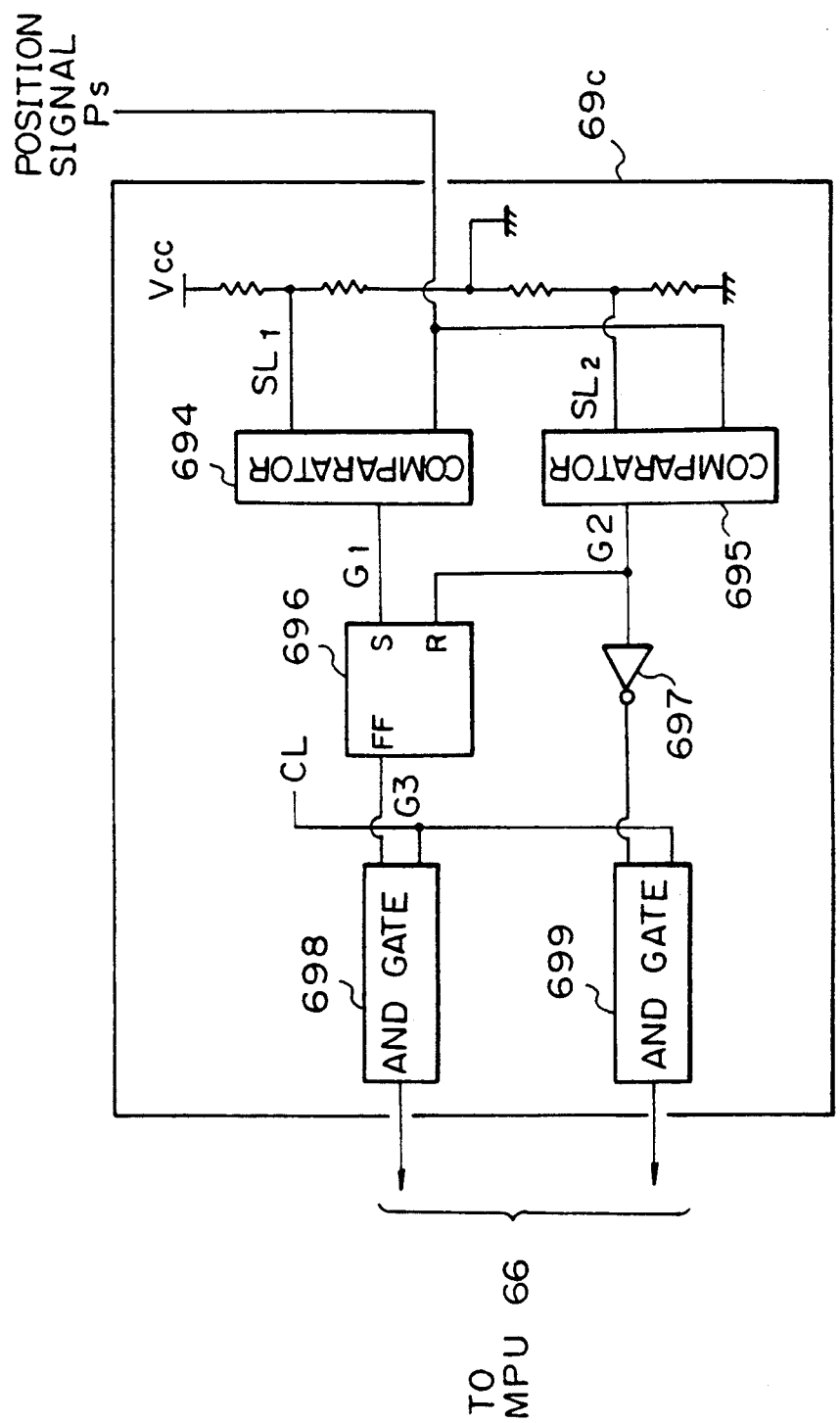
FIG. 17 is a block diagram of a position sensitivity detection circuit in FIG. 11.

FIG. 11, including FIGS. 11A and 11B, is a block diagram of a first embodiment of the present invention. FIG. 12 is a block diagram of the speed detection circuit 63a of FIG. 11. FIG. 13 is a block diagram of the speed error detection circuit 63b of FIG. 11. FIG. 14 is a block diagram of the position control unit 64 of FIG. 11. FIG. 15 is a block diagram of the position signal preparing circuit 12 of FIG. 11. FIG. 16 is a block diagram of the integration circuit of FIG. 11 and FIG. 17 is a block circuit diagram of the position sensitivity detection circuit of FIG. 11.

In the figures, portions the same as shown in FIGS. 10A and 10B and FIG. 1 are given the same reference numerals.

The position signal preparing circuit 62 in FIG. 11B, and shown in detail in FIG. 15, has an AGC circuit 620 (FIG. 15) which performs AGC control on the output of the servo head 61b, a sync pulse detection circuit 621 which detects the sync pulse from the output of the AGC circuit 620, a PLL circuit 622 which performs phase synchronization on the output of the sync pulse detection circuit 621 and generates a sync pulse (reference clock), a peak hold circuit 623 which holds the peak of the output of the AGC circuit 620 by the sync pulse of the PLL circuit 622, an AGC voltage generating circuit 624 which generates an AGC control voltage of the AGC circuit 620 from the output of the peak hold circuit 623, and a position amplifier 625 which amplifies the output of the peak hold circuit 623 and generates a position signal Ps.

Further, provision is made for a digital/analog converter DAC 626 which converts the offset adjustment value R of the main processing unit 66 to an analog value and controls the voltage control oscillator of the PLL circuit 622 for the adjustment of the reference clock. A digital/analog converter 627 is also provided which converts the detection sensitivity adjustment value Q of the main processing unit 66 to an analog value and controls the AGC control voltage of the AGC voltage generating circuit 624 for adjustment of the detection sensitivity of the position signal Ps.

The speed detection circuit 63a in FIG. 11A has, as shown in FIG. 12, an amplifier 630 which amplifies the control current detection signal ic, a differentiation circuit 631 which differentiates the position signal Ps, and an addition amplifier 633 which generates the real speed Vr.

Further, for the adjustment of the real speed Vr, digital/analog converters DAC 634 and 635 are provided which multiply the control current detection adjustment gain M and differentiation adjustment gain N output from the main processing unit 66 with the outputs from the amplifier 630 and differentiation circuit 631 and output an analog value. A digital/analog converter 632 converts the speed detection offset adjustment value P of the main processing unit 66 to an analog offset amount.

The speed error detection circuit 63b, as shown in FIG. 13, has a target speed generating digital/analog converter 636 which converts the target speed Vc from the main processing unit 66 to an analog value, a target speed analog voltage generating circuit 637 which generates a target speed analog voltage from the output of the digital/analog circuit 636, and a speed error generating circuit 638 which outputs the difference between the target speed of the target speed analog voltage generating circuit 637 and the real speed Vr of the speed detection circuit 63a as the speed error detection signal ΔV.

Further, for the adjustment of these circuits, digital/analog circuits 639a and 639c are provided which convert the target speed generating adjustment gain S and target speed offset adjustment value U from the main processing unit 66 to analog values and output them to the digital/analog circuit 636 and the target speed analog voltage generating circuit 637. The analog/digital converters 639b and 639d convert the analog outputs of the digital/analog converter 636 and target speed analog voltage generating circuit 637 into digital values and output them to the main processing unit 66.

The position control unit (position error detection circuit) 64, as shown in FIG. 14, has a filter 640 which cuts the high frequency component of the position signal Ps, an amplifier 641 which amplifies the output of the filter 640, an integration circuit 642 which integrates the output of the filter 640, a differentiation circuit 643 which differentiates the output of the filter 640 and the control current detection signal ic, and a position error generator 644 which generates a position error signal from the output of the differentiation circuit 643.

Further, for adjustment of the position control offset, provision is made for a digital/analog converter 645 which converts the offset adjustment value L from the main processing unit 66 to an analog offset amount and sets the offset of the differentiation circuit 643.

The main processing unit 66 is constructed by a microprocessor, as shown in FIG. 11A, and has, for adjustment, a register 660 which stores the target speed generating adjustment gain S, a register 661 which stores the target speed offset adjustment value U, a register 662 which stores the control current detection adjustment gain M, a register 663 which stores the differentiation adjustment gain N, a register 664 which stores the speed detection offset adjustment value P, a register 665 which stores the position control offset adjustment value L, a register 666 which stores the detection sensitivity adjustment value Q, a register 667 which stores the clock offset adjustment value R, and a work register 669.

Reference numeral 69a is a counter which is started and stopped by the main processing unit 66 and counts the seek operation time, etc.

Reference numerals 69b is an integration circuit which is turned on by the main processing unit 66. As shown in FIG. 16, the integration circuit 69b is provided with a switch 690 which passes a position signal Ps, an absolute value circuit 691 which converts the position signal Ps from the switch 690 to an absolute value, an integrator 692 which integrates the output of the absolute value circuit 691, and an analog/digital converter 693 which converts the analog output of the integrator 692 to a digital value.

Reference numeral 69c is a position sensitivity detection circuit which calculates the time ratio (slope angle) of the slope portion of the position signal Ps. As shown in FIG. 17, the position sensitivity detection circuit 69c has a pair of comparators 694 and 695 which slice the position signal Ps by slice levels SL1 and SL2 and generate gate signals G1 and G2, a flip-flop 696 which is set by the gate signal G1, is reset by the gate signal G2, and generates a gate signal G3, an inverting circuit 697 which inverts the gate signal G2, an AND gate 698 which outputs the count clock CL, and an AND gate 699 which opens by the inverted gate signal G2 of the inverting circuit 697 and outputs the count clock CL.

The overall operation of the adjustment processing will now be explained.

Figure 18A:
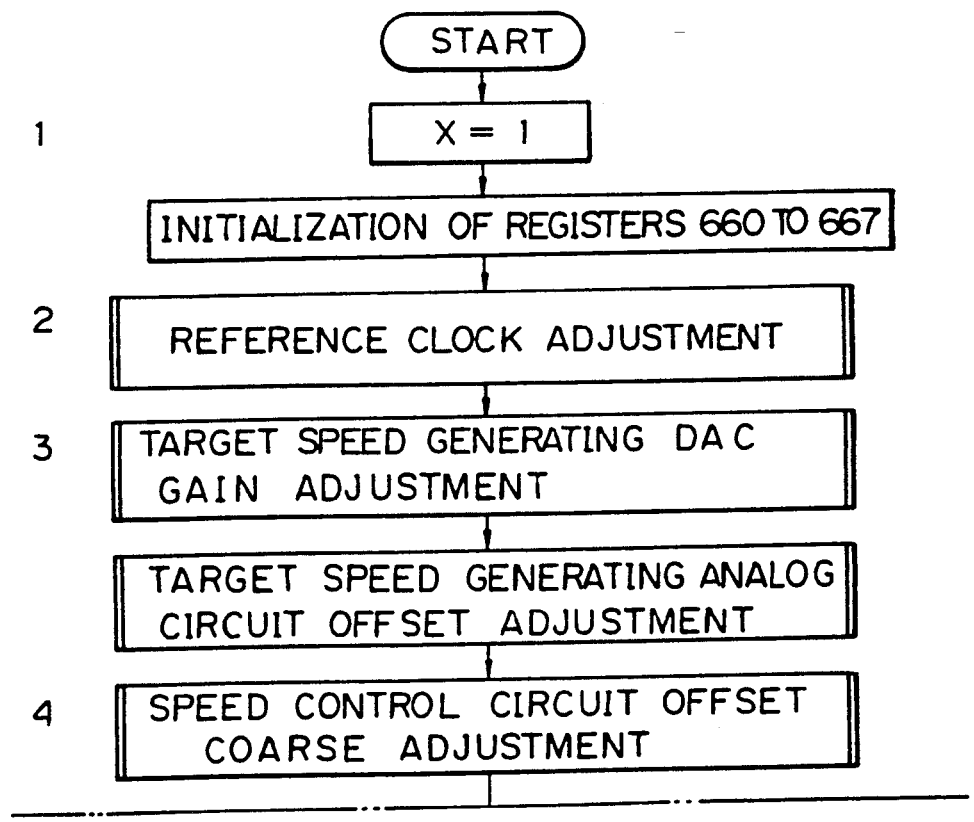
FIGS. 18A and 18B, is a flow chart of the processing for overall adjustment of the first embodiment of the present invention.
Figure 18B:
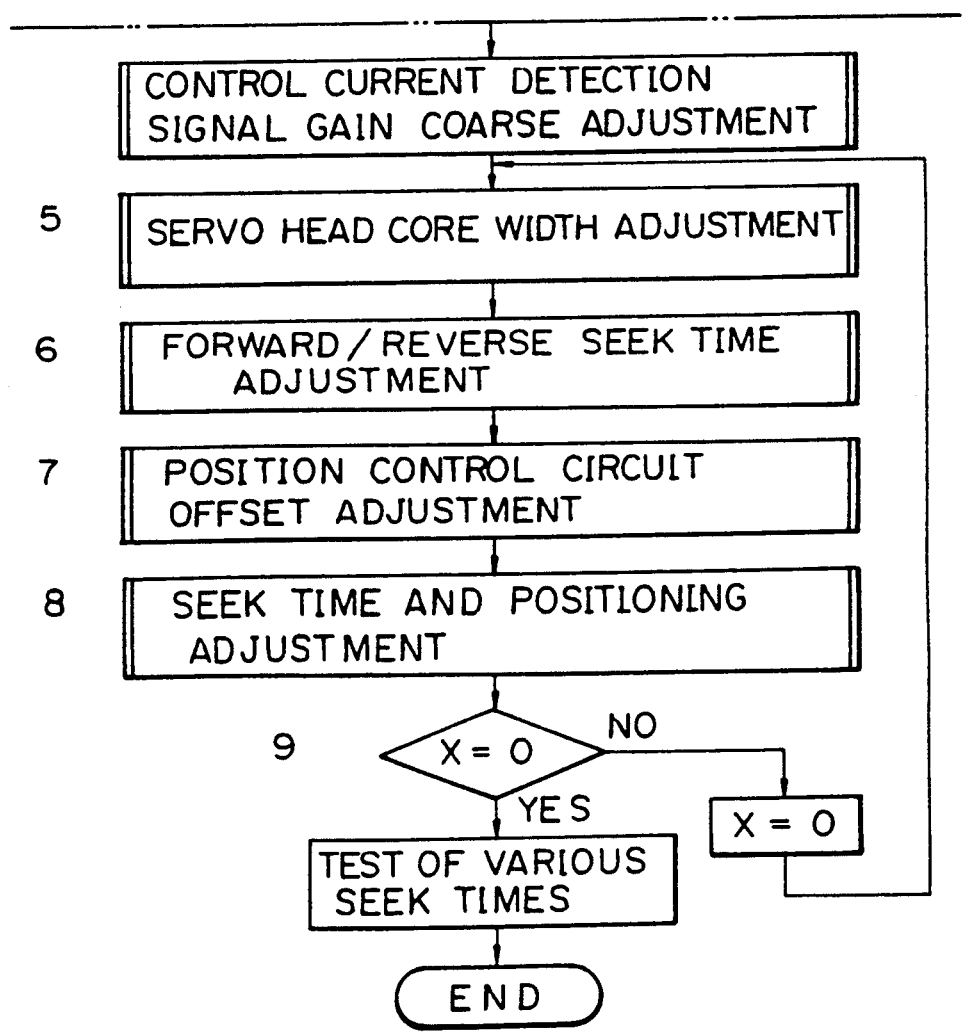
Figure 19A:
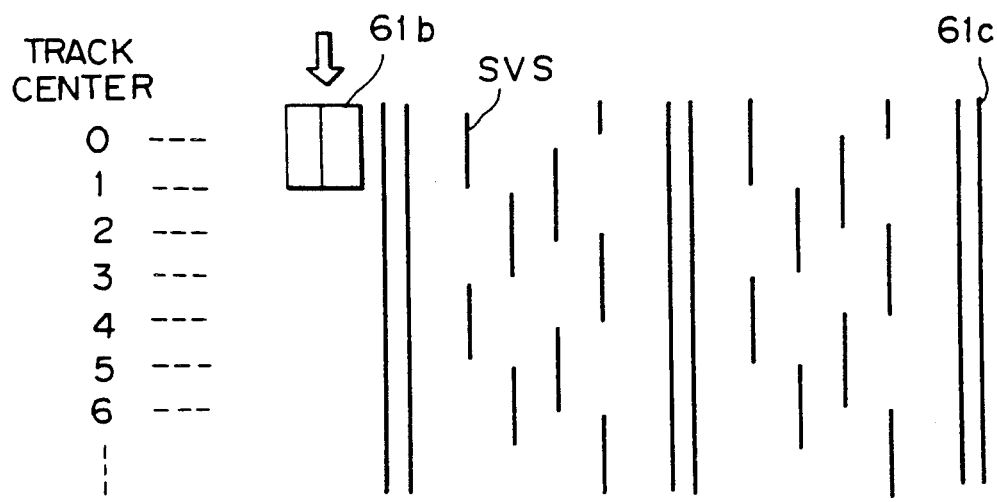
FIGS. 19A to 19C are diagrams for explaining the adjustment of the core width in FIG. 18.
Figure 19B:
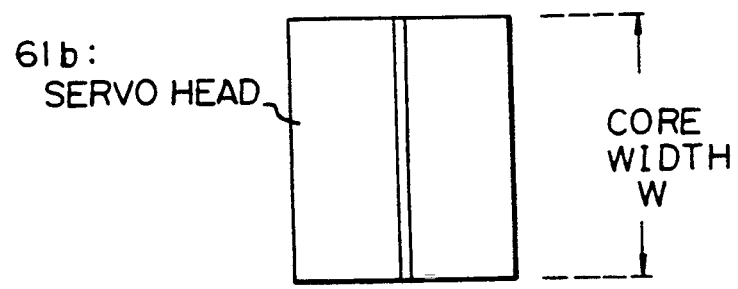
Figure 19C:
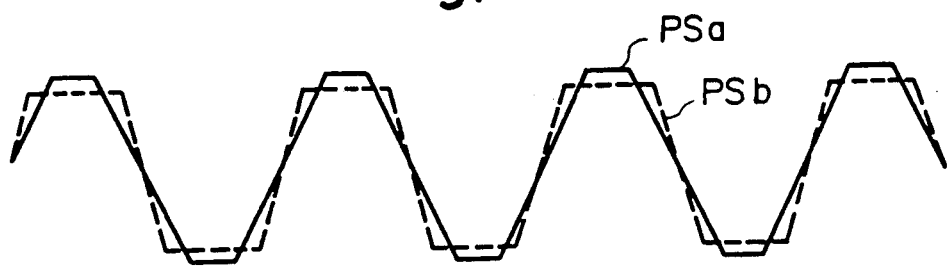
Figure 20:
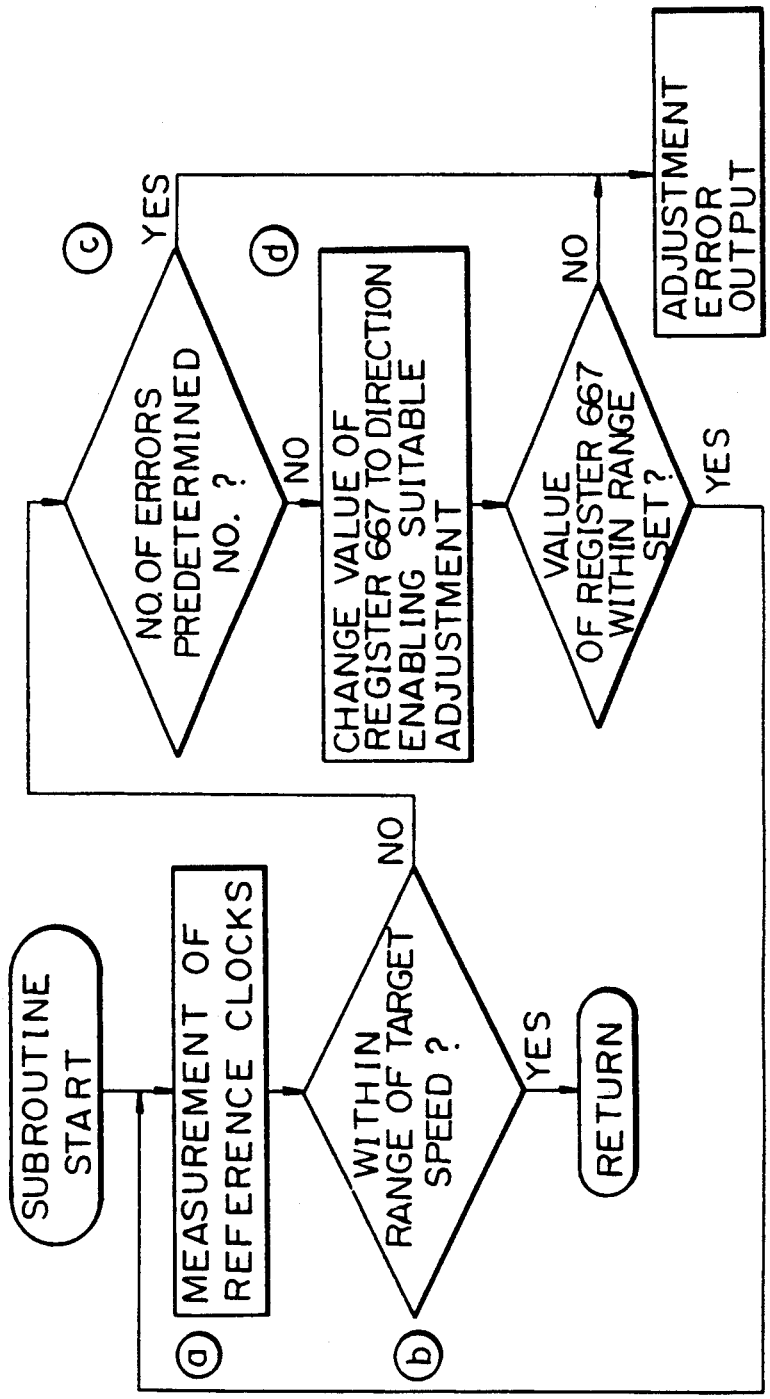
FIG. 20 is a flow chart of the processing for adjustment of a reference clock in FIG. 18.
Figure 21:
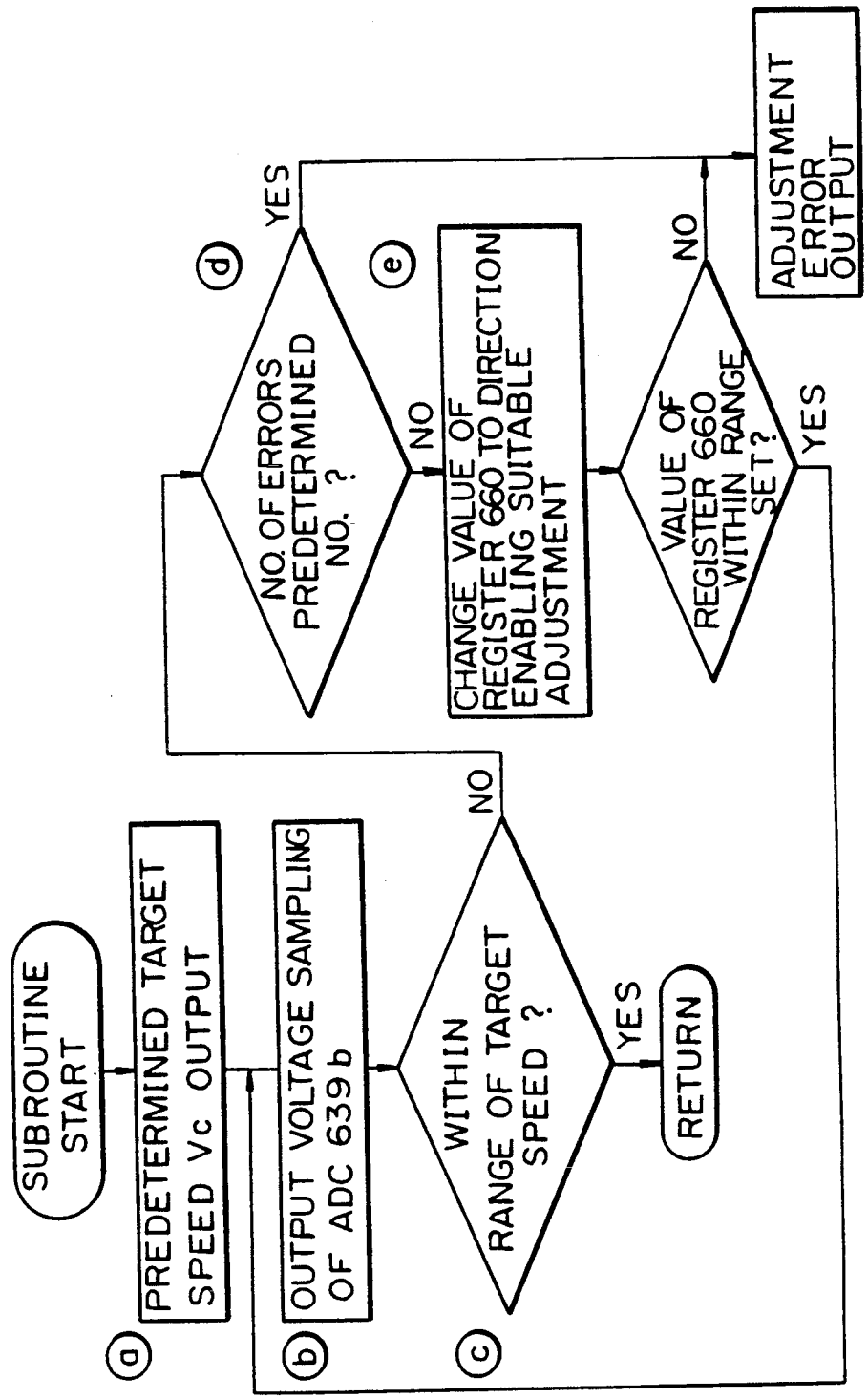
FIG. 21 is a flow chart of the processing for adjustment of a DAC gain for generating a target speed in FIG. 18.

FIG. 18, including FIGS. 18A and 18B, is a flow chart of the processing for overall adjustment of the first embodiment of the present invention. FIGS. 19A-19C are diagrams explaining the core width adjustment. FIG. 20 is a flow chart explaining the position control offset. FIG. 21 is a flow chart explaining the adjustment of the speed detection system. The adjustment processing is as follows:

(1) The main processing unit 66, upon the start of the adjustment, sets the number of repetitions X of the work register 669 to "1" and sets the predetermined initial adjustment values in the registers 660 to 667.

(2) Next, the main processing unit 66, as explained in detail in FIG. 20, changes the clock offset adjustment value R of the register 667, counts the reference clocks of the PLL circuit 622 of the position signal preparing circuit 62, and adjusts the reference clocks.

That is, the main processing unit 66 initially adjusts the clocks upon which the circuit system is based.

(3) Next, the main processing unit 66, as explained in detail in FIG. 21, changes the target speed generating adjustment gain S of the register 660, observes the output of the target speed generating digital/analog converter 636 of the speed error detection circuit 63b, and adjusts the adjustment gain S.

Figure 22:
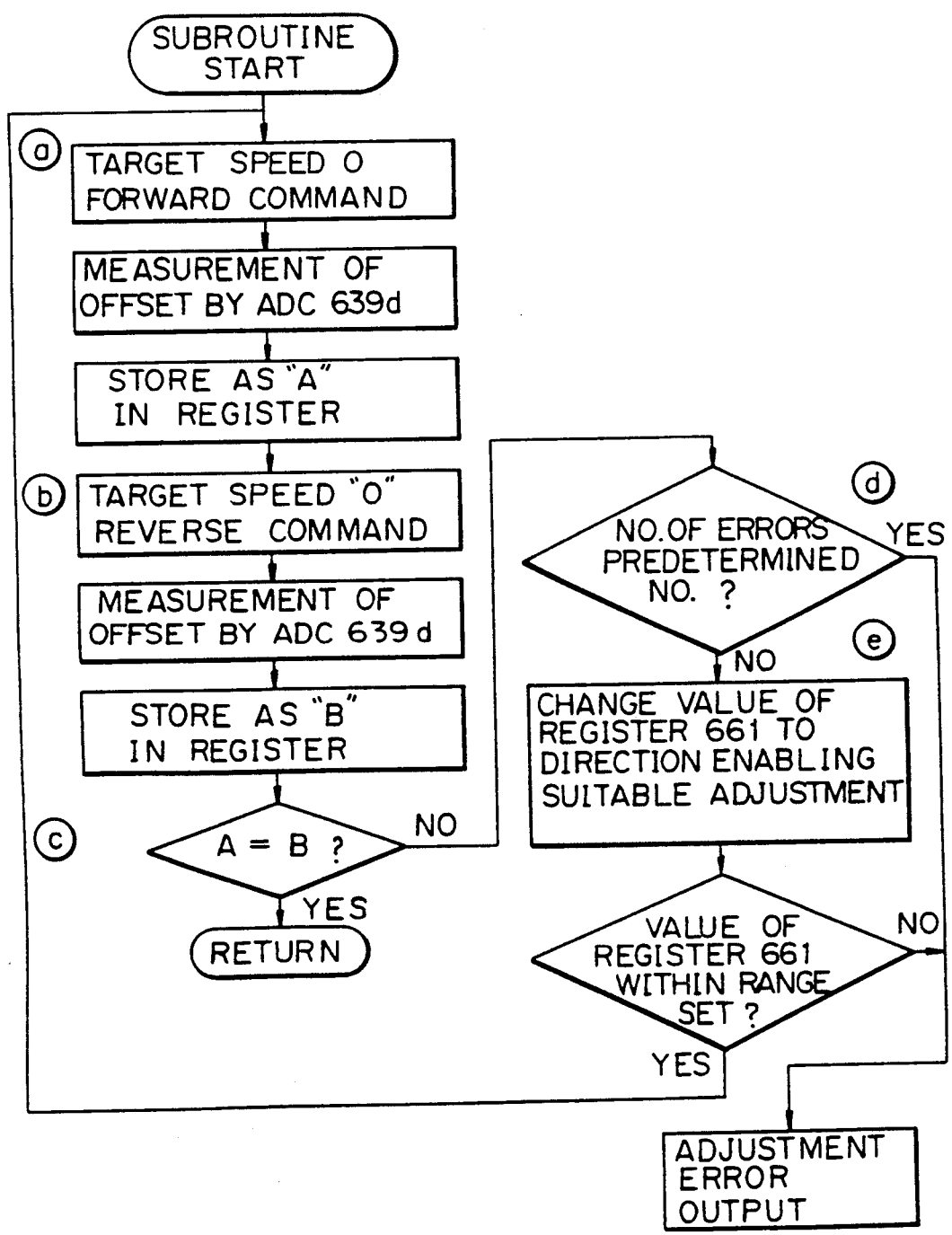
FIG. 22 is a flow chart of the processing for adjustment of a target speed generating analog circuit offset in FIG. 18.

Further, the main processing unit 66, as mentioned in detail in FIG. 22, changes the target speed offset adjustment value U of the register 661, observes the output of the target speed analog voltage generating circuit 637, and adjusts the circuit offset.

This allows the analog system circuits to be adjusted in advance in the static state.

(4) Next, the gain and offset of the speed detection circuit 63a are adjusted.

Figure 23:
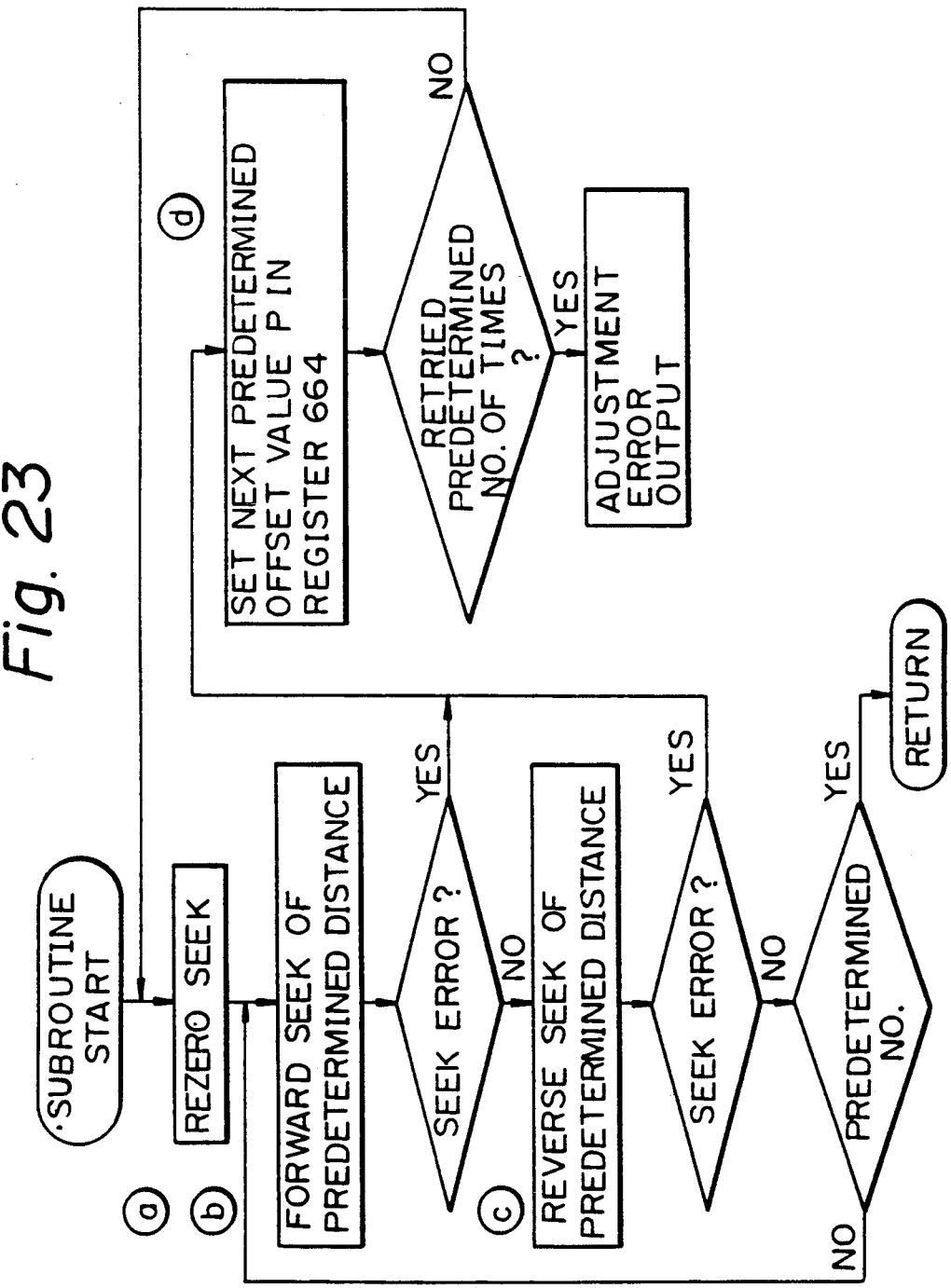
FIG. 23 is a flow chart of the processing for coarse adjustment of an offset in FIG. 18.

First, the main processing unit 66, as explained in detail in FIG. 23, changes the speed signal offset adjustment value P of the register 664, performs the seek operation, and performs coarse adjustment to the offset adjustment value P which will not cause a seek operation error.

Figure 24:
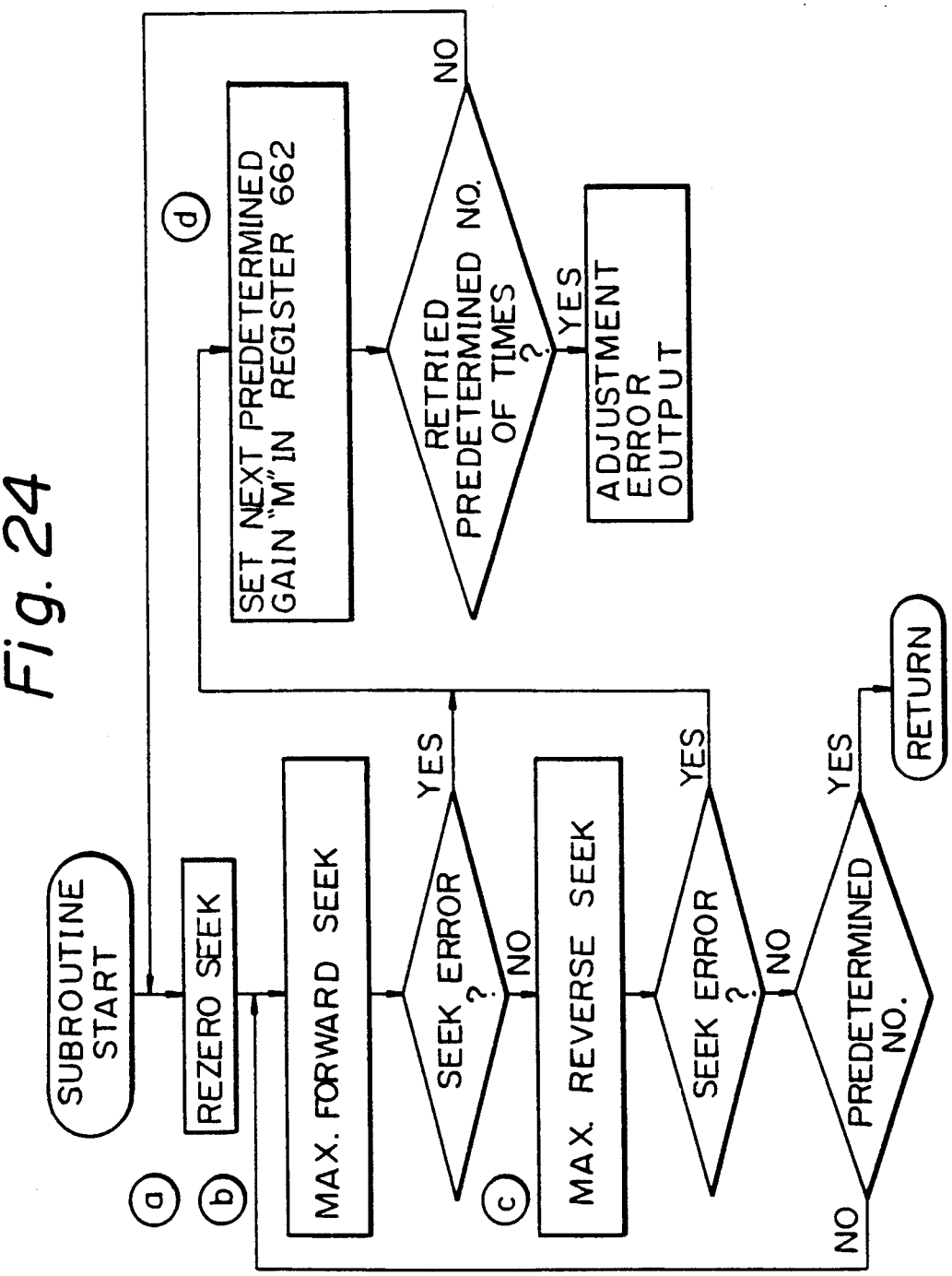
FIG. 24 is a flow chart of the processing for coarse adjustment of a gain in FIG. 18.

Next, the main processing unit 66, as explained in detail in FIG. 24, changes the adjustment gain M of the register 662, performs the seek operation, and performs coarse adjustment to the control current detection adjustment gain M in which no seek operation error will occur.

By this, smooth adjustment free from seek operation error is guaranteed in the subsequent adjustments accompanying the seek operation.

This ends the advance adjustment.

Figure 25:
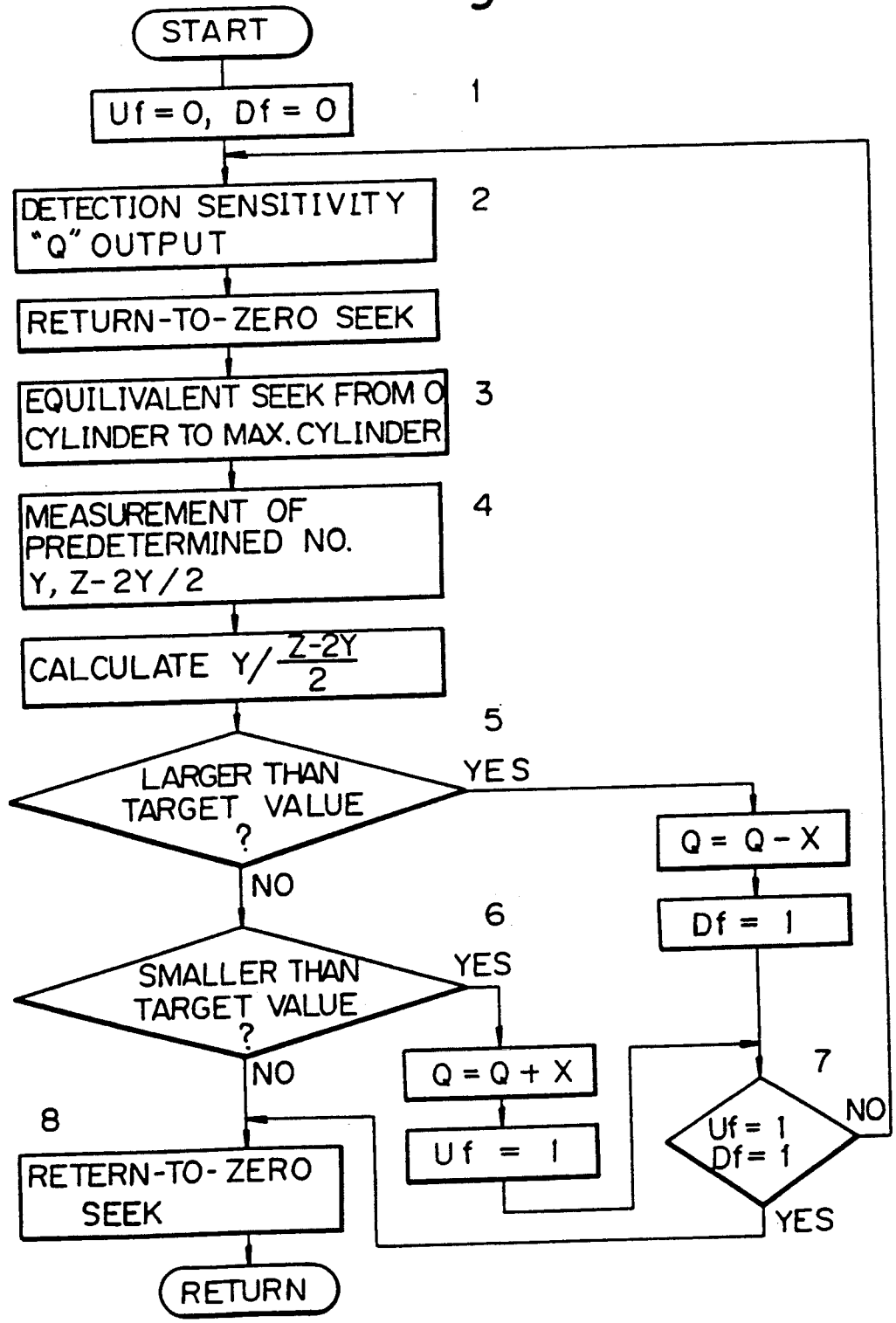
FIG. 25 is a flow chart of the processing for adjustment of a core width in FIG. 18.

(5) Next, the main processing unit 66, as explained in detail in FIG. 25, adjusts the core width of the servo head.

This adjustment of the core width will be explained with reference to FIGS. 19A to 19C.

FIGS. 19A to 19C are diagrams for explaining the adjustment of core widths. As shown in FIG. 19A, different phase servo patterns SVS are written around the tracks on the servo surface of the magnetic disk 61c. The servo head 61b reads the servo patterns SVS. As shown in FIG. 19B, the core width of the servo head 61b is usually set to about twice the dimension of the usual head. In recent years, however, along with the increasingly larger track densities, the width has become smaller. Therefore, fluctuations in the core width of the servo head 61b have become larger.

On the other hand, the servo head 61b moves at a uniform speed from the 0 track as shown in FIG. 19A, and the position signal preparing circuit 62 prepares a position signal Ps from the read signal of the servo pattern of the servo head 61b as shown in FIG. 19C. At this time, any variation in the core width will have an effect on the waveform of the position signal Ps. When the core width is large, the slope becomes large and the wave height becomes large as shown by the solid line PSa. When the core width is small, the slope becomes small and the wave height becomes small, as shown by the dotted line PSb.

This difference in the slope has an effect on the servo control operation since the position signal Ps is differentiated to prepare the real speed Vr and the position error signal. Therefore, it is necessary to perform adjustment so as to provide a position signal Ps with a desired waveform not affected by any variation of the core width of the servo head 61b.

For the adjustment, as explained in detail in FIG. 25, the main processing unit 66 slices the position signal Ps and prepares the gate signals while making the magnetic head 61b perform a uniform speed seek operation, calculates the time ratio of the slope portion of the position signal from the gate signal, and changes the detection sensitivity Q of the position signal preparing circuit 62 so that the time ratio of the measured slope portion becomes a predetermined value.

This adjusts the position signal, which is a basic control element.

(6) Next, the main processing unit 66, as explained in detail in FIG. 27, performs adjustment so that the forward seek operation and reverse seek operation times (access times) match.

The adjustment of the access times is performed since even if the same distance is moved, the access times in the forward direction and reverse direction differ due to the circuit offset and the offset of the voice coil motor 61a.

Therefore, the main processing unit 66 changes the speed detection offset adjustment value P of the speed detection circuit 63a, measures the access time in a forward direction of movement and the access time in reverse direction of movement by a counter, and finds the offset adjustment value P giving the minimum difference between the forward direction access time and the reverse direction access time.

Figure 29:
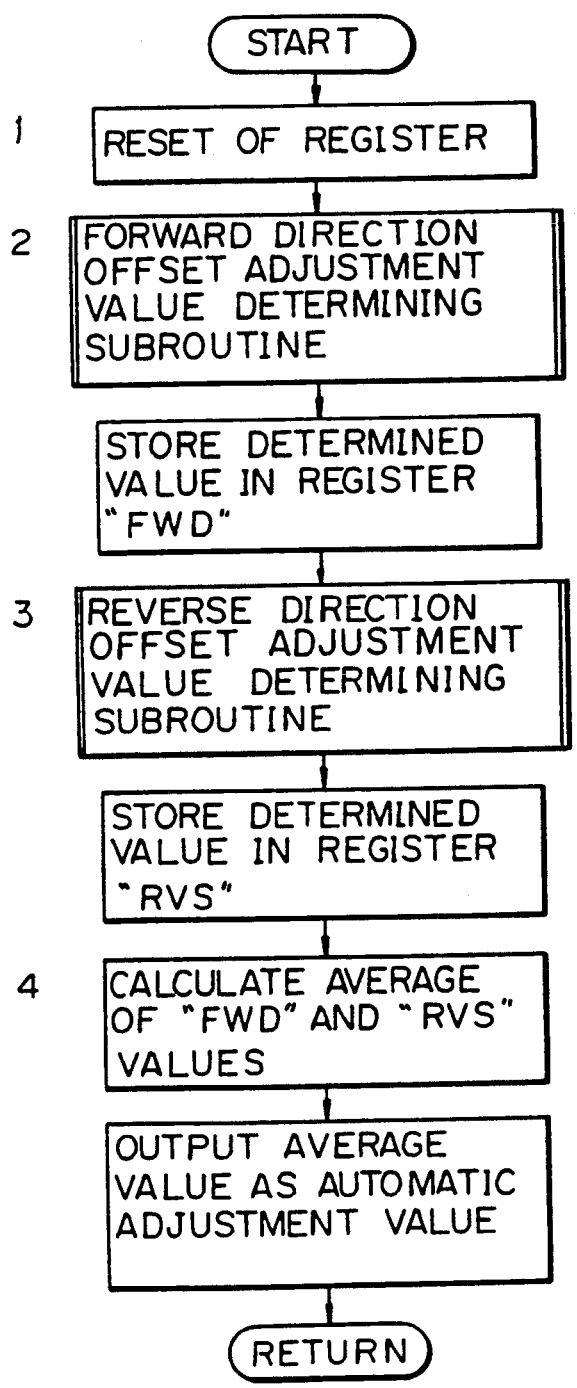
FIG. 29 is a flow chart of the processing for adjustment of a position offset in FIG. 18.
Figure 30:
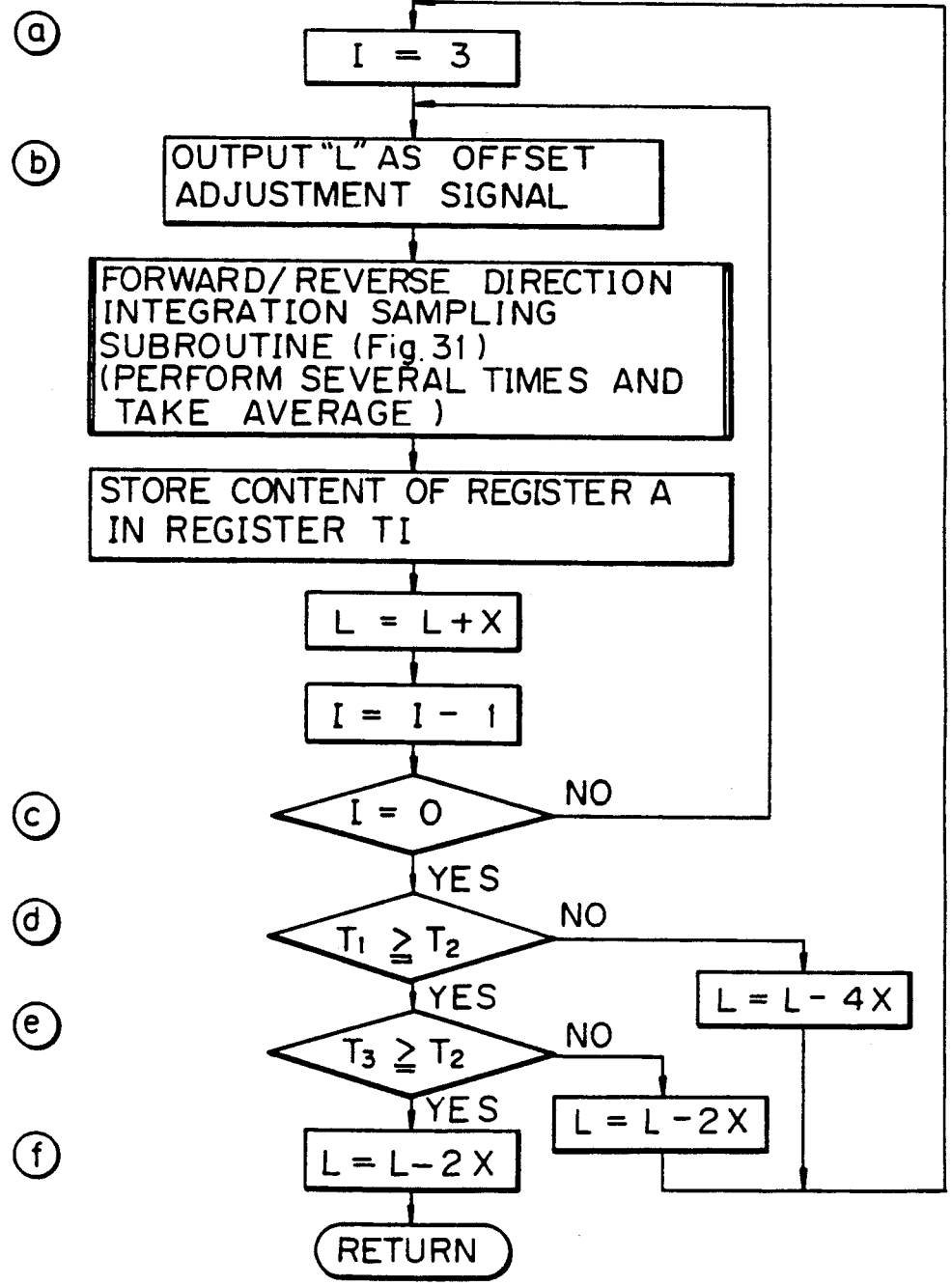
FIG. 30 is a flow chart of the processing for determination of an offset adjustment value in FIG. 29.
Figure 31:
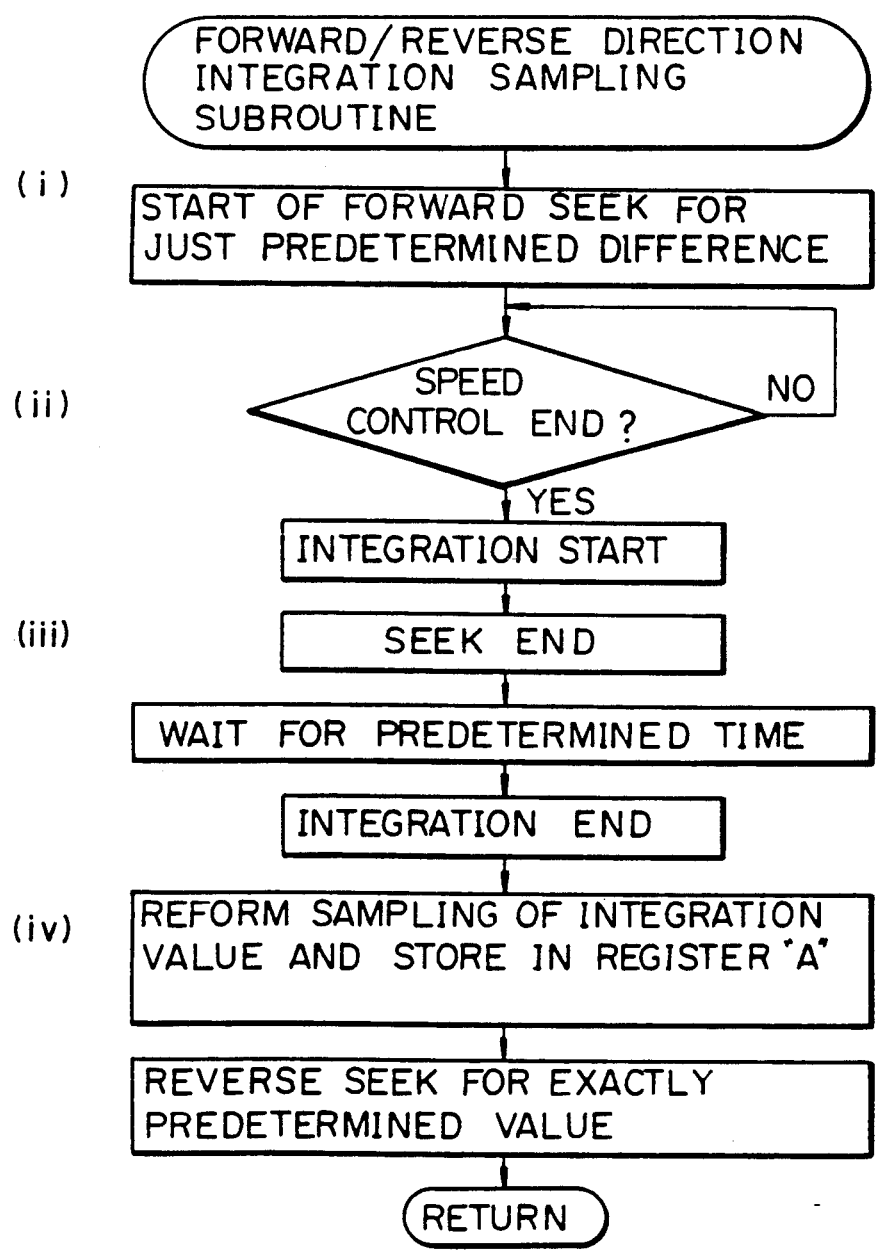
FIG. 31 is a flow chart of the processing for integration sampling in FIG. 30.

(7) Next, the main processing unit 66, as explained in detail in FIGS. 29 to 31, performs adjustment of the position control circuit offset.

The significance behind this offset adjustment is as follows. As mentioned earlier, the position control system is constructed of analog circuits, so circuit offset inevitably occurs. In particular, the offset of the current feedback system is large. For example, the effects of the offset of the amplifier of the control current detection circuit 67 are large. If there were no circuit offset, as shown in FIG. 7A, then after switching from coarse (speed control) to fine (position control) control, the position signal Ps would immediately converge to 0V and the seek operation would end when the signal would not go above a predetermined level (on track level) for a predetermined time after switching to fine control.

However, if a circuit offset exists, a shown in FIG. 7B, after switching to fine control, the position signal Ps used for correcting the circuit offset gradually rises. The seek operation ends when it does not go above a predetermined level for a predetermined time, but peaks are subsequently caused and the on-track level sometimes exceeded. If the on-track level is exceeded, the magnetic head 61b ends up moved more than the on-track level by the motor 61a.

As the adjustment for this, the main processing unit 66 changes the offset adjustment value L input to the position control unit 64, repeats a predetermined distance of movement, calculates the integration value of the position signal during position control at different offset adjustment values L, and sets the offset adjustment value giving the smallest integration value as the optimum offset value.

(8) The main processing unit 66 then performs adjustment of the seek operation time and positioning to shorten the seek operation time.

For this adjustment, the main processing unit 66 changes the differentiation gain N of the speed detection circuit 63a, repeats a predetermined distance of movement, calculates the time of continuous speed control at the various differentiation gains N by a counter, and finds the differentiation gain N giving the optimal time of continuous speed control from the times of measured continuous speed control. Then, the main processing unit 66 changes the control current detection gain M of the speed detection circuit 63a, repeats a predetermined distance of movement, measures the integration value of the position signal at least after the start of the position control at the different control current detection gains M, and finds the control current detection gain giving the smallest integration value of the integration values measured.

That is, as shown in FIG. 9A, the access time (time of continuous speed control) tc is changed by the differentiation gain N. Therefore, the differentiation gain N is changed and the time of continuous speed control at the different differentiation gains N (coarse time) is measured by a counter to find the differentiation gain N of the optimal time of continuous speed control.

Next, as shown in FIG. 9B, the waveform of the position signal Ps before coarse/fine switching is changed by the control current detection gain M and has an effect on the position error signal ΔP after the fine control.

This position signal Ps preferably converges to zero right after the start of the fine control. Therefore, the main processing unit 66 integrates the position signal Ps, finds the control error, and finds the control current detection gain M giving the smallest integration value. This optimizes the waveform of the position signal Ps giving the smallest positioning time.

(9) After this adjustment, the main processing unit 66 investigates if the number of repetitions X is "0". If not "0", then it considers that X=0, returns to step (5), repeats the adjustment after step (5), and readjusts the whole.

On the other hand, if X=0, that is, the repetition of the adjustment of the steps (5) to (8) is ended, the main processing unit 66 performs various kinds of seek operations, tests if the seek operation times are within prescribed limits, and ends the processing.

In this way, the clock adjustment (step (2)) and adjustment of the target speed generating circuit (step (3)), which do not require a seek operation, are performed in advance. Then coarse adjustment (step (4)) for preventing seek operation errors in the seek operation is performed and only then is fine adjustment (steps (5) to (8)) accompanying the seek operation performed.

An explanation will now be made of the advance adjustment operation.

FIG. 20 is a flow chart of the processing for the adjustment of the reference clock of FIG. 18.

(a) When the subroutine is started, the main processing unit 66 counts the reference clocks of the position signal preparing circuit 62 for a fixed term.

(b) Next, the main processing unit 66 investigates if the count is within a target set range. If within the target set range, it ends the subroutine at the end of the clock adjustment and returns to the start.

(c) On the other hand, if the count is not within the target set range, the main processing unit 66 increments the number of errors (number outside target set range) by "+1", and judges if the number of errors is a predetermined number. If the number of errors is the predetermined number, the adjustment error output is generated and the routine ends.

(d) On the other hand, if the number of errors is not the predetermined number, the main processing unit 66 changes the clock offset value R of the register 667 to a direction where suitable adjustment is possible.

Then, the main processing unit 66 investigates if the offset value R of the register 667 is within a set range. If outside the set range, it generates an adjustment error signal and ends the routine. If in the set range, it returns to step (a).

In this way, the main processing unit 66 changes the oscillation frequency of the PLL circuit 622 (FIG. 15) of the position signal preparing circuit 62 by the clock offset value R and adjusts the reference clocks to a predetermined range.

FIG. 21 is a flow chart of the processing for adjustment of the gain of the target speed generating digital/analog converter of FIG. 18.

(a) The main processing unit 66 outputs the predetermined target speed Vc to the target speed generating digital/analog converter 636 (FIG. 13) and turns off the target speed analog voltage generating circuit 637 (FIG. 13) so that the voice coil motor 61a does not move.

(b) The main processing unit 66 obtains, by sampling the output of the analog/digital converter 639b (FIG. 13), the output of the target speed generating digital/analog converter 636.

(c) The main processing unit 66 investigates if the sampling value is within a target set range. If the sampling value is within the target set range, it ends the subroutine considering the adjustment to be ended and returns to the start.

(d) On the other hand, if the sampling value is not in the target set range, the main processing unit 66 increments the number of errors (number outside set range) by "+1" and determines if the number of errors has become a predetermined number. If the number of erros has become the predetermined number, it generates an adjustment error signal and ends the routine.

(e) On the other hand, if the number of errors has not reached the predetermined number, the main processing unit 66 changes the target speed generating adjustment gain S of the register 660 in a direction where suitable adjustment is possible.

Then, the main processing unit 66 investigates if the gain S of the register 660 is within a set range. If outside the set range, it generates an adjustment error signal and ends the routine. If in the set range, it returns to step (b).

In this way, the main processing unit 66 adjusts the target speed generating adjustment gain S of the target speed generating digital/analog converter 636 of the speed error detection circuit 63b.

FIG. 22 is a flow chart of the processing for adjustment of the offset of the target speed generating analog circuit of FIG. 18.

(a) The main processing unit 66 outputs a target speed Vc of 0 to the target speed generating digital/analog converter 636 (FIG. 13) and outputs a forward command to the target speed analog voltage generating circuit 637 (FIG. 13).

Therefore, the target speed analog voltage generating circuit 637 amplifies and outputs the output of the digital/analog converter 636.

Next, the main processing unit 66 determines, by sampling, the output of the analog/digital converter 639d (FIG. 13), that is, the output of the target speed analog voltage generating circuit 637, and stores the result as the offset measurement value A in the work register 669.

(b) Next, the main processing unit 66 outputs the target speed Vc of 0 of the digital/analog converter 636 and issues a reverse command to the target speed analog voltage generating circuit 637.

Therefore, the target speed analog voltage generating circuit 637 inverts, amplifies, and outputs the output of the digital/analog circuit 636.

Next, the main processing unit 66 determines, by sampling, the output of the analog/digital converter 639d and stores it in the work register 669 as the offset measurement value B.

(c) Next, the main processing unit 66 compares the two measurement values A and B of the work register 669.

If the measurement values A and B match, the forward and reverse offsets are the same, so the main processing unit 66 ends the adjustment and returns to the start.

(d) On the other hand, if the two measurement values A and B do not match, the main processing unit 66 increments the number of adjustments by "+1" and investigates if the number of adjustments is a predetermined number.

If the number of adjustments is the predetermined number, the main processing unit 66 outputs an adjustment error signal and ends the routine.

(e) On the other hand, if the number of adjustments is not the predetermined number, the main processing unit 66 changes the target speed offset adjustment value U of the register 661 to a direction where suitable adjustment is possible.

Next, the main processing unit 66 investigates if the adjustment value U of the register 661 is in a set range. If outside the set range, it outputs an adjustment error signal and ends the routine. If in the set range, it returns to step (a).

In this way, the main processing unit 66 adjusts the offset adjustment value U so that the offset output of the target speed analog voltage generating circuit 637 matches in the forward and reverse directions.

FIG. 23 is a flow chart of the processing for coarse adjustment of the offset of the speed control circuit of FIG. 18.

(a) The main processing unit 66 performs a return-to-zero seek operation. That is, it controls the voice coil motor 61a to move so that the servo head 61b returns to the zero cylinder.

(b) Then, the main processing unit 66 performs a predetermined forward seek operation.

That is, it outputs the target speed Vc and performs speed control over the voice coil motor 61a by the speed error detection circuit 63b.

The main processing unit 66 counts the track crossing pulses and when it detects that the vicinity of the target position has been reached, switches from speed control to position control of the position control unit 64.

Then, the main processing unit 66 monitors the on-track signal of the position control unit 64 (signal output when the position error signal $\Delta P$ is in a fixed error range) and if the on-track signal continues for a fixed time, considers that the target position has been converged to by the position control and judges that the seek operation was successful.

On the other hand, if the on-track signal does not continue for a fixed time within a fixed time after the position control, it judges that the seek operation erred and proceeds to step (d).

(c) The main processing unit 66 performs a reverse seek operation for a predetermined distance when the forward seek operation for a predetermined distance succeeds.

When the reverse seek operation has succeeded, the main processing unit 66 investigates if the predetermined number of forward/reverse seek operations has been performed. If the predetermined number has not been performed, the main processing unit 66 returns to step (b). If the predetermined number has been performed, it ends the subroutine and returns to the start.

(d) On the other hand, if a forward or reverse seek operation error is generated, the main processing unit 66 sets the next predetermined speed detection offset adjustment value P in the register 664.

Then, the main processing unit 66 increments the number of retries by "+1" and investigates if the predetermined number of retries has been made.

If the predetermined number of retries has not been made, the main processing unit 66 returns to step (a). If the predetermined number of retries has been made, the main processing unit 66 outputs an adjustment error signal considering that the adjustment is impossible.

In this way, the main processing unit 66 performs coarse adjustment on the speed detection offset adjustment value P in the range where no seek operation error occurs.

FIG. 24 is a flow chart of the processing for coarse adjustment of the gain of the control current detection signal of FIG. 18.

(a) The main processing unit 66 performs a return-to-zero seek operation.

(b) Next, the main processing unit 66 performs the maximum distance forward seek operation.

When a seek operation error occurs in the forward seek operation, the main processing unit 66 proceeds to step (d).

(c) On the other hand, when the forward seek operation succeeds, the main processing unit 66 performs the maximum distance reverse seek operation.

When the reverse seek operation succeeds, the main processing unit 66 investigates if the predetermined number of forward/reverse seek operations has been performed. If the predetermined number has not been performed, the main processing unit 66 returns to step (b). If the predetermined number has been performed, the main processing unit 66 ends the subroutine and returns to the start.

(d) If a forward or reverse seek operation error occurs, the main processing unit 66 sets the next predetermined control current detection gain M in the register 662.

Then, the main processing unit 66 increments the number of retries by "+1" and investigates if the predetermined number of retries has been made.

If the predetermined number of retries has not been made, the main processing unit 66 returns to step (a). If the predetermined number of retries has been made, the main processing unit 66 outputs an adjustment error signal indicating that adjustment is impossible.

In this way, the main processing unit 66 performs coarse adjustment on the control current detection gain M in the range where no seek operation error occurs.

Next, an explanation will be made of the operation for adjustment of the core width.

Figure 26:
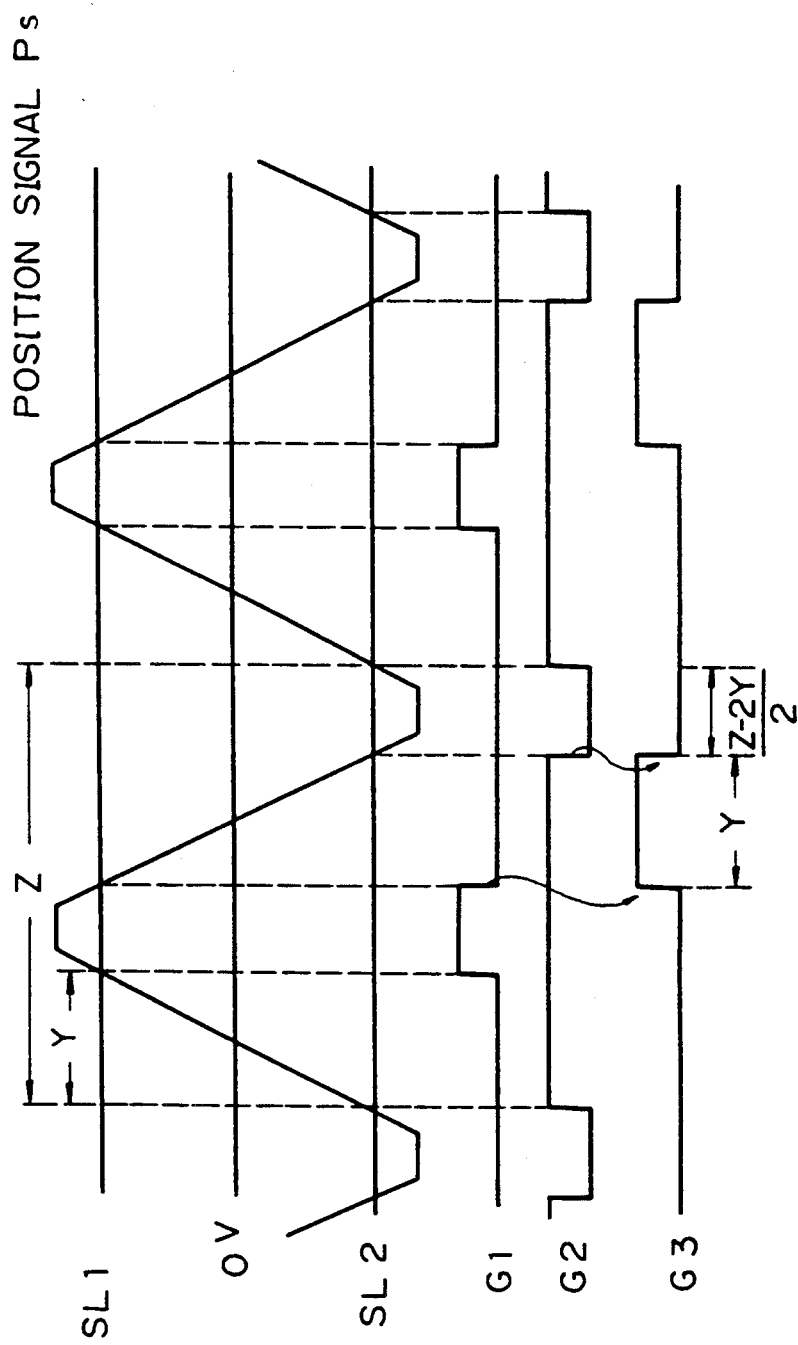
FIG. 26 is a timing diagram of the core width adjustment operation of FIG. 25.

FIG. 25 is a flow chart of the processing for adjustment of the core width of FIG. 18. FIG. 26 is a timing diagram explaining the operation in FIG. 25.

(1) At the start of the adjustment, the main processing unit 66 resets the up flag Uf and the down flag Df of the work register 669 to "0".

(2) Then, in the state where the detection sensitivity adjustment value Q is output from the register 666 to the digital/analog converter 627 of the position signal preparing circuit 62, the main processing unit 66 performs a return-to-zero seek operation.

That is, it controls the voice coil motor 61a to move so that the servo head 61b is moved back to the zero cylinder.

(3) Next, the main processing unit 66 performs a uniform speed seek operation on the servo head 61b from the zero cylinder to the MAX cylinder direction.

That is, it produces the target speed Vc and controls the voice coil motor 61a for uniform speed movement by the speed control system 63a and 63b.

During this time, the servo head 61b reads the servo surface of the magnetic disk 61c, and the position signal preparing circuit 62 outputs the position signal Ps.

Then, in the position sensitivity detection circuit 69c (FIG. 17), as shown in FIG. 26, the comparators 694 and 695 are used to slice the position signal Ps by the slice levels SL1 and SL2, the gate signals G1 and G2 are prepared, and the gate signal G3 is prepared by the flip-flop 696.

The gate signal G3 corresponds to the slope portion of the position signal Ps as shown in FIG. 26 and is on during the period Y. The gate signal G2 is on for the period of (Z-2Y)/2 with respect to a cycle Z of the position signal Ps.

Therefore, the AND gate 698 opens for the period Y with respect to the position signal Ps, the count clock is output to the counter (not shown) of the main processing unit 66, the AND gate 699 opens for the period of (Z-2Y)/2, and a count clock is output to another counter (not shown) of the main processing unit 66.

(4) In the main processing unit 66, during the period of the uniform speed seek operation, the Y and (Z-2Y)/2 are counted and accumulated by the two counters for a predetermined number of times (for example, 16 times).

This is for obtaining the average over the entire servo surface.

Then, the main processing unit 66 calculates Y/(Z-2Y) from the values of the two counters.

This means the ratio of the slope portion Y in the half cycle Z/2 with the other portion (Z-2Y) is taken and is equivalent to obtaining the ratio of the slope portion Y in the cycle Z.

(5) Next, the main processing unit 66 judges if the ratio calculated at the step (4) is larger than a target value.

If larger, the sensitivity is too good and the slope is large, so the sensitivity should be made worse by changing to the detection sensitivity Q of the register 666 to (Q-X) and "1" set in the down flag Df of the work register 669.

(6) On the other hand, if the ratio is not larger than the target value, the main processing unit 66 judges if the ratio is smaller than the target value.

If smaller, the sensitivity is too poor and the slope is small, so the sensitivity should be improved by changing the detection sensitivity Q of the register 66 (Q+X) and "1" set in the up flag Uf of the work register 669.

(7) The main processing unit 66 investigates the up flag Uf and the down flag Df of the work register 669. If both of the flags Uf and Df are "1", the error with the target value is the smallest, so the main processing unit 66 proceeds to step (8). If both of the flags Uf and Df are not "1", the error from the target value is not the smallest, so the main processing unit 66 returns to step (2).

(8) On the other hand, if the ratio in step (6) is not smaller than the target value, the target value is matched. If the error with the target value at step (7) is the smallest one, the main processing unit 66 ends the adjustment by returning to the zero cylinder and returning to the start.

In this way, the position signal Ps is sliced by two comparators, the period of the gate signal prepared by this slicing is counted, and the ratio is made to match a predetermined target value by changing the detection sensitivity Q.

Here, as shown in FIG. 26, Y and (Z-2Y)/2 are calculated without calculating Z and Y so as to ensure the proper operation of the counter for determining not only one position signal, but a plurality of position signals.

Further, since the measurement is performed for a plurality of position signals Ps for the servo surface as a whole, it is possible to find the average.

Also, since the servo head 61b is moved in the direction of the larger cylinder from the zero cylinder at a uniform speed and low speed and at the same time sampling is performed of the data required for automatic adjustment until reaching the maximum cylinder, adjustment is possible by a stable, uniform speed seek operation without performing the normal seek operation. Therefore, adjustment can be stably performed even from a state with a large deviation in adjustment.

In the above way, a gate signal is prepared by slicing a position signal Ps and the time ratio of the slope portion of the position signal is measured from the gate signal, so automatic measurement of the slope is possible. It is possible to change the detection sensitivity Q and automatically adjust to a position signal Ps having a desired slope. This means that the differences in adjustment of the core width can be reduced and the adjustment work performed at a low cost.

The operation for adjustment of the access time will now be explained.

Figure 27B:
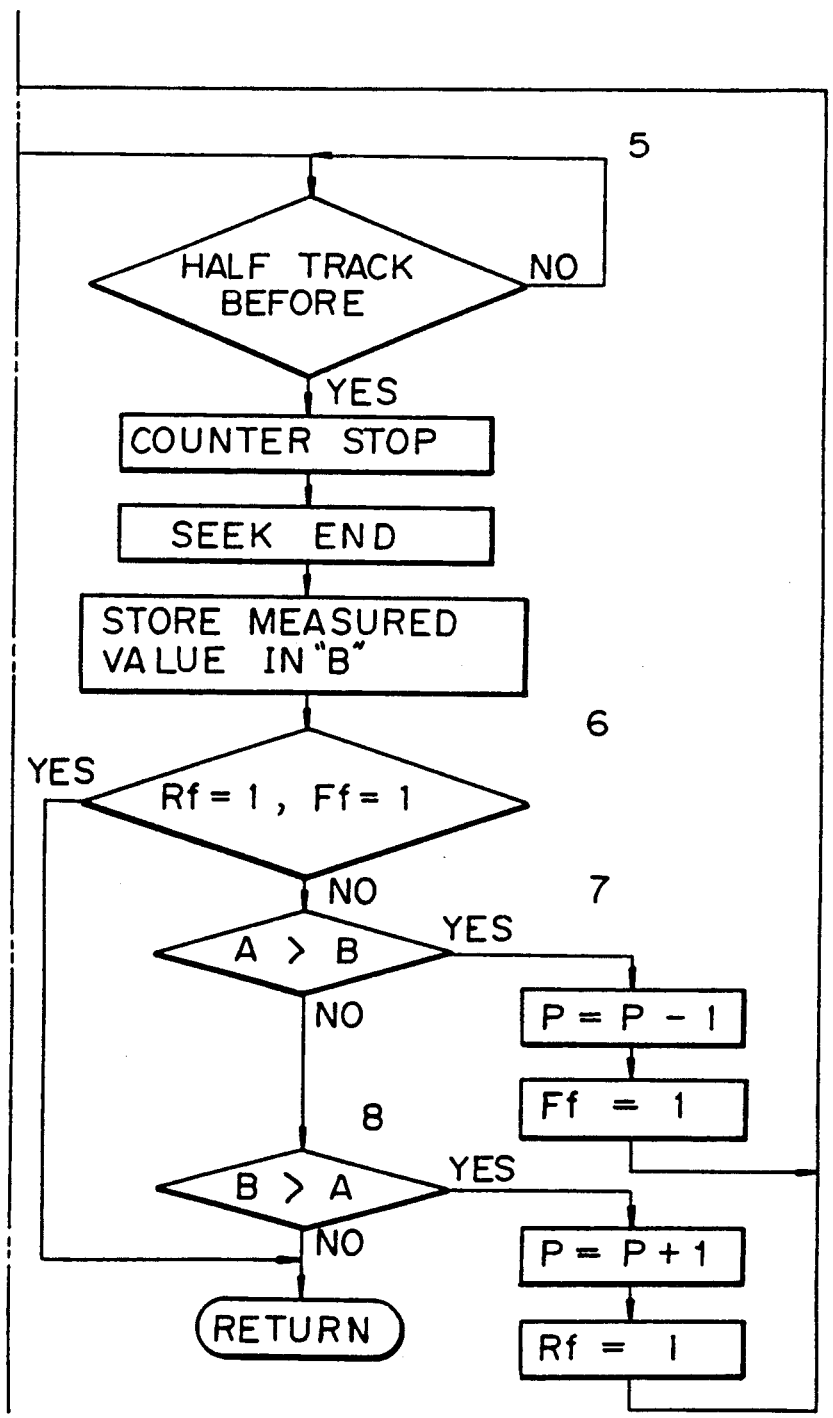

FIG. 27, including FIGS. 27A and 27B, is a flow chart of the processing for adjustment of the access time (forward/reverse seek operation time) of FIG. 18, and FIGS. 28A and 28B are timing charts for explaining the operation of adjustment of the access time.

(1) First, the main processing unit 66 resets the reverse flag Rf and forward flag Ff of the work register 669 to "0".

(2) The main processing unit 66 then outputs the offset value "P" of the seek operation time adjustment offset (speed detection offset) value register 664 to the digital/analog converter 632 of the speed detection circuit 63a.

Next, the main processing unit 66 resets the counter 69a to measure the access time in the forward direction and starts the measurement after the resetting.

The main processing unit 66 then starts the forward seek operation for a predetermined distance d and produces a target speed. The voice coil motor 61a is speed controlled in the forward direction by the speed error detection circuit 63b.

(3) The main processing unit 66 counts the track crossing pulses of the track crossing pulse generating circuit 68 and when half a track before the target position is reached, stops the counter 69a.

By this, the counter 69a, as shown in FIG. 28A, measures the access time (seek operation time) from the start of the seek operation in the forward direction to the position half a track before the target position. Then, as shown in FIG. 28A, when the real speed Vr reaches a value under a predetermined value and substantially zero, the main processing unit 66 ends the speed control and switches to position control.

Then, when the on-track state, where the position error signal DP remains in a certain range, continues for a predetermined time, the main processing unit 66 determines that the target position has been converged to by the position control and the seek operation is ended.

The main processing unit 66 then reads the measurement value in the forward direction of the counter 69a and stores it in the work register 669 as "A".

(4) Next, the main processing unit 66 resets the counter 69a for measurement of the access time in the reverse direction and starts the measurement after the resetting.

Then, the main processing unit 66 starts the reverse seek operation for a predetermined distance d.

By this, the main processing unit 66 produces a target speed and the voice coil motor 61a is speed controlled in the reverse direction by the speed error detection circuit 63b.

(5) The main processing unit 66 counts the track crossing pulses and when half a track before the target position is reached, stops the counter 69a.

The counter 69a counts the access time from the start of the reverse direction seek operation to half a track before the target position.

After this, the main processing unit 66 ends the speed control and switches to position control. Then, when the target position is converged to by the position control, the main processing unit 66 judges the seek operation to be ended.

The main processing unit 66 reads the reverse direction measurement value of the counter 69a and stores it in the work register 669 as "B".

(6) The main processing unit 66 investigates if the reverse flag Rf and the forward flag Ff of the work register 669 are "1".

If both the reverse flag Rf and the forward flag Ff are "1", it means that the forward direction measurement value A and the reverse direction measurement value B will not match in the later steps (7) and (8). But, the difference will be minimal, so the main processing unit 66 will end the adjustment processing and return to the start.

(7) On the other hand, if both the reverse flag Rf and the forward flag Ff are not "1", the main processing unit 66 will compare the measurement values A and B of the work register 669 and determine if A>B.

If A>B, the forward direction seek operation is too fast compared with the reverse direction operation, so the main processing unit 66 will reduce the offset value P to (P−1). That is, the main processing unit 66 will reduce the offset level, set it in the register 664, set the forward flag Ff to "1", and return to step (2).

(8) Conversely, if A is not greater than B, the main processing unit 66 determines that A≦B.

If A<B, the reverse direction operation is too fast compared with the forward direction operation, so the main processing unit 66 will increase the offset value P to (P+1). That is, the main processing unit 66 will increase the offset level, set it in the register 664, set the reverse flag to "1", and return to step (2).

If A is not less than B, then A=B and the measurement value A of the forward direction access time is equal to the measurement value B of the reverse direction access time. Therefore, the main processing unit 66 ends the routine and returns to the start.

In this way, the main processing unit 66 sets the offset value, measures the access time of speed control in the forward direction and the access time of speed control in the reverse direction, and judges the magnitude of the two access times measured. When the access times are different, the main processing unit 66 changes the offset value and repeats the operation. Then, it finds the offset value where the two access times match or the differences between the two access times is minimal.

Further, the reason why the time of measurement of the access time is made up from the start of the seek operation to half a track before the target position is that after half a track before the target position, the real speed becomes close to zero and the effect of changes in the offset value of the speed detection circuit 63a is small. The range where the effects of the offset value are large is used as the measurement period and changes in the access times due to changes in the offset are accurately measured.

The operation for adjustment of the position offset will now be explained.

FIG. 29 is a flow chart of the processing for adjustment of the position (control circuit) offset. FIG. 30 is a flow chart of the processing for determining the adjustment value of the offset in the forward and reverse directions of FIG. 29. FIG. 31 is a flow chart of the processing for integration sampling of FIG. 30 and FIG. 32 is a timing diagram for explaining the operation of the same.

Further, FIG. 30 is a subroutine of the operation shown in FIG. 29, and FIG. 31 is a subroutine of the operation shown in FIG. 30.

First, an explanation will be made of the overall processing for adjustment with reference to FIG. 29.

(1) The main processing unit 66 resets the work register 669 at the start of the adjustment.

(2) Next, the main processing unit 66 executes the subroutine mentioned later with respect to FIG. 30, determines the adjustment value L of the offset in the forward direction, and stores the determined offset adjustment value L in the work register 669 as "FWD".

(3) The main processing unit 66 then executes the subroutine mentioned later with respect to FIG. 30, determines the adjustment value L of the offset in the reverse direction, and stores the determined offset adjustment value L in the work register 669 as "RVS".

(4) Next, the main processing unit 66 calculates the average of "FWS" and "RVS" in the work register 669, sets the average value in the register 665 as "L", and outputs the same.

Next, an explanation will be made of the processing for determination of the offset adjustment value using FIG. 30.

(a) First, the main processing unit 66 sets "3" in the integration circuit I of the work register 669. That is, it performs the integration three times.

(b) The main processing unit 66 sets the offset adjustment value L in the register 665 and outputs "L" to the digital/analog converter 645 of the position control unit 64 (FIG. 14).

Then, the main processing unit 66 executes the integration sampling subroutine mentioned later with respect to FIG. 31, obtains the integration value of the position signal Ps in the register A, and stores it in the work register 669 as Ti.

At this time, the main processing unit 66 performs the routine several times and obtains the average of the integration values.

Next, the main processing unit 66 revises the L of the register 665 to (L+X) and revises the number of integration operations in the work register 669 to (I−1).

(c) The main processing unit 66 investigates if the number of integration operations in the work register 669 is "0" and if not "0" returns to the step (b).

(d) On the other hand, if I=0, it means that the third integration operation is ended, the integration values T1, T2 and T3 are obtained, and the current offset is (L+3X).

First, the main processing unit 66 compares the first integration value T1 and the second integration value T2.

If T1 is not greater than or equal to T2, that is, if T1<T2, it means a monotonous increase compared with the change in the increase of the offset L. The minimum value cannot be obtained, so the main processing unit 66 makes the offset L (L−4X). That is, since L=L+3X, the main processing unit 66 reduces the offset to (L−X) and returns to step (a).

(e) On the other hand, if T1 is greater than or equal to T2, it compares the second integration value T2 with the third integration value T3.

If T3 is not greater than or equal to T2, that is, if T3<T2, it means a monotonous reduction compared with the change in increase of the offset L. The minimum value cannot be obtained, so the main processing unit 66 reduces the offset L to (L−2X). That is, since L=(L+3X), the main processing unit 66 increases the offset to (L+X) and returns to step (a).

(f) Conversely, if T3 is greater than or equal to T2, the relationship of T1≧T2≦T3 stands and T2 is the minimum value. The main processing unit 66 finds the offset of T2 by (L−2X)=(L+X), stores it in the register 669 as the determined offset value for the forward direction "FWD", and returns to the start.

The determined offset value for the reverse direction "RVS" is similarly found by integration sampling in the reverse direction in step (b).

Next, an explanation will be made of the processing for integration sampling shown in FIG. 31.

(i) The main processing unit 66 starts the forward seek operation for the predetermined amount of difference.

(ii) The main processing unit 66 judges if the speed control is ended. If the speed control is ended, the main processing unit 66 generates an integration start signal, turns on the switch 690 of the integration circuit 69b (FIG. 16), and operates the integrator 692.

Therefore, the integrator 692, as shown in FIG. 25, starts the integration of the position signal Ps when speed control is ended.

(iii) In this way, after the speed control has been switched to position control, the main processing unit 66 judges that the seek operation should be ended by the on-track signal continuing for a predetermined time.

Further, the main processing unit 66 waits for a predetermined time, turns off the integration start signal, turns off the switch 690, deactivates the integrator 692, and ends the integration.

Therefore, the integration period becomes as shown in FIG. 32.

(iv) The main processing unit 66 performs sampling of the integration values by the analog/digital converter 693 after the end of the integration period and stores the result as "A" in the work register 669. Then, it performs exactly a predetermined amount of a reverse seek operation and returns to the start.

The above explains the processing for integration sampling in the forward direction. The integration sampling for the reverse direction is the same except that in step (i) the forward seek operation is changed to the reverse seek operation and in step (iv) the reverse seek operation is changed to the forward seek operation.

In this way, there are sometimes differences in the offset in the forward direction and reverse direction. As shown in FIG. 29, the offset adjustment values for both directions are determined and the average used as the automatic offset adjustment value.

FIG. 32 is a timing diagram of the position offset adjustment operation explained in FIG. 29.

Next, an explanation will be made of the operation for adjusting the seek operation time and positioning.

Figure 33B:
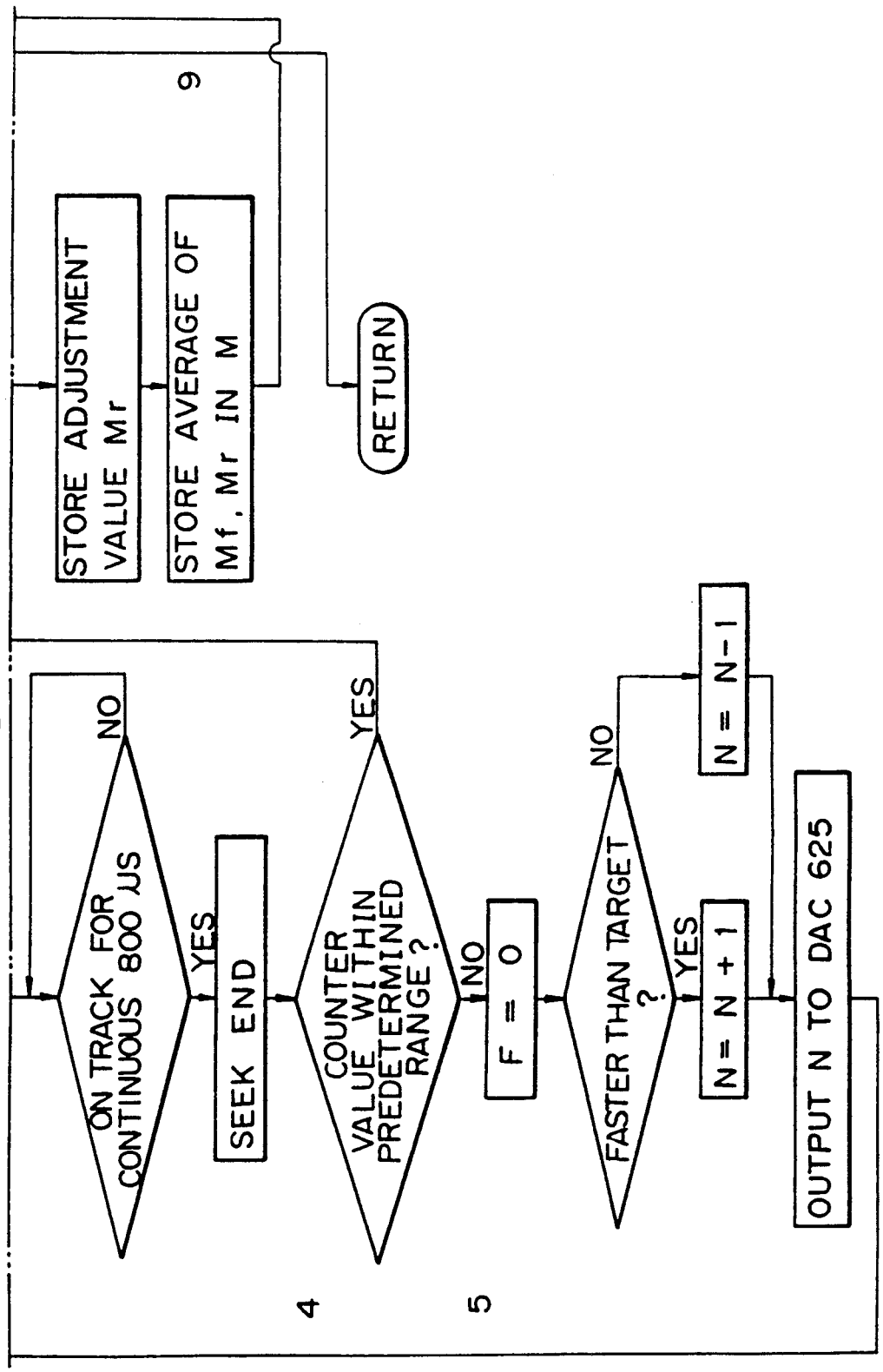
Figure 34:
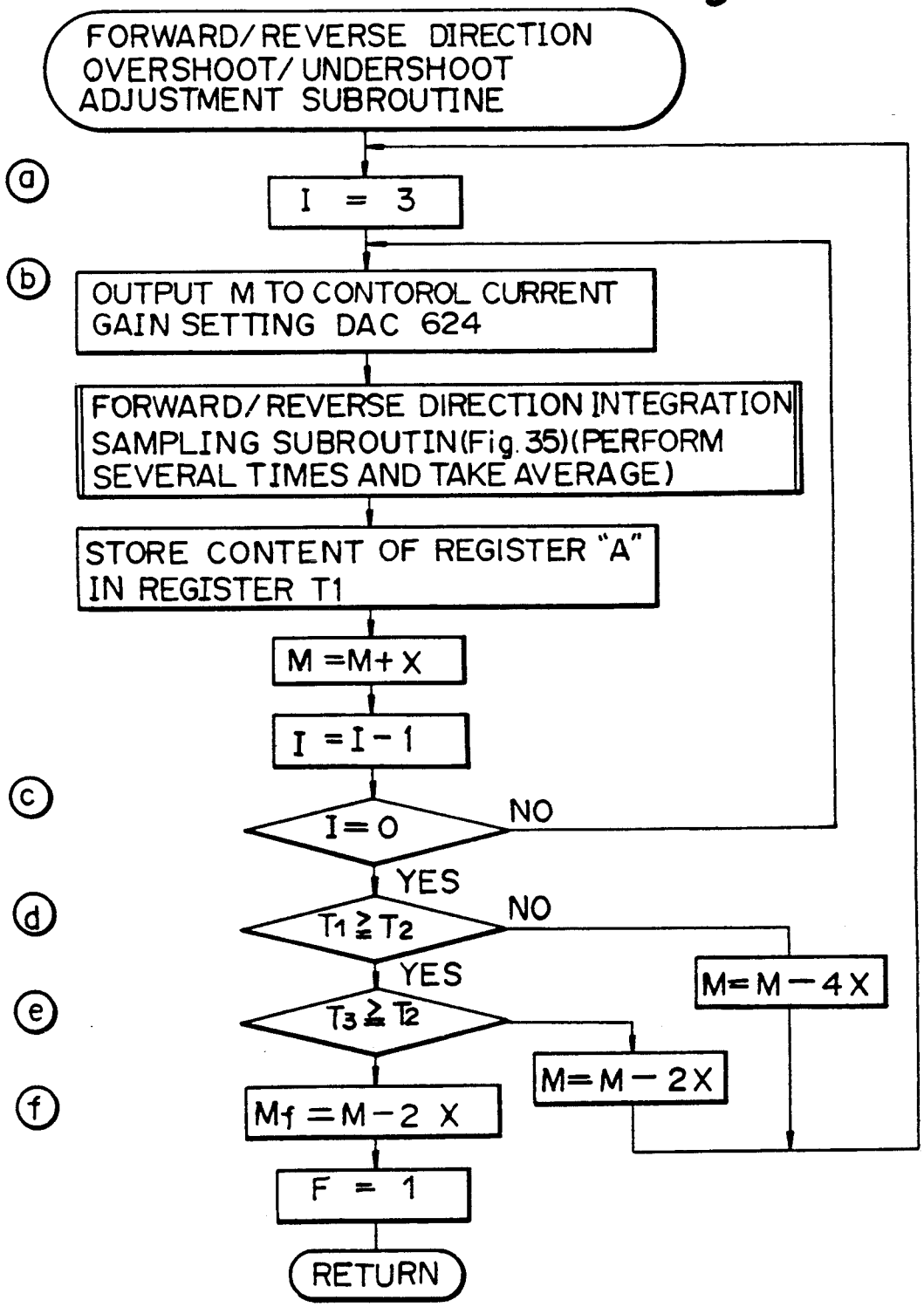
FIG. 34 is a flow chart of the processing for adjustment of an overshoot/undershoot in FIG. 33.
Figure 35:
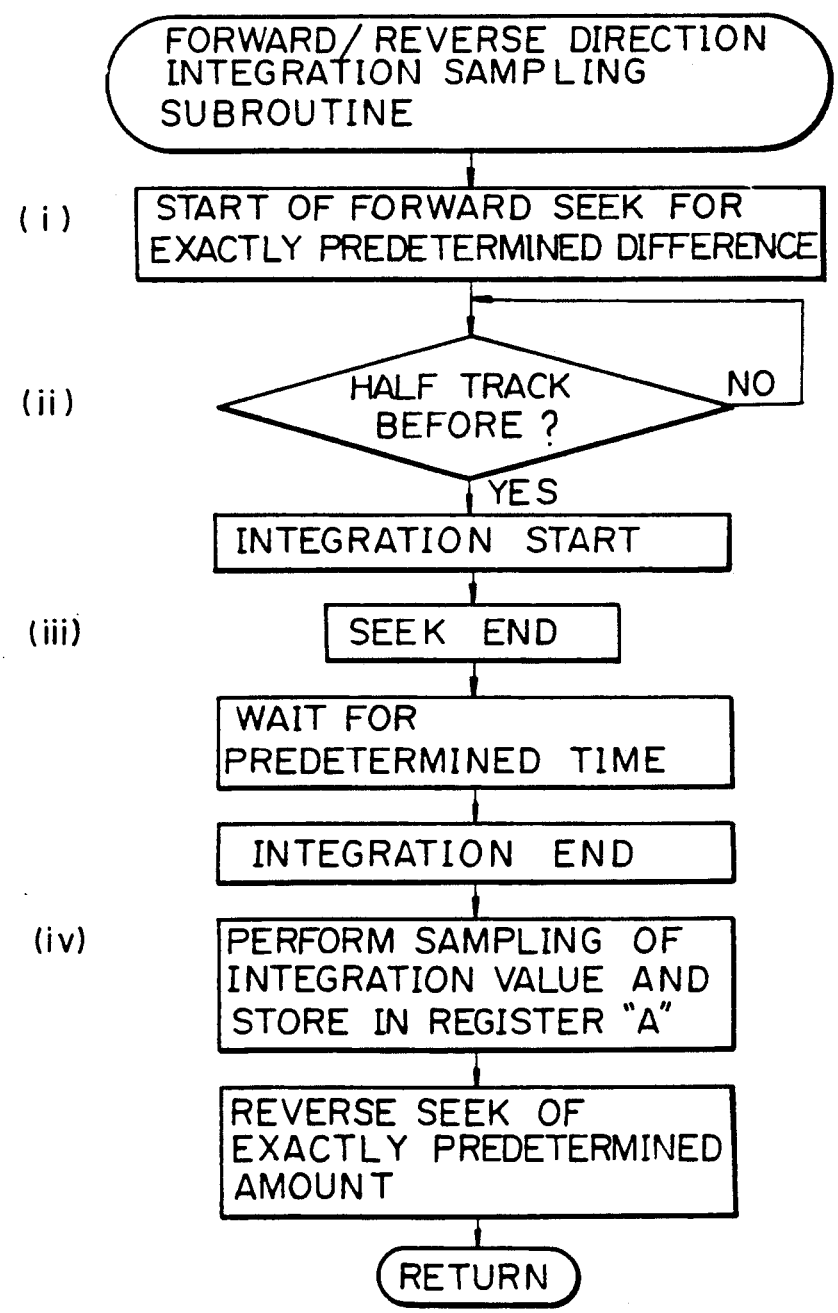
FIG. 35 is a flow chart of the processing for integration sampling in FIG. 34.

FIG. 33, including FIGS. 33A and 33B, is a flow chart of the processing for adjustment of the seek operation time and positioning of the operation described in the flow charts of FIG. 18. FIG. 34 is a flow chart of the processing for adjustment of the overshoot/undershoot in FIGS. 33A and 33B. FIG. 35 is a flow chart of the processing for integration sampling in FIG. 34, and FIGS. 36A and 36B are timing diagrams of the operation. Further, FIG. 35 is a subroutine of the flow chart in FIG. 34, and FIG. 34 is a subroutine of the flow chart of FIGS. 33A and 33B.

First, an explanation is given of the flow chart of FIGS. 33A and 33B.

(1) The main processing unit 66 initializes the work register 669 by making the adjustment flag F "0" at the start of the adjustment.

At that time, it sets the predetermined values "M" and "N" in the registers 662 and 663 and inputs the gain to the speed detection circuit 63a.

(2) The main processing unit 66 then makes the voice coil motor 61a perform a seek operation at a predetermined starting point.

When the measurement is completed at the predetermined starting point, the main processing unit 66 resets the counter 69a for measurement of the access time and after the reset starts the measurement.

Then, the main processing unit 66 starts a seek operation for a predetermined distance d from the starting point.

Therefore, the voice coil motor 61a is controlled in speed by the speed error detection circuit 63b.

(3) The main processing unit 66 counts the track crossing pulses of the track crossing pulse generating circuit 68. When it detects that the vicinity of the target position has been reached, it ends the speed control and switches to position control. In addition, it stops the counter 69a.

The counter 69a, as shown in FIG. 36A, counts the access time (time of continuous speed control) tc.

Then, when the offset signal of the position error detection circuit 64 (signal output in the case where the position error signal ΔP is in a predetermined range) continues for a predetermined time (800 μs), the main processing unit 66 considers that the target position has been converged to by the position control and judges that the seek operation is ended.

(4) Next, the main processing unit 66 reads the measurement value of the counter 69a and investigates if the measurement value of the counter 69a is in a predetermined range.

If within the predetermined range, the main processing unit 66 proceeds to adjust the control current detection gain M of step (6). If the measured value of the counter 69a is not in the predetermined target range, the main processing unit 66 proceeds to step (5) for adjustment of the differentiation gain N.

(5) If not in the predetermined target range, the main processing unit 66 resets the adjustment flag F to "0" to again perform the adjustment.

If the measurement value of the counter 69a is faster than the target, the main processing unit 66 increases the differentiation gain N of the register 663 to (N+1). If the measurement value is not faster than the target, the main processing unit 66 reduces the differentiation gain N to (N−1), outputs the result to the digital/analog converter 635 of the speed detection circuit 63a, and returns to step (2).

That is, if the measurement value is faster than the target, the main processing unit 66 makes the differentiation gain large, makes the real speed Vr appear large, and slows down the access time. If the measurement value is not faster than the target, it makes the differentiation gain small, makes the real speed appear smaller, and speeds up the access time.

(6) On the other hand, if the measurement value of the counter 69a is within a predetermined range, the main processing unit 66 investigates the adjustment flag F and if it shows that F="1", i.e., adjustment of the overshoot and undershoot is completed, ends the adjustment and returns to the start.

(7) Conversely, if F is not "1", that is, if F=0, the adjustment of the overshoot/undershoot is not completed, so the main processing unit 66 finds the adjustment gain Mr in the forward seek operation direction by the subroutine for adjustment of the overshoot/undershoot, explained later with respect to FIG. 34, and stores it in the work register 669.

(8) Next, the main processing unit 66 finds the adjustment gain Mr in the reverse seek operation direction by the subroutine for adjustment of the overshoot/undershoot mentioned later with respect to FIG. 34 and stores it in the work register 669.

(9) Further, the main processing unit 66 finds the average of the forward seek operation adjustment gain Mr and the reverse seek operation adjustment gain Mr, stores it in the work register 662, and returns to step (2).

Next, an explanation will be made of the processing for adjustment of the overshoot/undershoot with reference to FIG. 34.

(a) First, the main processing unit 66 sets "3" as the number of integration operations I of the work register 669. That is, integration is performed three times.

(b) The main processing unit 66 then outputs the control current detection gain M of the register 662 to the digital/analog converter 634 of the speed detection circuit 63a (FIG. 12).

Then, the main processing unit 66 executes the integration sampling subroutine, mentioned later with respect to FIG. 35, obtains the integration value of the position signal Ps, and stores the result as T1 in the work register 669.

At this time, the routine is performed several times and the average of the integration values is obtained.

Next, the main processing unit 66 revises the gain M of the register 662 to (M+X) and revises the number of integration operations I of the work register 669 to (I−1).

(c) The main processing unit 66 investigates if the number of integration operations I of the work register 669 is "0" and if not "0" returns to step (b).

(d) On the other hand, if I=0, the third integration operation has been ended and the integration values T1, T2, and T3 are obtained, so the current gain is (M+3X).

First, the main processing unit 66 compares the first integration value T1 and the second integration value T2.

If T1 is not greater than or equal to T2, that is, if T1<T2, it means a monotonous increase with respect to the change of increase of the gain M, so the minimum value cannot be obtained. The main processing unit 66 changes the gain M to (M−4X), that is, since M=M+3X, it is reduced to (M−X), and returns to step (a).

(e) On the other hand, if T1 is greater than or equal to T2, it compares the second integration value T2 with the third integration value T3.

If T3 is not greater than or equal to T2, that is, if T3<T2, it means a monotonous reduction compared with the change in increase of the gain M, so the minimum value cannot be obtained. The main processing unit 66 reduces the gain M to (M−2X), that is, increases it to (M+X) and returns to step (a).

(f) Conversely, if T3 is greater than or equal to T2, the relationship of T1≧T2≦T3 stands and T2 is the minimum value. The main processing unit 66 finds the gain of 72 by (M−2X)=(M+X), stores it in the register 669 as the control current detection gain Mf for the forward direction, sets the adjustment flag F to "1", and returns to the start.

The control current detection gain Mr for the reverse direction is similarly found by integration sampling in the reverse direction at step (b).

Next, an explanation will be made of the processing for integration sampling with reference to FIG. 35.

(i) The main processing unit 66 starts the forward seek operation for the predetermined amount of difference.

(ii) The main processing unit 66 judges if the position half a track before the target position is reached and if the position half a track before is reached, generates an integration start signal, turns on the switch 690 of the integration circuit 69b (FIG. 16), and operates the integrator 692.

Therefore, the integrator 692, as shown in FIG. 36B, starts the integration of the position signal PS from the time half a track before the target position.

(iii) After this, it switches from speed control to position control and, if the on-track signal continues for a predetermined time like in step (4) of FIG. 33, judges that the seek operation is ended.

Further, the main processing unit 66 waits for a predetermined time, turns off the integration start signal, turns off the switch 690, deactivates the integrator 692, and ends the integration.

Therefore, the integration period becomes as shown in FIG. 36B.

(iv) The main processing unit 66 performs sampling of the integration values by the analog/digital converter 693 after the end of the integration period and stores the result as "A" in the work register 669.

Then, it performs exactly a predetermined amount of a reverse seek operation and returns to start.

The above flow showed the processing for integration sampling in the forward direction. The processing for the reverse direction is the same except that in step (i) the forward seek operation is changed to the reverse seek operation and in step (iv) the reverse seek operation is changed to the forward seek operation.

In this way, as shown in FIG. 33, the main processing unit 66 finds the differentiation gain N for the suitable access time and finds the control current detection gain M for the suitable positioning waveform.

The access time accounts for the majority of the positioning time. First the differentiation gain N for a suitable access time is adjusted and then the control current detection gain M for achieving the minimum overshoot/undershoot at the differentiation gain N is found.

Further, the main processing unit 66 performs the adjustment of the differentiation gain again so as to conform that the access time has not gotten away from a predetermined range by changing the control current detection gain M.

If the access time is out of a predetermined range, the differentiation gain is adjusted again.

Further, the integration for adjustment of the control current detection gain M is performed from the position half a track before the target position because the control current detection gain has an effect on the coarse control (speed control) and the angle of entry of the position signal Ps to zero volt at the coarse/fine switching has an effect on the undershoot/overshoot of the later position control.

Therefore, everything from the position half a track before, that is, everything including the coarse control period just before the coarse/fine switching, is covered by the integration.

In the above-mentioned first embodiment, as shown in the flow chart of FIGS. 18A and 18B, the main processing unit 66 performs the preadjustment of steps (2), (3), and (4) and performs precision adjustment from step (5) on. Where no adjustment at all has been performed, all of the steps are necessary. But, where some adjustment has been performed or where adjustment is not necessary, any one of steps (2), (3), or (4) or all of the steps need not be performed.

Further, a voice coil motor was used for the drive source 61a of the servo head 61b, but other known servo motors etc. may be used and the counter 69a may be realized by software in the main processing unit 66.

As explained above, according to the first embodiment of the present invention, after the position signal, the basic element of control is adjusted, the forward-/reverse time difference of the coarse control system is adjusted, the position offset of the fine control system is adjusted, and finally the seek operation time and positioning are adjusted to give the smallest seek operation time. Therefore, the entire adjustment process can be automated. Further, smooth automatic adjustment is possible without oscillation in the system. In addition, the present invention repeats the adjustment step for fine readjustment and thus enables perfect automatic adjustment. Still further, the present invention has the adjustment not requiring a seek operation performed in advance, thus enabling the seek operations for later adjustment to be performed.

Turning to the second embodiment of the present invention, there is further provided a step of preparing a gate signal by slicing the position signal, while performing a uniform speed seek operation on the magnetic head. A time ratio of a slope portion of the position signal from the gate signal is counted and the detection sensitivity of the position signal preparing circuit is changed so that the measured time ratio of the slope portion becomes a predetermined value. The operation of this embodiment is basically the same as explained with reference to FIGS. 25 and 26 and will not be explained again.

Figure 37B:
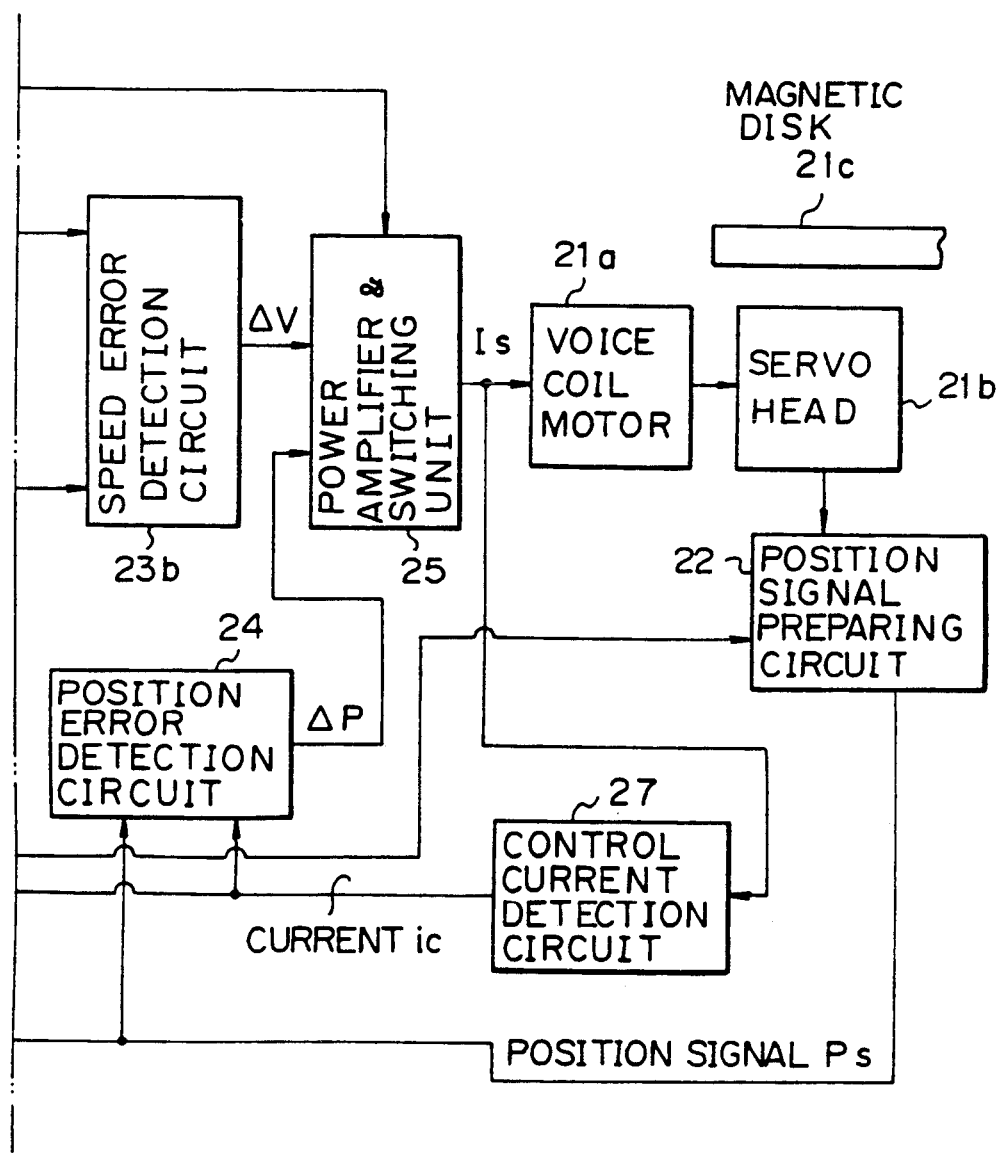

FIG. 37, including FIGS. 37A and 37B, is a block diagram of the servo circuit of the second embodiment. Note that, principally, portions corresponding to those in previous figures are given the same reference numerals except the number "6" is replaced by the number "2".

In FIGS. 37A and 37B (refer also to FIG. 17), reference numeral 29 is a position sensitivity detection circuit which measures the time ratio of the slope portion of the position signal Ps. It has a pair of comparators 290 and 291 which slice the position signal Ps by the slice levels SL1 and SL2 and generate the gate signals G1 and G2. A flip-flop 292 which is set by the gate signal G1, is reset by the gate signal G2, and generates a gate signal G3. An inverting circuit 293 inverts the gate signal G2, an AND gate 294 is opened by the gate signal G3 and outputs a count clock CL, and an AND gate 295 opens by the inverted gate signal G2 of the inverting circuit 293 and outputs the count clock CL.

Reference numeral 263 is a detection sensitivity register which stores the detection sensitivities, i.e., AGC offset values Q, and 264 is a flag register which stores the up flags Uf and down flags Df used for the adjustment processing. Reference numeral 265 is a counter which counts the clocks CL from the AND gate 294, and 266 is a counter which counts the clocks CL from the AND gate 295.

Turning to the third embodiment of the present invention, the offset adjustment value of the speed detection circuit is changed, an access time of movement in the forward direction and an access time of movement in the reverse direction are counted by a counter, and an offset adjustment value is sought giving a minimum difference between the access time in the forward direction and access time in the reverse direction. The operation of the embodiment is basically the same as explained in FIGS. 27, 28A, and 28B, so the explanation will not be repeated.

Figures 38, 38A:
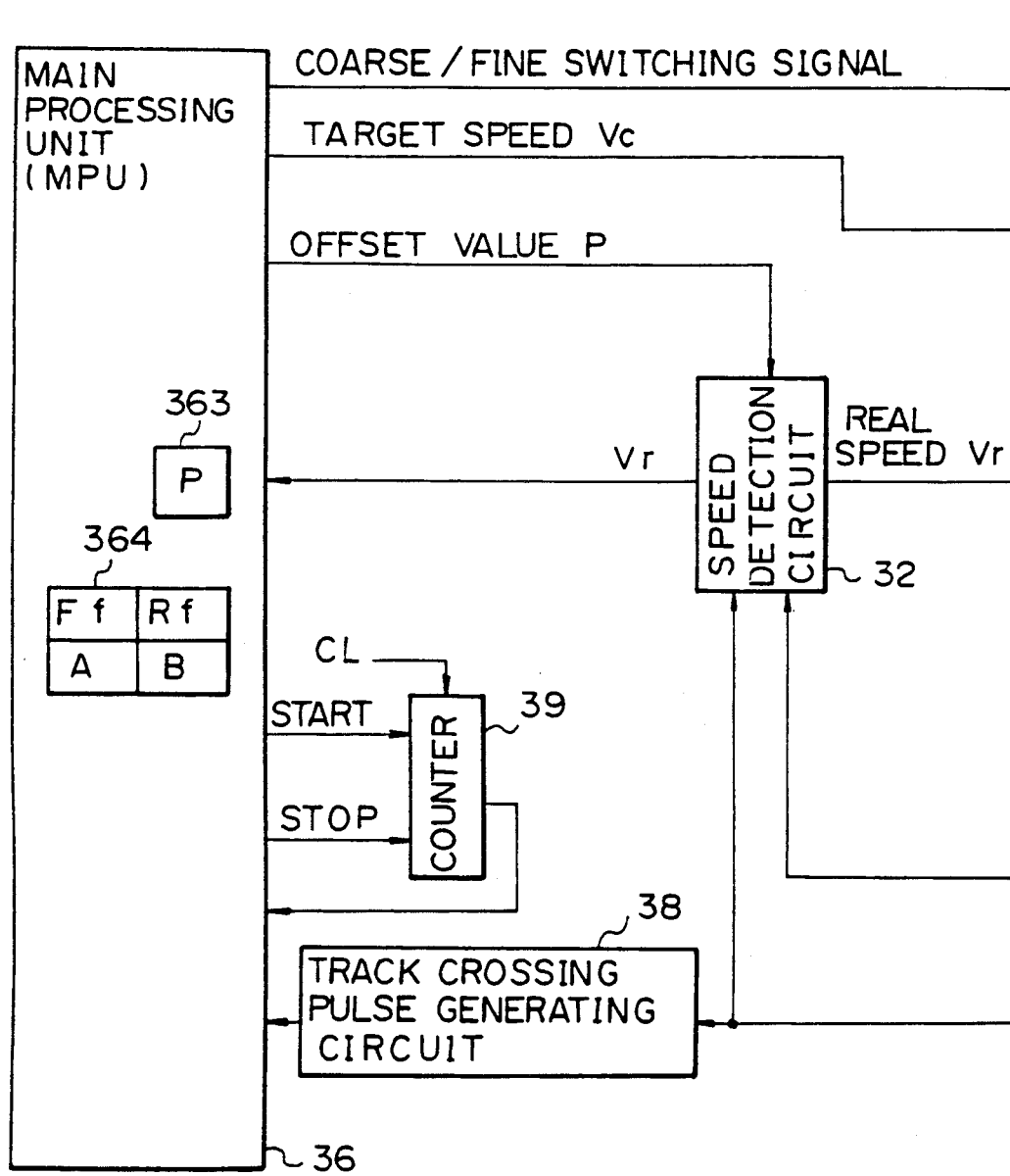
FIG. 38, including
FIGS. 38A and 38B, is a block diagram of a third embodiment of the present invention.
Figure 38B:
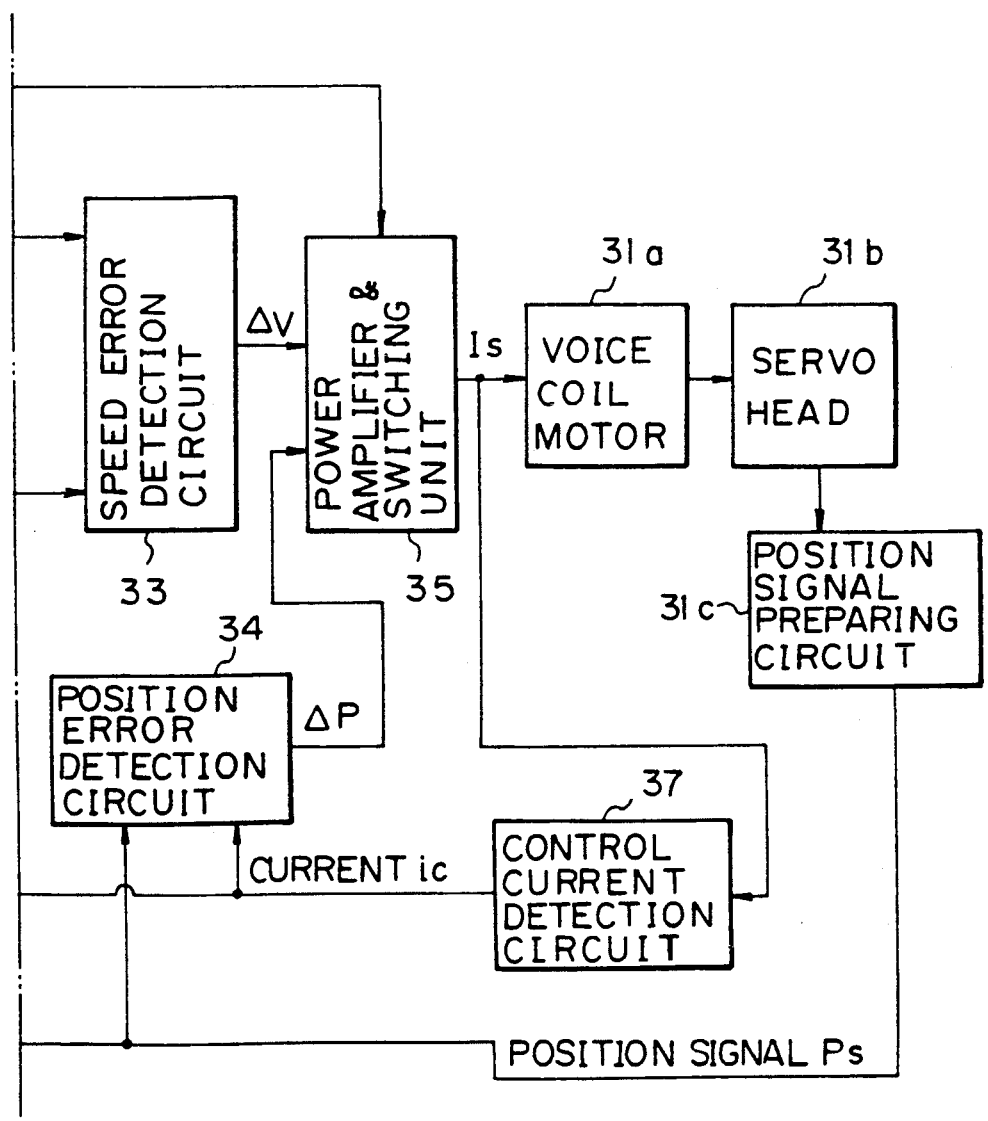

FIG. 38, including FIGS. 38A and 38B, is a block circuit diagram of the servo circuit of the third embodiment. Note that, principally, portions corresponding to those in previous figures are given the same reference numerals except the number "6" is replaced by the number "3".

In the figure, 39 is a counter which is started and stopped by a main processing unit 36, counts the clocks, and counts the access time during speed control. Reference numeral 363 is an offset register which stores the offset values P of the speed detection circuit 32, and 364 is a work register which stores the later mentioned forward flag F1, reverse flag Rf, forward direction measurement value A, and reverse direction measurement value B.

Turning to the fourth embodiment of the present invention, there is further provided a step of changing an offset adjustment value given to the position control unit, repeating a fixed distance of movement, and measuring integration values of a position signal during position control at various offset adjustment values. In addition, a step of setting the offset adjustment value giving the minimum integration value as the optimal offset value, is provided. The operation is basically as explained in FIGS. 14, 29, 30, and 31, so the explanation will not be repeated.

Figure 39A:
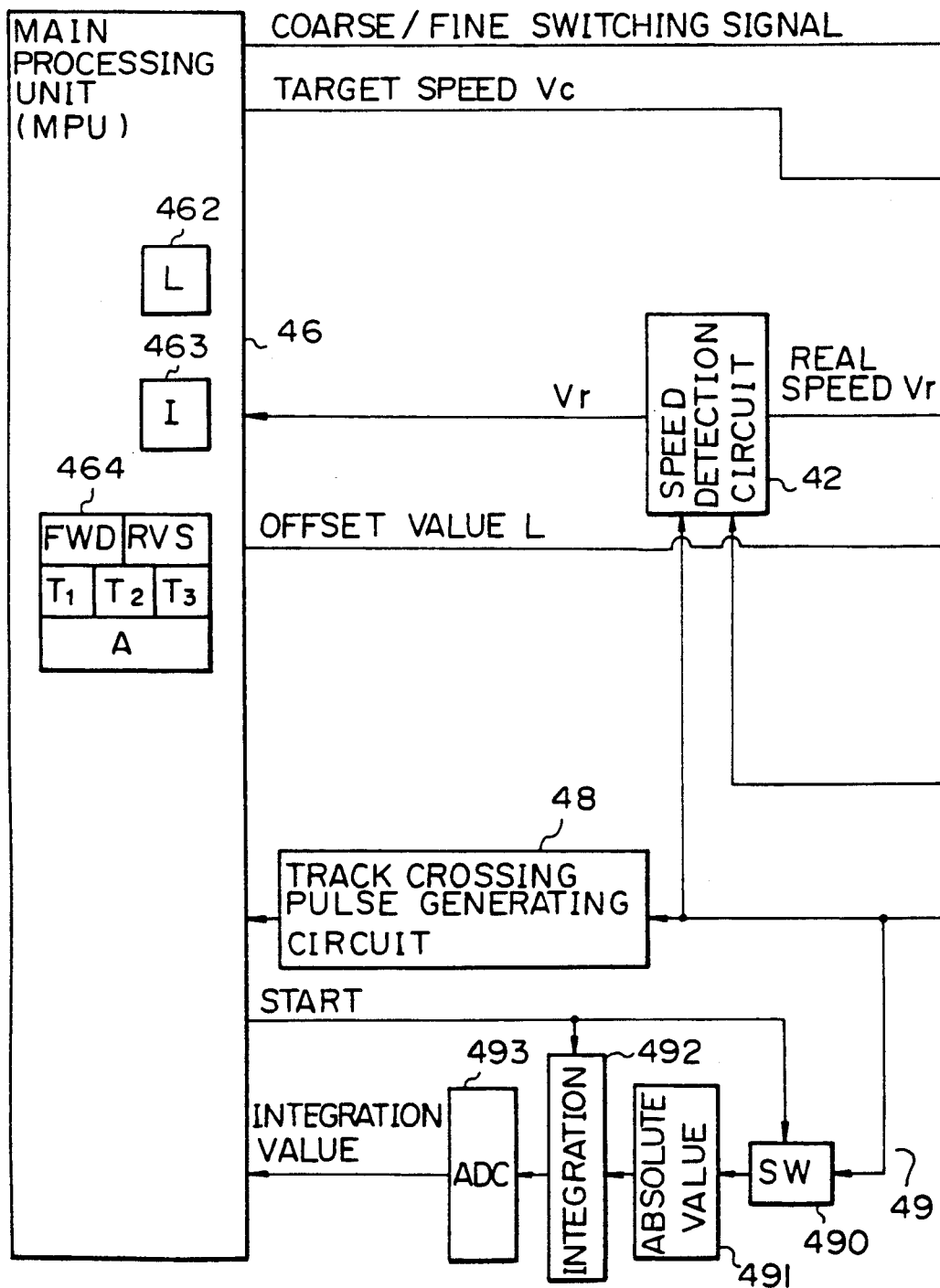
FIGS. 39A and 39B, is a block diagram of a fourth embodiment of the present invention.
Figure 39B:
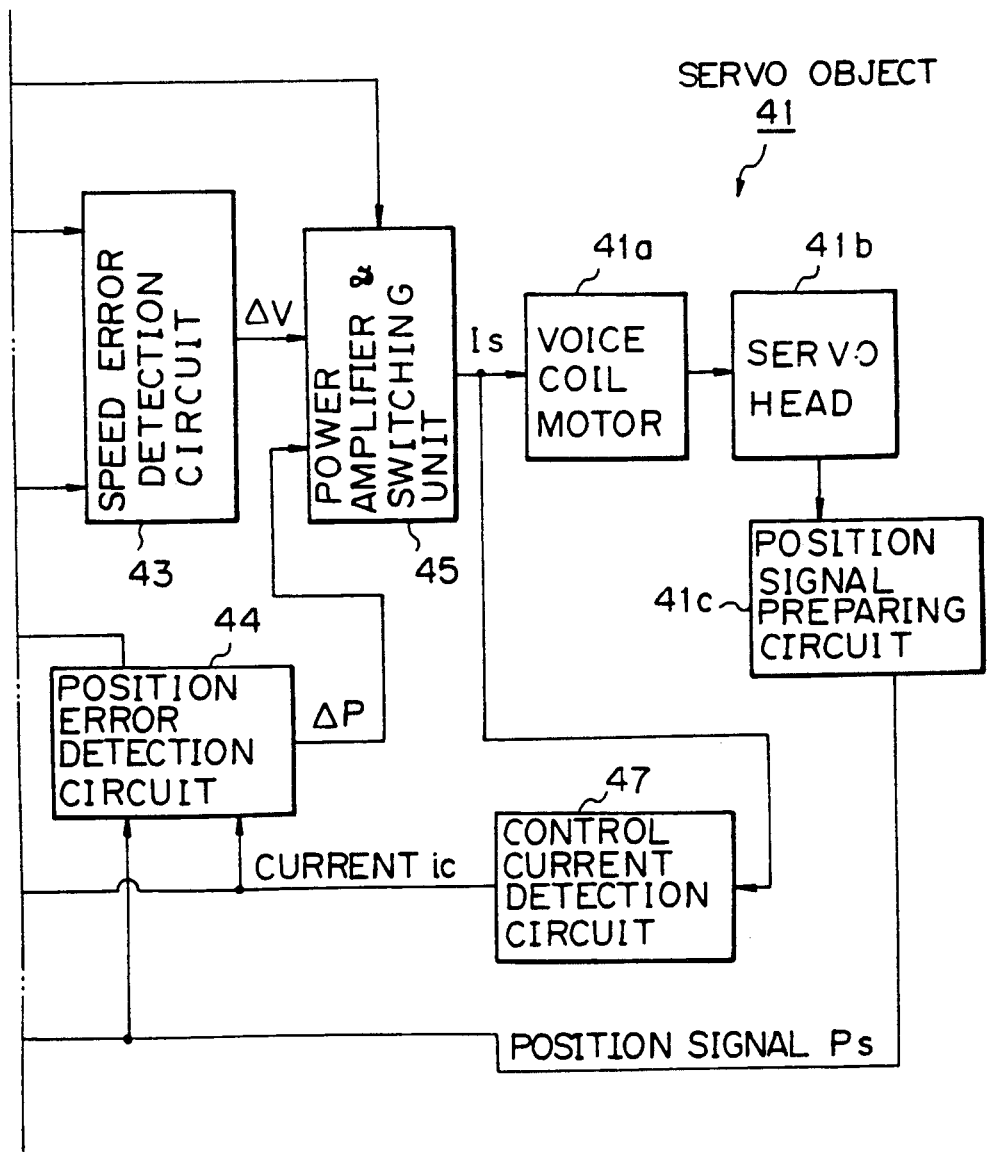

FIG. 39, including FIGS. 39A and 39B, is a block circuit diagram of the servo circuit of the fourth embodiment. Note that, principally, portions corresponding to those in previous figures are given the same reference numerals except the number "6" is replaced by the number "4".

Reference numeral 49 corresponds to the integrator shown in FIG. 16. It is provided with a switch 490 which is turned on by the main processing unit 46 and passes a position signal Ps, an absolute value circuit 491 which converts the position signal Ps from the switch 490 into an absolute value, an integration circuit 492 which integrates the output of the absolute value circuit 491, and an analog/digital converter 493 which converts the analog output of the integration circuit 492 into a digital value. Reference numeral 462 is an offset register which stores the offset value L, 463 is an integration number register which stores the number of integration operations, and 464 is a work register which stores various measurement values FWD, RVS, T1, T2, T3, and A.

Turning to the fifth embodiment of the present invention, there is further provided a step of changing a differentiation gain of a speed detection circuit, repeating a fixed distance of movement, and measuring the times of continuous speed control at the differentiation gains by a counter. In addition, a step of finding a differentiation gain of an optimal time of continuous speed control from the measured times of continuous speed control, a step of changing a control current detection gain of the speed detection circuit, repeating a fixed distance of movement, and measuring the integration values of position signals at least after position control at the various control current detection gains, and a step of finding the control current detection gain giving the minimum integration value among the measured integration values, are provided. The operation is basically the same as explained in FIGS. 12, 31, 33, and 34, so the explanation will not be repeated.

Figure 40A:
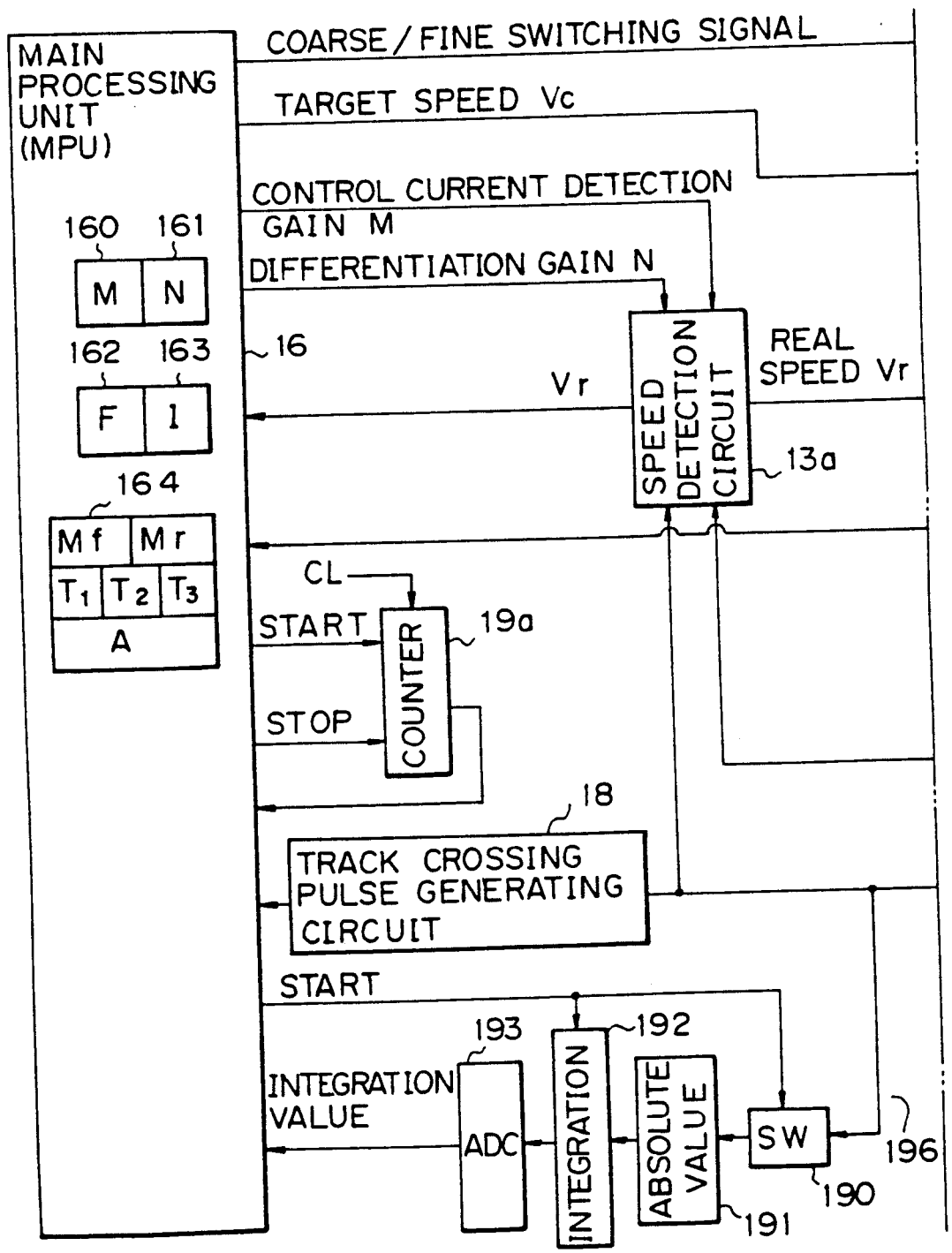
FIGS. 40A and 40B, is a block diagram of a fifth embodiment of the present invention.
Figure 40B:
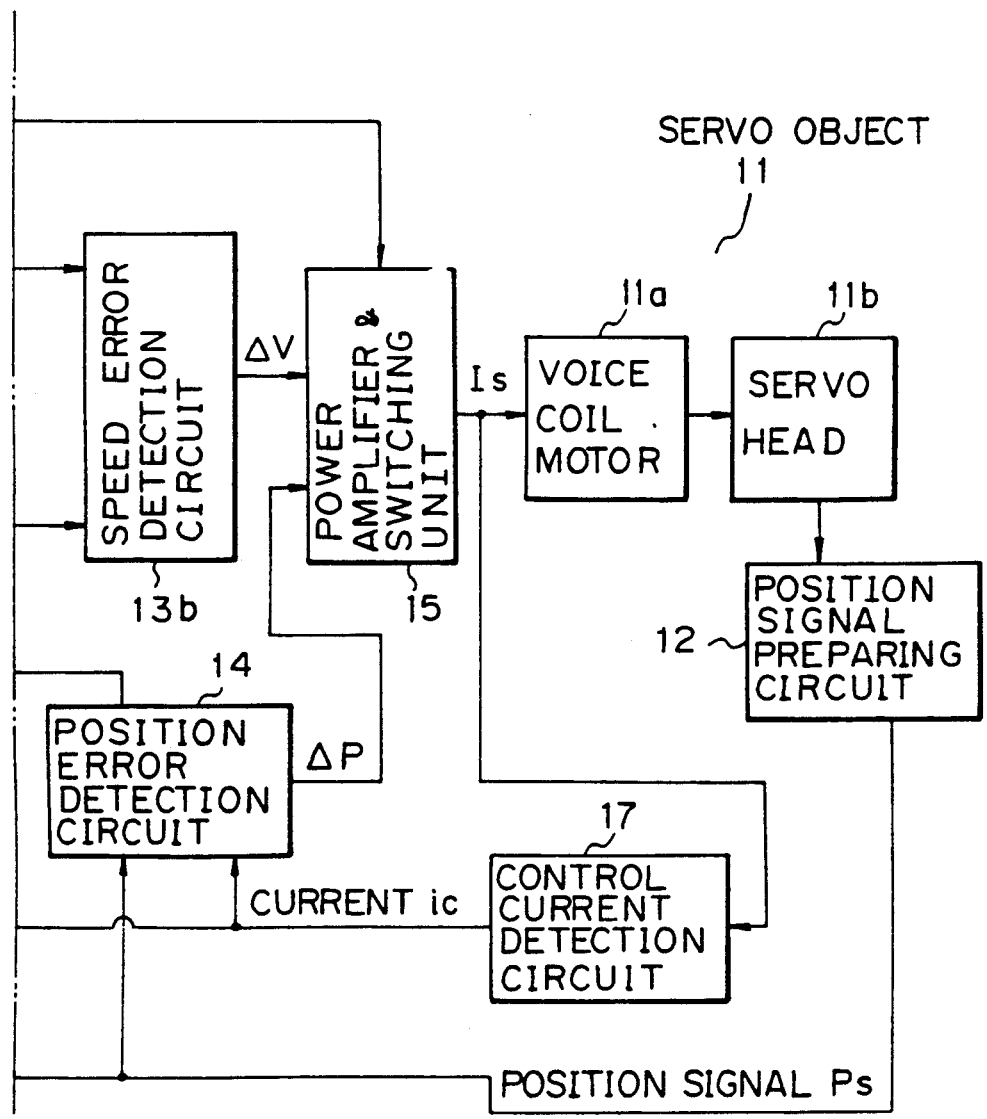

FIG. 40, including FIGS. 40A and 40B, is a block circuit diagram of the fifth embodiment of the present invention and shows the circuit for performing the operation of FIGS. 36A and 36B. Note that, principally, portions corresponding to those in previous figures are given the same reference numerals except the number "6" is replaced by the number "1".

Reference numeral 19a is a counter which is started and stopped by a main processing unit 16 and counts the time tc of continuous speed control, and 19b is an integrator which is turned on by the main processing unit 16 and is provided with a switch 190 which passes a position signal Ps. An absolute value circuit 191 converts the position signal Ps from the switch 190 to an absolute value, an integration circuit 192 integrates the output of the absolute value circuit 191, and an analog/digital (ADC) converter 193 converts the analog output of the integration circuit 192 to a digital value. Reference numerals 160 and 161 are gain registers. The gain register 160 stores the control current detection gain M and the gain register 161 stores the integration gain N. Reference numeral 162 is a flag register which is used for control of the adjustment processing. Reference numeral 163 is an integration number counter register which stores the number of integration operations. Reference numeral 164 is a work register which stores the various measurement values Mf, Mr, T1, T2, T3, and A.

In the fifth embodiment, the integration operation is performed half a track before the target position, but since the effects of the gain on the entry angle by integrating the position signal during position control are known to some extent, it is possible to integrate the position signal from the start of the position control also.

Figure 41:
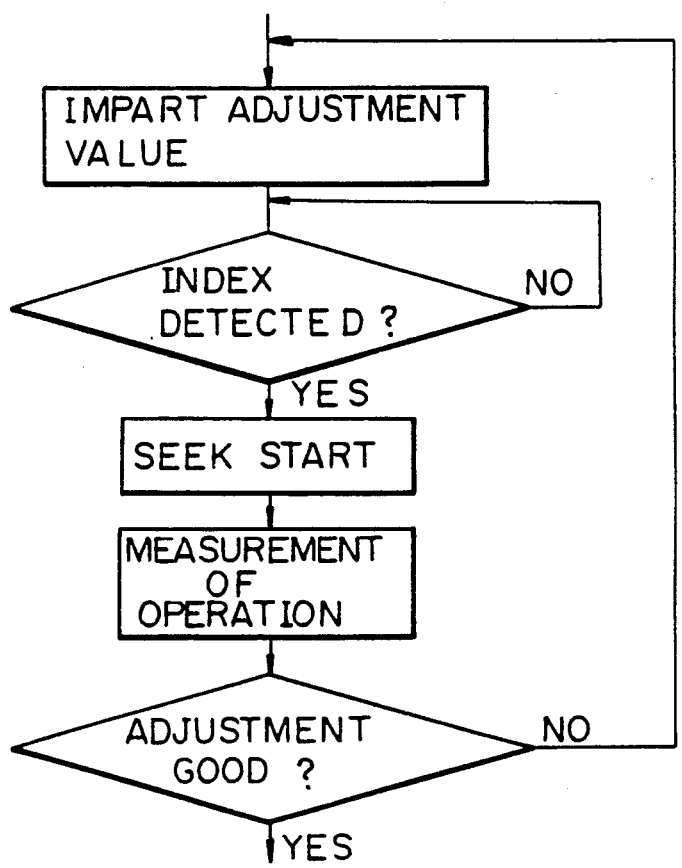
FIG. 41 is a flow chart of the principle of a sixth embodiment of the present invention.

Turning to the sixth embodiment of the present invention, there are further provided a step of imparting an adjustment value to the servo circuit, a step of starting a seek operation drive of the servo circuit in accordance with detection of an index signal from an output of the servo head, a step of measuring the operation of the servo circuit based on an output of the servo head due to the seek operation drive, and a step of determining the adjustment value based on the results of the measurement. FIG. 41 is a flow chart of the principle of the sixth embodiment of the present invention. The operation is basically the same as explained with reference to FIGS. 14, 29, 30, and 32, so the explanation will not be repeated.

In the sixth embodiment of the present invention, the start of the seek operation is synchronized with the index signal of the servo surface, so it is possible to measure the operation based on the output of the servo head at the same position as the index at all times. Therefore, during adjustment, even if there are differences in the servo track write operation of the servo surface, measurement is possible at the same position from the index and therefore accurate measurement for the adjustment is possible.

Figure 42B:
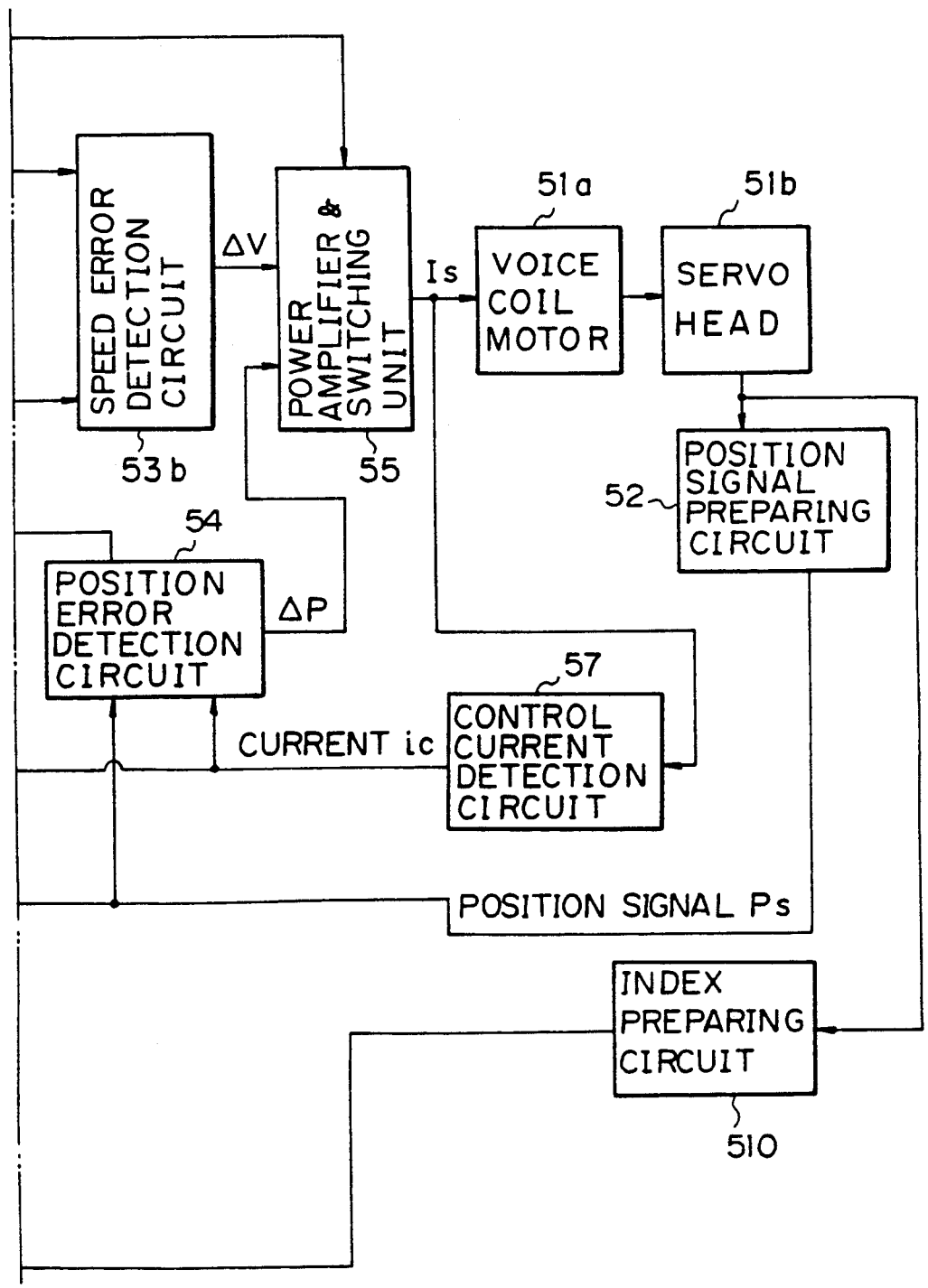

FIG. 42, including FIGS. 42A and 42B, is a block circuit diagram of the sixth embodiment of the present invention and shows the circuit for performing the operation of FIG. 41. Note that, principally, portions corresponding to those in previous figures are given the same reference numerals except the number "6" is replaced by the number "5".

Reference numeral 59b is an integrator as shown in FIG. 16 which is turned on by a main processing unit 56 and is provided with a switch 590 which passes a position signal Ps, an absolute value circuit 591 which converts the position signal Ps from the switch 590 to an absolute value, an integration circuit 592 which integrates the output of the absolute value circuit 591, and an analog/digital converter 593 which converts the analog output of the integration circuit 592 to a digital value. Reference numeral 510 is an index preparing circuit which prepares an index signal from the output of the servo head 51b and notifies the main processing unit 56. Reference numeral 560 is an offset register which stores the offset values L, 561 is an integration number register which stores the number of integration operations, and 569 is a work register which stores the various measurement values FWD, RVS, T1, T2, T3, and A.

As shown in FIG. 43, since the seek operation is performed in synchronization with the index during the various integration samplings, the positions (times) of the integration samplings become the same, so it is possible to prevent any effect on the integration values due to disturbances in the track pattern of the servo surface. Therefore, it is possible to achieve accurate adjustment.

Figure 44A:
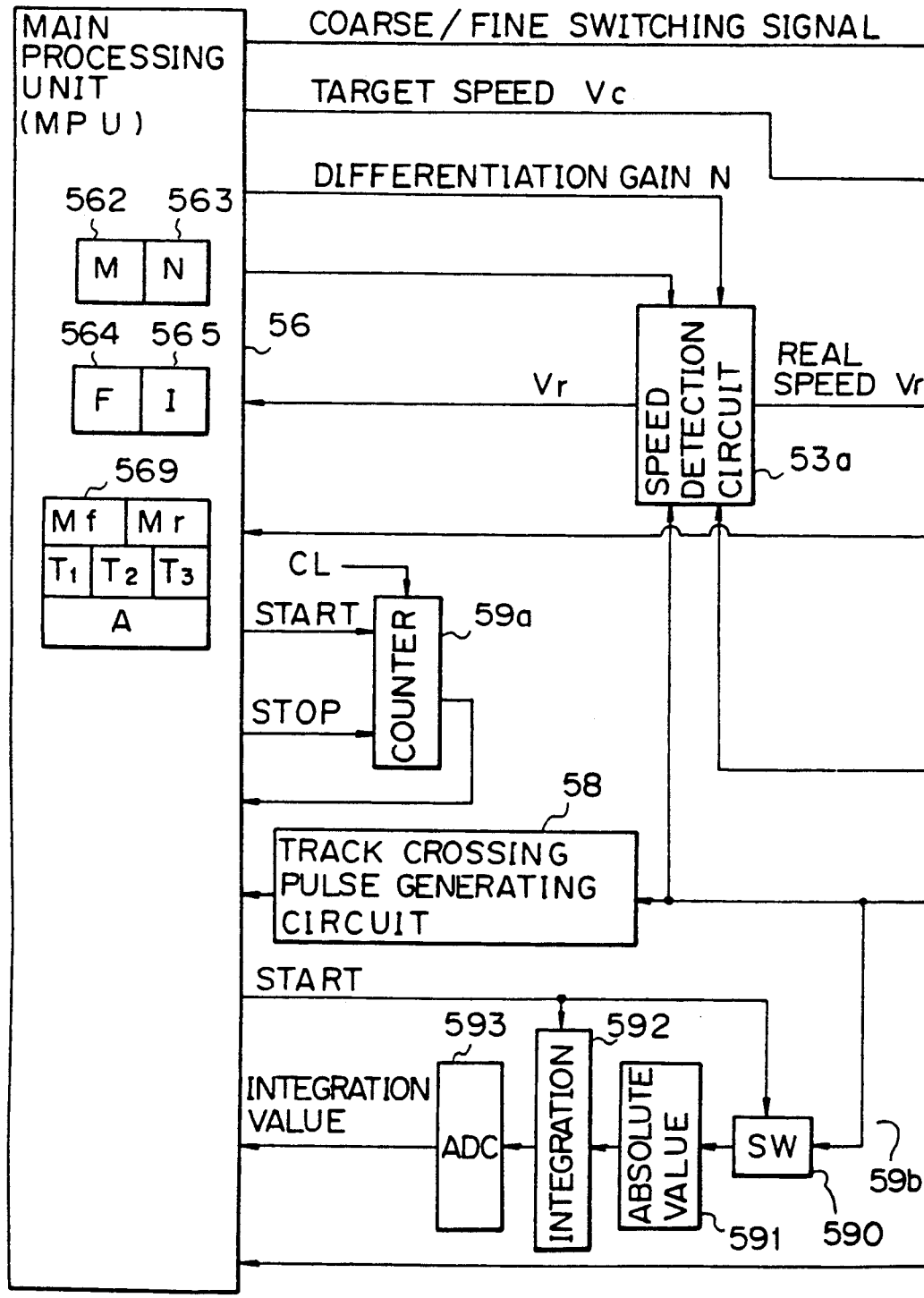
FIGS. 44A and 44B, is a block diagram of a modification of the sixth embodiment of the present invention.
Figure 44B:
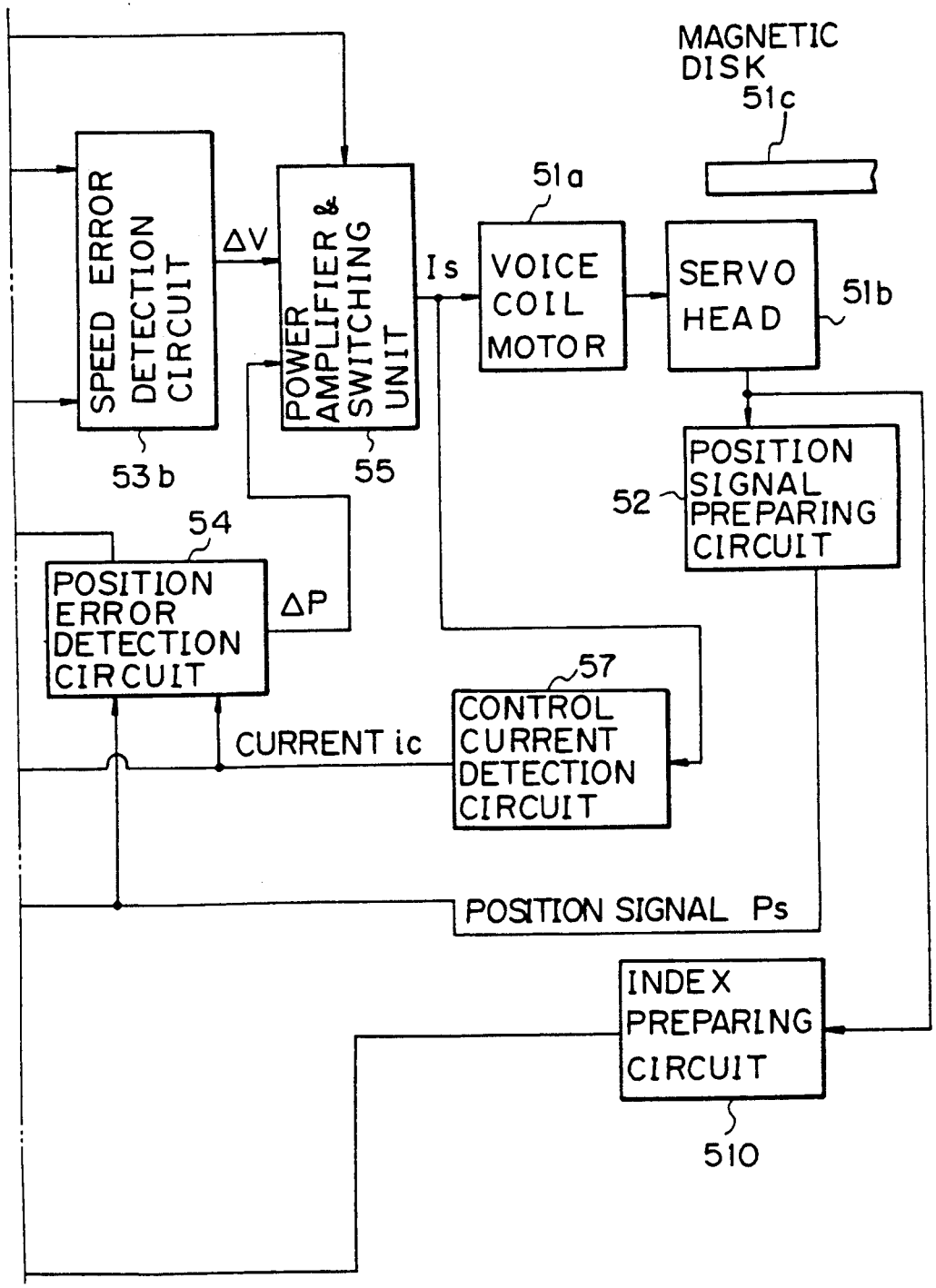

FIG. 44 is a block circuit diagram of a modification of the sixth embodiment according to the present invention.

Reference numeral 59a is a counter which is started and stopped by the main processing unit 56 and measures the time tc of continuous speed control. Reference numerals 562 and 563 are gain registers. The gain register 562 stores the control current detection gain M, and the gain register 563 stores the differentiation gain N. Reference numeral 564 is a flag register which is used for controlling the adjustment processing, 565 is an integration number counter register which stores the number of integration operations, and 569 is a work register which stores various measurement values Mf, Mr, T1, T2, T3, and A.

Figure 45:
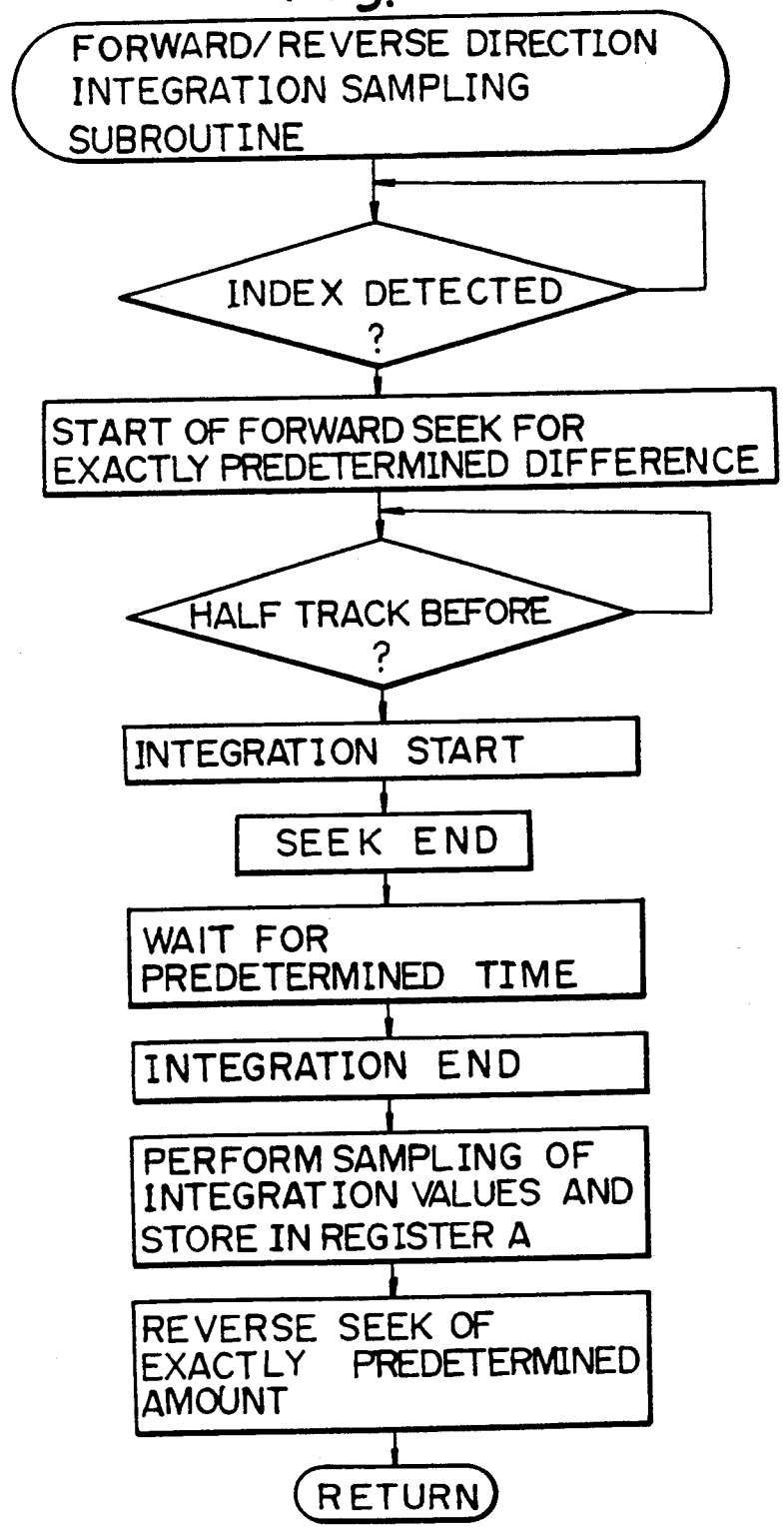
FIG. 45 is a flow chart of the processing for integration sampling of the sixth embodiment of the present invention.

FIG. 45 is a flow chart of the integration sampling processing. When the subroutine is called, the main processing unit 56 monitors the index signal of the index preparing circuit 510.

When the index signal is detected, the main processing unit 56 starts the forward seek operation for a predetermined amount of difference.

The flow chart in FIG. 45 consists of the flow chart of FIG. 35 plus an additional "index detection", so an explanation will not be repeated.

While the present invention was explained above using embodiments, various modifications are possible in accordance with the gist of the present invention and are not excluded from the scope of the invention. For example, an explanation was given for a magnetic disk apparatus, but the present invention can be applied to other apparatuses as well and the operation of the counter and/or integrator may be performed by the main processing unit.

I claim:

1. A method for an automatic adjustment system for a servo circuit of a magnetic disk apparatus including a magnetic head for reading servo information recorded on a servo surface of a magnetic disk, position signal preparing means for preparing a position signal from the servo information detected by the magnetic head, speed control means for performing speed control on a drive source which moves the magnetic head during a seek operation based on the position signal, position control means for performing position control on the drive source based on the position signal, and switching means for switching the connection of the drive source from the speed control means to the position control means when changing speed control to position control, said method comprising the steps of:

(a) adjusting a detected sensitivity of the position signal preparing means by a core width adjustment in such a way that the position signal is monitored during a uniform speed seek operation and an angle of slope of the position signal becomes a predetermined value;

(b) adjusting a speed detection offset of the speed control means by a forward/reverse seek operation time adjustment in such a way that the times of a forward seek operation and reverse seek operation are monitored and the difference between the forward seek operation time and the reverse seek operation time become the smallest;

(c) adjusting an offset of the position control means by a position control offset adjustment in such a way that an integration value of the position signal is measured during position control in the seek operation and the integration value becomes the smallest; and (d) adjusting a control current detection gain of the speed control means by a seek operation time/positioning adjustment in such a way that the seek operation time is counted and a differentiation gain of the speed control means is adjusted so that the seek operation time becomes minimal, the position signal is adjusted, and the integration value becomes the smallest.

2. An automatic adjustment method as claimed in claim 1, wherein after said step (d) of said seek operation time/positioning adjustment, said steps (a)-(d) are repeated.

3. An automatic adjustment method as claimed in claim 1, wherein before said step (a) of core with adjustment a step of adjusting target speed by adjusting a target speed generating operation of a speed error detection circuit in said speed control means, is performed.

4. An automatic adjustment method as claimed in claim 1, wherein said step (a) of core width adjustment comprises the substeps of:

i) preparing a gate signal by slicing the position signal, while performing the uniform speed seek operation on the magnetic head, and counting a time ratio of the slope portion of the position signal from the gate signal; and ii) changing the detection sensitivity of the position signal preparing means so that the counted time ratio of the slope portion becomes a predetermined value.

5. An automatic adjustment method as claimed in claim 1, wherein said step (b) comprises the substeps of:

i) changing the offset adjustment value of the speed detection circuit in the speed control means and counting an access time of movement in the forward direction and an access time of movement in the reverse direction by a counter; and ii) seeking an offset adjustment value when the difference between the access time in the forward direction and access time in the reverse direction becomes minimal.

6. An automatic adjustment method as claimed in claim 1, wherein said step (c) further comprises the substeps of:

i) changing an offset adjustment value input to the position control means;

ii) repeating a fixed distance of movement;

iii) measuring integration values of the position signal during position control at various offset adjustment values; and iv) setting the offset adjustment value outputting the minimum integration value as the optimal offset value.

7. An automatic adjustment method as claimed in claim 1, wherein said step (d) further comprises the substeps of:

i) changing a differentiation gain of a speed detection circuit in the speed control means;

ii) repeating a fixed distance of movement;

iii) measuring the times of continuous speed control at each of the differentiation gains by a counter;

iv) finding a differentiation gain of an optimal time of continuous speed control from the measured times of continuous speed control;

v) changing a control current detection gain of the speed detection circuit in the speed control means;

vi) repeating the fixed distance of movement;

vii) measuring the integration values of position signals at least after position control at the various control current detection gains; and viii) finding the control current detection gain giving the minimum integration value among the measured integration values.

8. An automatic adjustment method as claimed in claim 1, further comprising the steps of:

(e) inputting an adjustment value to the servo circuit;

(f) starting a seek operation drive of the servo circuit in accordance with detection of an index signal from an output of the servo head;

(g) measuring the operation of the servo circuit based on an output of the servo head due to the seek operation drive; and (h) determining the adjustment value based on the results of the measurement.

9. An automatic adjustment method for a servo circuit of a magnetic disk apparatus, the servo circuit including a position signal preparing circuit for detecting a position signal from servo information of a magnetic head which reads the servo information recorded on a servo surface of a magnetic disk, a speed control circuit for performing speed control on a drive source which moves the magnetic head in a seek operation based on the position signal, and a position control circuit for performing position control on the drive source based on the position signal, said method comprising the steps of:

(a) preparing a gate signal by slicing the position signal, while performing the uniform speed seek operation on the magnetic head, and counting a time ratio of the slope portion of the position signal from the gate signal; and (b) changing the detection sensitivity of the position signal preparing circuit so that the counted time ratio of the slope portion becomes a predetermined value.

10. An automatic adjustment method of an access time for a servo circuit of a magnetic disk apparatus, the servo circuit including a speed detection circuit for detecting a real speed from a position signal obtained from a servo object, a speed error detection circuit for generating a speed error signal between a target speed and the real speed, a position error detection circuit for generating a position error signal based on the position signal, a switching circuit for switching the connection of the servo object between the speed error detection circuit and the position error detection, and a main processing unit for generating a coarse/fine switching signal to the switching circuit and controlling the connection of the switch circuit from the coarse control (speed control) of the speed error detection circuit to the fine control (position control) of the position error detection circuit in the vicinity of the target position, said method comprising the steps of:
- (a) changing an offset adjustment value of the speed detection circuit;
- (b) counting an access time of movement in the forward direction and an access time of movement in the reverse direction by a counter; and
- (c) seeking an offset adjustment value so that the difference between the access time in the forward direction and the access time in the reverse direction becomes minimal.

11. An automatic adjustment method of an offset value at a position control for a servo circuit of a magnetic disk apparatus, the servo circuit including a speed detection circuit for detecting a real speed from a position signal obtained from a servo object, a speed error detection circuit for generating a speed error signal between a target speed and the real speed, a position error detection circuit for generating a position error signal based on the position signal, a switching circuit for switching the connection of the servo object between the speed error detection circuit and the position error detection circuit, and a main processing unit for generating a coarse/fine switching signal to the switching circuit and controlling the connection of the switch circuit from the coarse control (speed control) of the speed error detection circuit to the fine control (position control) of the position error detection circuit in the vicinity of the target position, said method comprising the steps of:
- (a) changing an offset adjustment value input to the position control circuit;
- (b) repeating a fixed distance of movement;
- (c) measuring integration values of the position signal during position control at various offset adjustment values; and
- (d) setting the offset adjustment value having the minimum integration value as the optimal offset value.

12. An automatic adjustment method of a speed detection gain for a servo circuit of a magnetic disk apparatus, the servo circuit including a speed detection circuit for detecting a real speed from a position signal obtained from a servo object, a speed error detection circuit for generating a speed error signal between a target speed and the real speed, a position error detection circuit for generating a position error signal based on the position signal, a switching circuit for switching the connection of the servo object between the speed error detection circuit and the position error detection circuit, and a main processing unit for generating a coarse/fine switching signal to the switching circuit and controlling the connection of the switching circuit from the coarse control (speed control) of the speed error detection circuit to the fine control (position control) of the position error detection circuit in the vicinity of the target position, said method comprising the steps of:
- (a) changing a differentiation gain of the speed detection circuit, recreating a fixed distance of movement, and measuring the times of continuous speed control at each of the differentiation gains by a counter;
- (b) finding a differentiation gain of an optimal time of continuous speed control from the measured times of continuous speed control;
- (c) changing a control current detection gain of the speed detection circuit, repeating the fixed distance of movement, and measuring the integration values of position signals at least after position control at the various control current detection gains; and
- (d) finding the control current detection gain giving the minimum integration value among the measured integration values.

13. An automatic adjustment method for a servo circuit of a magnetic disk apparatus, the servo circuit including a position signal preparing circuit for detecting the position signal from servo information of a magnetic head which reads the servo information recorded on a servo surface of a magnetic disk, a speed control circuit for performing speed control on a drive source which moves the magnetic head in a seek operation based on the position signal, and a position control circuit for performing position control on the drive source based on the position signal, said method comprising the steps of:
- (a) imparting an adjustment value to the servo circuit;
- (b) starting a seek operation drive of the servo circuit in accordance with detection of an index signal from an output of the servo head;
- (c) measuring the operation of the servo circuit based on an output of the servo head due to the seek operation drive; and
- (d) determining the adjustment value based on the results of the measurement.

14. An automatic adjusting system for a servo circuit of a magnetic disk apparatus, comprising:
- a speed detection circuit for detecting a real speed from a position signal obtained from a servo object;
- a speed error detection circuit, operatively connected to said detection circuit, for generating a speed error signal between a target speed and the real speed;
- a position error detection circuit, operatively connected to receive the position signal, for generating a position error signal based on the position signal;
- a switching circuit, operatively connected to said speed error detection circuit and said position error detection circuit, for switching the connection of the servo object between said speed error detection circuit and said position error detection circuit;
- an integration circuit, operatively connected to receive the position signal, for converting the position signal to an absolute value;
- a position sensitivity detection circuit, operatively connected to receive the position signal, for calculating a time ratio of the position signal; and
- a main processing unit, operatively connected to said speed error detection circuit, said position error detection circuit, said switching circuit, said integration circuit and said position sensitivity detection circuit, for generating a coarse/fine switching signal to said switching circuit and controlling the connection of said switching circuit from speed control of said speed error detection circuit to position control of said position error detection circuit in the vicinity of a target position.

* * * * *